(12) United States Patent
Glew

(10) Patent No.: US 7,241,953 B2
(45) Date of Patent: Jul. 10, 2007

(54) SUPPORT-SEPARATORS FOR HIGH PERFORMANCE COMMUNICATIONS CABLE WITH OPTIONAL HOLLOW TUBES FOR; BLOWN OPTICAL FIBER, COAXIAL, AND/OR TWISTED PAIR CONDUCTORS

(75) Inventor: Charles Glew, Framingham, MA (US)

(73) Assignee: Cable Components Group, LLC., Pawcatuck, CT (US)

( * ) Notice: Subject to any disclaimer, the term of this patent is extended or adjusted under 35 U.S.C. 154(b) by 29 days.

(21) Appl. No.: 10/461,822

(22) Filed: Jun. 13, 2003

(65) Prior Publication Data

US 2005/0103518 A1    May 19, 2005

Related U.S. Application Data

(60) Provisional application No. 60/462,983, filed on Apr. 15, 2003.

(51) Int. Cl.
*H01B 7/00* (2006.01)
(52) U.S. Cl. .............................. 174/113 R; 174/113 C
(58) Field of Classification Search ............ 174/110 R, 174/113 R, 113 C, 113 AS, 115, 116, 120 R
See application file for complete search history.

(56) References Cited

U.S. PATENT DOCUMENTS

| | | | | |
|---|---|---|---|---|
| 3,819,443 | A | | 6/1974 | Simons et al. |
| 3,928,519 | A | * | 12/1975 | Kashiyama et al. ........ 264/40.7 |
| 4,778,246 | A | * | 10/1988 | Carroll ........................ 385/107 |
| 4,892,442 | A | * | 1/1990 | Shoffner .................... 405/183.5 |
| 4,999,256 | A | | 3/1991 | Prewo et al. |
| 5,087,110 | A | * | 2/1992 | Inagaki et al. .............. 385/110 |
| 5,789,711 | A | | 8/1998 | Gaeris et al. |
| 5,952,615 | A | * | 9/1999 | Prudhon ................. 174/113 C |
| 5,969,295 | A | | 10/1999 | Boucino et al. |
| 5,990,419 | A | * | 11/1999 | Bogese, II ............... 174/120 R |
| 6,074,503 | A | * | 6/2000 | Clark et al. .................... 156/50 |

(Continued)

FOREIGN PATENT DOCUMENTS

EP        1 162 632 A2 *   5/2001

(Continued)

OTHER PUBLICATIONS

Telecommunications Industry Association—TIA/EIA Standard: Commerical Building Telecommuni. . . .

*Primary Examiner*—William H. Mayo, III
(74) *Attorney, Agent, or Firm*—Guerry L. Grune

(57) ABSTRACT

A high performance communications cable with core support-separators having various shaped profiles defining and maintaining a space between transmission multi-media or transmission multi-media pairs. The core may be of a conductive or insulative material. The central core region includes a hollow opening or duct for blown fiber (ABF). The core support-separator can be interior to the cable jacket or without the benefit of a jacket. A thin layer of material can act as a type of skin for future mechanical protection. The specially shaped core support-separator has a central region that is either solid, partially solid, foamed, with a solid skin over the foam or hollow itself. The cable may include a plurality of shaped sections that extend outward from the central region along the length of the central region. Each of the defined clearance channels allow for disposal therein of conductors and optical fibers.

4 Claims, 43 Drawing Sheets

U.S. PATENT DOCUMENTS

| | | | |
|---|---|---|---|
| 6,150,612 A | 11/2000 | Grandy et al. | |
| 6,160,940 A * | 12/2000 | Summers et al. | 385/110 |
| 6,173,107 B1 | 1/2001 | Reeve et al. | |
| 6,222,130 B1 * | 4/2001 | Gareis et al. | 174/113 C |
| 6,297,454 B1 * | 10/2001 | Gareis | 174/113 C |
| 6,303,867 B1 * | 10/2001 | Clark et al. | 174/113 R |
| 6,365,836 B1 * | 4/2002 | Blouin et al. | 174/113 C |
| 6,424,772 B1 * | 7/2002 | Blazer et al. | 385/110 |
| 6,687,437 B1 * | 2/2004 | Starnes et al. | 385/101 |
| 6,818,832 B2 * | 11/2004 | Hopkinson et al. | 174/113 R |
| 6,855,889 B2 * | 2/2005 | Gareis | 174/113 C |
| 2003/0037955 A1 | 2/2003 | Glew et al. | |
| 2003/0159848 A1 * | 8/2003 | Hopkinson et al. | 174/113 C |
| 2003/0205402 A1 * | 11/2003 | Koyasu et al. | 174/113 C |
| 2005/0006132 A1 * | 1/2005 | Clark | 174/113 C |

FOREIGN PATENT DOCUMENTS

| | | |
|---|---|---|
| JP | 04-332406 * | 11/1992 |
| JP | 2002-304920 * | 10/2002 |
| WO | WO 01/34466 | 5/2001 |
| WO | WO 03/021607 | 3/2003 |

* cited by examiner

SUPPORT-SEPARATORS FOR HIGH PERFORMANCE COMMUNICATIONS CABLE WITH OPTIONAL HOLLOW TUBES FOR; BLOWN OPTICAL FIBER, COAXIAL, AND/OR TWISTED PAIR CONDUCTORS

CLAIM TO PRIORITY

Applicants hereby claim priority under all rights to which they are entitled under 35 U.S.C. Section 120 based upon the U.S. Provisional Application Ser. No. 60/462,983 for this patent application filed at the United States Patent and Trademark Office on Apr. 15, 2003.

FIELD OF INVENTION

This invention relates to high performance multi-media communications cables utilizing paired or unpaired electrical conductors with or without optical fibers, and/or coaxial conductors and/or twisted pair conductors. The metal conductors and the cable itself may be shielded or unshielded or a combination of both depending on the utility requirements. More particularly, it relates to support-separators or spacers for cables, which may perform as self-contained cables, having a central core defining singular or plural individual pair channels with allowance for hollow tubes that may initially be void of, or filled with one or more fiber optic, coaxial, or twisted pair conductors. The tubes or fiber ducts may be initially empty, but may be used in a future installation for one or more fibers or conductors. Additionally, a pull tape may be inserted in the tubes that may be used to pull one or more fibers or other conductor(s) into an existing cable. The communications cables have interior core support-separators that define a clearance channel through which conductors or optical fibers may be disposed.

BACKGROUND OF THE INVENTION

Many communication systems utilize high performance cables normally having four pairs or more that typically consist of two twisted pairs transmitting data and two receiving data as well as the possibility of four or more pairs multiplexing in both directions. A twisted pair is a pair of conductors twisted about each other. A transmitting twisted pair and a receiving twisted pair often form a subgroup in a cable having four twisted pairs. High-speed data communications media in current usage include pairs of wire twisted together to form a balanced transmission line. Optical fiber cables may include such twisted pairs or replace them altogether with optical transmission media (fiber optics).

When twisted pairs are closely placed, such as in a communications cable, electrical energy may be transferred from one pair of a cable to another. Energy transferred between conductor pairs is undesirable and referred to as crosstalk. The Telecommunications Industry Association and Electronic Industries Alliance have defined standards for crosstalk, including TIA/EIA-568-B.2-1 for Category 5e and Category 6. The International Electrotechnical Commission has also defined standards for data communication cable crosstalk, including ISO/IEC 11801. One high-performance standard for 100 MHz cable is ISO/IEC 11801, Category 5. Additionally, more stringent standards are being implemented for higher frequency cables including Category 6 and Category 7, which includes frequencies of 200 and 600 MHz, respectively. Transmission rates of as much as 10 G-base-T employing 10 Gigabit Ethernet over copper at frequencies of 650 MHz or higher are now either anticipated or included as new industry standards emerge. Industry standards, cable specifications, and known commercially available products are listed in Table 1.

TABLE 1

Industry Standard Cable Specifications

| ALL DATA AT 100 MHz | TIA CAT 5e | TIA CAT 6 | ANIXTER XP6 R3.00XP 11/00 | ANIXTER XP7 R3.00XP 11/00 |
| --- | --- | --- | --- | --- |
| MAX TEST FREQUENCY | 100 MHz | 250 MHz | 250 MHz | 350 MHz |
| MAX ATTENUATION | 22.0 dB | 19.8 dB | 21.7 dB | 19.7 dB |
| MIN POWER SUM NEXT | 32.3 dB | 42.3 dB | 34.3 dB | 44.3 dB |
| MIN ACR | 13.3 dB | 24.5 dB | | |
| MIN POWER SUM ACR | 10.3 dB | 22.5 dB | 12.6 dB | 23.6 dB |
| MIN POWER SUM ELFEXT | 20.8 dB | 24.8 dB | 23.8 dB | 25.8 dB |
| MIN RETURN LOSS | 20.1 dB | 20.1 dB | 21.5 dB | 22.5 dB |

Note:
Anixter recommends XP6 for Ethernet and Fast Ethernet applications, XP6 or XP7 for ATM applications, and XP7 for Gigabit Ethernet.

In conventional cable, each twisted pair of conductors for a cable has a specified distance between twists along the longitudinal direction. That distance is referred to as the pair lay. When adjacent twisted pairs have the same pair lay and/or twist direction, they tend to lie within a cable more closely spaced than when they have different pair lays and/or twist direction. Such close spacing increases the amount of undesirable cross-talk that occurs. Therefore, in many conventional cables, each twisted pair within the cable has a unique pair lay in order to increase the spacing between pairs and thereby to reduce the cross-talk between twisted pairs of a cable. Twist direction may also be varied. Along with varying pair lays and twist directions, individual solid metal or woven metal air shields, i.e. aluminum laminated to polyethylene terephthalate (PET) shields and/or woven metal such as braid shields, can be used to electro-magnetically isolate pairs from each other or isolate the pairs from the cable jacket and the surrounding environment.

Shielded cable, although exhibiting better cross-talk isolation, is more difficult, time consuming and costly to manufacture, install, and terminate. Individually shielded pairs must generally be terminated using special tools, devices and techniques adapted for the job, also increasing cost and difficulty.

One popular cable type meeting the above specifications is Unshielded Twisted Pair (UTP) cable. Because it does not include shielded pairs, UTP is preferred by installers and others associated with wiring building premises, as it is easily installed and terminated. However, UTP fails to achieve superior cross-talk isolation such as required by the evolving higher frequency standards for data and other state of the art transmission cable systems, even when varying pair lays are used.

Some cables have used supports in connection with twisted pairs. These cables, however, suggest using a standard "X", or "+" shaped support, hereinafter both referred to as the "X" support. Protrusions may extend from the standard "X" support. The protrusions of these prior inventions have exhibited substantially parallel sides.

The document, U.S. Pat. No. 3,819,443, to Sun Chemical Corporation, hereby incorporated by reference, describes a shielding member comprising laminated strips of metal and plastics material that are cut, bent, and assembled together to define radial branches on said member. It also describes a cable including a set of conductors arranged in pairs, said shielding member and an insulative outer sheath around the set of conductors. In this cable the shielding member with the radial branches compartmentalizes the interior of the cable. The various pairs of the cable are therefore separated from each other, but each is only partially shielded, which is not so effective as shielding around each pair and is not always satisfactory.

The solution to the problem of twisted pairs lying too closely together within a cable is embodied in three U.S. Pat. No. 6,150,612 to Prestolite, U.S. Pat. No. 5,952,615 to Filotex, and U.S. Pat. No. 5,969,295 to CommScope incorporated by reference herein, as well as an earlier similar design of a cable manufactured by Belden Wire & Cable Company as product number 1711A. The prongs or splines in the Belden cable provide superior crush resistance to the protrusions of the standard "X" support. The superior crush resistance better preserves the geometry of the pairs relatives to each other and of the pairs relative to the other parts of the cables such as the shield. In addition, the prongs or splines in this invention preferably have a pointed or slightly rounded apex top which easily accommodates an overall shield. These cables include four or more twisted pair media radially disposed about a "+"-shaped core. Each twisted pair nests between two fins of the "+"-shaped core, being separated from adjacent twisted pairs by the core. This helps reduce and stabilize crosstalk between the twisted pair media. U.S. Pat. No. 5,789,711 to Belden describes a "star" separator that accomplishes much of what has been described above and is also herein incorporated by reference.

However, these core types can add substantial cost to the cable, as well as excess material mass which forms a potential fire hazard, as explained below, while achieving a crosstalk reduction of typically 3 dB or more. This crosstalk value is based on a cable comprised of a fluorinated ethylene-propylene (FEP) conductors with low smoke PVC jackets as well as cables constructed of FEP, PVDF, and ECTFE jackets with FEP insulated conductors. for meeting NFPA 262 plenum applications for fire retardant and smoke suppression requirements. For riser applications (i.e. UL 1666, etc.), properly PVC jackets with polyolefin conductors are useful for meeting the U.S. standards, however, globally the need for halogen free jackets continues.

Cables where no separation between pairs exist will exhibit less desirable cross-talk values. When pairs are allowed to shift based on "free space" within the confines of the cable jacket, the fact that the pairs may "float" within a free space can reduce overall attenuation values due to the ability to use a larger conductor to maintain 100 ohm impedance. The movement occurs when the cable is put on new reels or on a reelex box during installation and stress on the conductor may cause electrical degradation. As the jacket proximity to the conductors is further removed, the electrical properties between conductors or conductor pairs may also improve. FIG. 8B is an example of the present invention which assists greatly in providing further separation of the cable jacket from individual or paired conductors. The trade-off with allowing the pairs to float is that the pair of conductors tend to separate slightly and randomly. This undesirable separation contributes to increased structural return loss (SRL) and more variation in impedance.

One method to overcome this undesirable trait is to twist the conductor pairs with a very tight lay. This method has been proven impractical because such tight lays are expensive and greatly limit the cable manufacturer's throughput and overall production yield. An improvement included by the present invention to structural return loss and improved attenuation is to provide a central circular ring region with various extending protrusions for pair separation.

The central ring portion can optionally include a hollow region to act as a hollow duct which is available for the future filling with optical fiber or coaxial cable or twisted pair conductors. Inside the central ring portion it is possible to have a second inner section that includes either a smooth or rifled surface as needed for blown finer applications. The fiber optic portions may be blown by gaseous means (normally air) or pulled into the hollow region with a pull tape. The fiber optics may be installed in the hollow duct in advance of the insertion of conductor pairs and an overall jacket. Also, future filling of the hollow ducts may occur with any of the communications media (fiber, coax, twisted pair, etc.). This ability to "future fill" gives the cable additional "dual" functionality and addresses the concern that installers share regarding the need to remove or add new wire and cable to existing plenum or non-plenum areas carrying older media.

Other improvements have been shown and filed in U.S. application US 2003/0037955/A1 filed at the United States Patent and Trademark Office on Aug. 25, 2001 and published Feb. 27, 2003 and subsequent PCT international publication number WO 03/021607 A1, filed May 1, 2002 and published 13 Mar. 2003.

Another improvement, and one that is included by the present invention, is to provide a circular ring region which is surrounded by rounded lobes in a symmetric diamond-like geometry that defines as many as four separate regions for pair separation and derivatives thereof. Again the central ring portion can optionally include a hollow region to act as an air blown fiber (ABF) duct which is available for filling with optical fiber or for the aforementioned coaxial or twisted pair applications.

A third improvement included by the present invention is to provide a hollow four-petal or "daisy" shaped arrangement with a central core that may or may not be hollow, and derivatives thereof—again to allow for pair separation. Individual or paired conductors are placed within the hollow petals as required depending on electrical, mechanical, and flammability design requirements. If the central region is hollow, the possibility again exists for that region to act as an air blown fiber (ABF) duct which is available for filling with optical fiber.

Still another improvement included by the present invention is to provide cross-like arrangement of varying geometric design and derivatives thereof. One such arrangement is a more conventional cross-like separator section with "rifled" sections extending outward into four quadrants away from the central region. This rifled cross is then encased within an outer insulated layer which is itself shaped in an identical cross except that the dimensions of this outer cross is larger than the rifled inner cross and functions as a "skin". In this manner the separator uses less material than a conventional cross separator and thus reduces the BTU content within a jacketed (or even an unjacketed) cable. An optimal design that meets the stringent fire retardancy and smoke suppression requirements as well as the electrical needs, includes the use of an outer solid skin of either FEP or PVC sufficient to reduce flame and smoke over a foamed insulation material with a very low (nearer to 1.00 the better) dielectric constant. To pass recent CMP-50 requirements, lower fuel loads are very helpful. To reduce fuel loads, the addition of air and reduction of material are both useful methods for achieving the desired goals of improved flammability, smoke generation, and electrical properties of any cable construction using separators of the present invention. Dual extrusion is a commonly known method that can allow for a dual insulation design capable of providing such a product. Dual extrusion also allows for more sophisticated designs where lowering BTU content is important, as for example in the IEC C332-3$B_1$ and $B_2$ test protocols for European applications as part of the specifications listed in Table 2. Use of a pull tape within these constructions, the tape itself constructed from fire retardant, smoke reducing materials, is also part of the present invention and provides another avenue to meet the needs of upgrading existing cable installations when new internal communications media must be provided.

In recent years, electro-optical equipment has begun to replace electronic equipment for certain applications, such as telecommunication and data communication networks. This trend should continue because the electro-optical equipment has inherent advantages over purely electronic equipment. These advantages include a broader bandwidth for signal transmission, greater storage capability for data, and inherent immunity to electromagnetic interference. Given these advantages of electro-optical equipment, fiber optic cables have become increasingly important because they transmit information and signals between the various pieces of electro-optical equipment.

The appearance of these cables resembles electrical cables, but fiber optic cables are smaller in size and lighter in weight. Fiber optic cables comprise optical fibers and other cable elements which are protected from the external environment by an external jacketing. These cables may be of a traditional design with the fibers surrounded by strength

TABLE 2

European Flammability Specifications

| Class | Test Methods | Classification Criteria (1) | Additional Classification |
|---|---|---|---|
| Ac | EN ISO 1716 | PCS $\leq$ 2.0 MJ.kg-1 (2) | — |
| B1c | EN 50266-2-x (3) And | FS $\leq$ 1.75 m; and THR600s $\leq$ 7.5 MJ; and Peak RHR $\leq$ 15 kW; and FIGRA $\leq$ 120** W · s-1 | Smoke production (5) and Flaming droplets/particles (6); And Acidity/Corrosivity (7) |
| | EN 50265-2-1 | H $\leq$ 425 mm | |
| B2c | EN 50266-2-x (3) And | FS $\leq$ 2.00 m; and THR600s $\leq$ 15 MJ; and Peak RHR $\leq$ 50 kW; and FIGRA $\leq$ 150** W · s-1 | Smoke production (5) and Flaming droplets/particles (6); And Acidity/Corrosivity (7) |
| | EN 50265-2-1 | H $\leq$ 425 mm | |
| C1c | EN 50266-2-y (4) 600s And | FS $\leq$ 2.0 m; and THR600s $\leq$ 15 MJ; and Peak RHR $\leq$ 50 kW; and FIGRA $\leq$ 150** W · s-1 | Smoke production (5) and Flaming droplets/particles (6); And Acidity/Corrosivity (7) |
| | EN 50265-2-1 | H $\leq$ 425 mm | |
| C2c | EN 50266-2-y (4) 600s And | FS $\leq$ 2.5 m; and THR600s $\leq$ 35 MJ; and Peak RHR $\leq$ 100 kW; and FIGRA $\leq$ 250** W · s-1 | Smoke production (5) and Flaming droplets/particles (6); And Acidity/Corrosivity (7) |
| | EN 50265-2-1 | H $\leq$ 425 mm | |
| Dc | EN 50265-2-1 | H $\leq$ 425 mm | Flaming droplets/particles (6); And Acidity/Corrosivity (7) |
| Ec | | No performance determined | |

**provisional figures

Yet another improvement included by the present invention is to provide variations on the cross-like arrangement by adding "zig-zag" with and without "sickle-like" endings regions instead of "rifled" sections extending outward into four quadrants away from the central region.

For all these configurations, a major purpose of the inventive design of these separators is to provide contributions to improved attenuation, power sum NEXT (near end cross talk), power sum ACR (attenuation cross-talk ratio) and ELFEXT (equal level far end cross-talk) by providing for better control of spacing of the pairs, adding more air-space, and allowing for "pair-twinning" at different lengths. Additional benefits include reduction of the overall material mass required for conventional spacers, which greatly contributes to flame and smoke reduction. The other major purpose is to allow for "future" or concurrent filling of any media such as optical, twisted pair, or coax conductors with sufficient spacing so that electrical and optical integrity is maintained.

members and protective elements in the cable core or of a more non-traditional, loosely-bundled type with the fibers contained loosely within tubes or ducts in a cable core.

According to U.S. Pat. No. 4,997,256, optical fiber units may be suitable for installation by the force of a fluid flowing through a passage. The unit, in this case, includes at least one optical fiber and at least one interstitial cord. The fibers and cords are of the same diameter. They are bundled and surrounded by a first sheath that is formed of a material having a high Young's modulus. An outer sheath, of foamed polyethelene may surround the first sheath. More particularly, the invention described includes an improvement in the blowing and transmission properties of such an optical fiber unit.

The objects of the invention can be achieved by an optical fiber unit of a type that is to be installed by the drag force of a pressure fluid flowing through a pipe, containing at least one optical fiber and more than one interstitial cord which are bundled and surrounded by an inner and outer sheathing to provide a unitary assembly, which inner sheath is made of a resin that has a high Young's modulus and that exhibits small residual strain during the application of sheathing. The outer sheath is made of a foamed polyethylene.

Another object of this invention can be attained in an effective way if the interstitial cord used in the optical fiber unit has substantially the same outside diameter as the optical fiber. Further, the object of this invention can be attained in a more effective way if at least one of the interstitial cords has a sufficient strength to work as a rip cord that assists in ripping away the inner and outer sheaths when the optical fiber is withdrawn from the optical fiber unit during end preparations.

In the case of the present invention, the central "hollow" portion of the support-separator can act as the duct for accommodating the inventive entity described. The duct could be composed of polybutylene terephthalate, amorphous nylon or other suitable materials such as described in the U.S. Pat. No. 4,997,256. Essentially all other aspects of the '256 patent which include installing optical fiber into predisposed duct can be incorporated into the present invention using the central hollow portions of the support separator as the predisposed duct.

U.S. Pat. No. 6,173,107 describes a method and apparatus for installing or advancing a lightweight and flexible transmission line along a tubular pathway comprising insertion of the free end of such a line into a previously installed pathway, and propelling the line along the pathway by fluid drag of a gaseous medium passed through the pathway in the desired direction of advance. The present invention may also incorporate this method and potentially the apparatus as described below for the same purpose utilizing the central core of the support-separators for ABF or pulling with a pull tape.

It should be appreciated that to generate sufficient fluid drag to propel the transmission line, the gaseous medium has to be passed through the pathway with a flow velocity much higher than the desired rate of advance.

The terms "lightweight and flexible" with respect to the transmission line are to be understood as meaning "sufficiently lightweight and flexible" for the transmission line to be propelled by the fluid drag. The flow velocity of the gaseous medium may be steady or may be suitably varied, for example either between a first velocity producing no, or insufficient, fluid drag to propel the fiber or wire member, and a second velocity producing sufficient fluid drag to propel the fiber or wire member, or between a first and second velocity both producing sufficient fluid drag for propelling the fiber or wire member. Conveniently the variations in velocity take the form of repeated abrupt changes between the first and second velocity. The aforementioned variations in flow velocity may include periods during which the flow is reversed with respect to the desired direction of advance of the transmission line.

It is to be understood that more than one transmission line may be propelled along the same tubular pathway.

A transmission line may, for example, comprise a single optical fiber or wire, protected by at least a primary coating but preferably contained within an outer envelope. Alternatively, a fiber or wire member may comprise a plurality of optical fibers or wires contained within a common envelope. The envelope may loosely or tightly surround the fiber (wire), or fibers (wires).

The method may be used for insertion of an optical fiber or wire member into, or its withdrawal from, the pathway.

The gaseous medium is chosen to be compatible with the environment in which the invention is performed, and in ordinary environments will be a non-hazardous gas or gas mixture. With the proviso about compatibility with the environment, the gaseous medium is preferably air or nitrogen.

The tubular pathways and/or the fiber or wire members are conveniently but not necessarily of circular cross-section, and the fiber or wire member is always smaller than the pathway.

In practice, when installing an optical fiber member, the pathway internal diameter will generally be greater, and frequently much greater than 1 mm, and the external diameter of the fiber member greater than 0.5 microns.

A preferred range of diameters for the pathway is 1 to 10 mm, conveniently between 3 and 7 mm, and a preferred range of diameters for the fiber members is 1 to 4 mm, although much larger diameters may be used provided the fiber member is sufficiently lightweight and flexible. The diameter of the fiber member or members is preferably chosen to be greater than one tenth, and conveniently to be about one half of the pathway diameter or greater (and appropriately less, of course, if more than one fiber member is to be propelled through the same pathway). For single mode fiber the fiber and cladding diameter range is normally from 7–250 microns and for multimode fiber the range is normally between 250 and 900 microns.

Insertion of a fiber (or wire) member by means of the fluid drag of a gas passing over the fiber member has several advantages over methods involving pulling an optical fiber (wire) cable with a pull cord.

Firstly, the extra step of providing a pull cord or flat pull tape with a Kellum-like grip is eliminated.

Secondly, using the fluid drag of a gaseous medium produces a distributed pulling force on the fiber (wire) member. This is particularly advantageous if the installation route contains one or more bends. If, as would be the case with a pulling cord, the pulling force were concentrated at the leading end of the fiber member, any deviation of the pathway from a straight line would greatly increase friction between the fiber member and the internal walls of the pathway, and only a few bends would be sufficient to cause locking of the fiber. The distributed pulling force produced by the fluid drag, on the other hand, enables bends to be negotiated fairly easily, and the number of bends in a given installation is no longer of much significance.

Thirdly, the fluid drag substantially reduces overall pulling stress on the fiber (or wire) member and so permits the fiber (or wire) member to be of relatively simple and cheap construction.

Furthermore, because the fiber member is not subjected to any substantial pulling stress during installation, little allowance, if any, needs to be made for subsequent relaxation.

According to a further aspect of the invention described in U.S. Pat. No. 6,173,107, a method of installing a transmission line comprises installing a conduit having one or more ductlets providing tubular pathways. The ductlets described below, for the present invention, may be the central hollow regions of any shape associated with the support-separators described.

The communications route may be initially designed and upgraded according to a customer's needs or desires. For example, after installation of the communications cable with support-separator, wire members containing one or more lightweight and flexible wires initially may be propelled through a pathway using fluid drag. Thereafter, the route may be upgraded by installing further wire members and/or inserting, by the aforesaid method using fluid drag, one or more fiber members into the associated ductlets as required.

It would also be possible to remove fiber from existing ducts and reinstall newer fiber or new conductors as needed. In some cases, it may be possible to remove the duct itself and re-install (or not depending on the need).

Installing optical fiber and/or wire transmission lines by this method has several advantages over conventional techniques.

First, since the conduit is installed without containing any optical fibers, conventional rope pulling and similar techniques may be freely employed for installing the conduit.

Second, the capacity can readily be adapted to requirements. Thus, while initially only one or two fiber or wire members may be sufficient to carry the traffic, multiple cables may contain a much larger number of ductlets than are required at the time of installation, and further fiber or other members may be inserted later on as and when needed. The support-separator of the present invention is cheap compared to the cost of the fibers, and spare ductlets to accommodate further fibers and/or wires as and when extra capacity is required can thus be readily incorporated without adding more than a small fraction to overall costs.

The method of the U.S. Pat. No. 6,173,107 invention also permits the installation of improved later generations of transmission lines. It is possible, for example, to install at first one or more fiber members incorporating multimode fibers, and at a later date add, or replace the installed multimode fiber members with fiber members incorporating monomode fibers. Installed fiber members may conveniently be withdrawn from the ductlet, and replacement fiber members be inserted by using the aforesaid method of propelling by fluid drag of a gaseous medium.

Alternatively, the support-separators may comprise a plurality of individual tubes enveloped by a common outer sheath.

It will be appreciated that the present invention largely avoids the risk, inherent in handling optical fiber cables with a large number of fibers, of accidentally damaging before or during installation in a single event a large number of expensive optical fibers.

The present invention also enables the installation of continuous optical fibers over several installation lengths without joints.

Furthermore, individual fiber members routed through the conduit can be routed, without requiring fiber joints, into different branches of the conduits at various junction points.

Finally, a unique construction of the blown fiber duct or ductlets is described in WO patent application 01/34366 entitled: "Flexible plastic Tubing Construction Having a Sight Glass Window."

Accordingly, the tubing construction of the invention herein involved is particularly adapted for use in ABF applications and other cable or wire installations wherein the ability to view the cables or wires within the tubing is desired for installation, servicing, or administration. It is possible that the present invention could incorporate the principals of the 01/34366 invention as well.

In another illustrative embodiment of the 01/34366 invention, the tubing (or in the case of the present invention—the lining of the inner central hollow core extending along the length of the support-separator) includes a third sidewall segment formed integrally with the first and second segments as having inner surface, which defines a portion of tubing innermost surface. Such inner surface may be profiled as defining a series of radially-disposed longitudinal splines, ribs, or other projections. With respect to ABF installation, such projections have been observed to reduce surface area contact between the cable and tubing sidewall, which results in corresponding decreased friction as the cable is blown through the tubing. Such projections also develop a lower velocity boundary layer in the gas flow near the surface which has the tendency to direct the fiber into the higher velocity flow towards the center of the tubing. The end result is less drag on the tubing which facilitates long runs and direction changes such as around bends.

Advantages of the 01/34366 invention include a flexible plastic tubing construction which is provided as having a sight-glass capability without affecting the gross fire resistance, electrical conductivity, or other specified chemical without affecting the gross fire resistance, electrical conductivity, or other specified chemical or physical properties of the tubing. Additional advantages include a tubing construction which is economical to manufacture in long, continuous lengths, and which further is particularly adapted for use in ABF installations. These and other advantages will be readily apparent to those skilled in the art based upon the disclosure contained herein.

As described above, an additional purpose of the present invention is to form and allow the central hollow region of the support separator spacers of the communications cables to act as a duct for ABF in the event this is desirable for installation purposes. The materials used to construct the support separators can be solid, semi-solid, foamed, foamed with a solid skin, or hollow. The lining of the central hollow region can be composed of polybutylene terephthalate (PBT) or other known materials capable of providing a sufficient combination of lubricity and friction to ensure proper accommodation of blown fiber "post" installation. There may be a separate inner lining within the central ring portion and it is always possible that the inner lining can be used such as shown in FIG. 1B.

Many precautions are taken to resist the spread of flame and the generation of and spread of smoke throughout a building in case of an outbreak of fire. Clearly, cables must be designed to protect against loss of life and also minimize the costs of a fire due to the destruction of electrical and other equipment. Therefore, wires and cables for building installations are required to comply with the various flammability requirements of the National Electrical Code (NEC) in the U.S. as well as International Electrotechnical Commission (EIC) and/or the Canadian Electrical Code (CEC).

Cables intended for installation in the air handling spaces (i.e. plenums, ducts, etc.) of buildings are specifically required by NEC/CEC/IEC to pass the flame test specified by Underwriters Laboratories Inc. (UL), UL-910, or its Canadian Standards Association (CSA) equivalent, the FT6. The UL-910 and the FT6 represent the top of the fire rating hierarchy established by the NEC and CEC respectively. Also important are the UL 1666 Riser test and the IEC 60332-3C and D flammability criteria. Cables possessing these ratings, generically known as "plenum" or "plenum rated" or "riser" or "riser rated", may be substituted for cables having a lower rating (i.e. CMR, CM, CMX, FT4, FTI or their equivalents), while lower rated cables may not be used where plenum or riser rated cables are required. Future ratings include the CMP-50 standard which is considered to the European requirement of the future.

Cables conforming to NEC/CEC/IEC requirements are characterized as possessing superior resistance to ignitability, greater resistance to contribute to flame spread and generate lower levels of smoke during fires than cables having lower fire ratings. Often these properties can be anticipated by the use of measuring a Limiting Oxygen Index (LOI) for specific materials used to construct the cable. Conventional designs of data grade telecommunication cable for installations in plenum chambers have a low smoke generating jacket material, e.g. of a specially filled PVC formulation or a fluoropolymer material, surrounding a core of twisted conductor pairs, each conductor individually insulated with a fluorinated insulation layer. Cable produced as described above satisfies recognized plenum test requirements such as the "peak smoke" and "average smoke" requirements of the Underwriters Laboratories, Inc., UL910 Steiner tunnel test and/or Canadian Standards Association CSA-FT6 (Plenum Flame Test) while also achieving desired electrical performance in accordance with EIA/TIA-568A for high frequency signal transmission.

While the above described conventional cable, including the Belden 1711A cable design, due in part to their use of fluorinated polymers, meets all of the above design criteria, the use of fluorinated polymers is extremely expensive and may account for up to 60% of the cost of a cable designed for plenum usage. A solid core of these communications cables contributes a large volume of fuel to a potential cable fire. Forming the core of a fire resistant material, such as with FEP (fluorinated ethylene-propylene), is very costly due to the volume of material used in the core, but it should help reduce flame spread over the 20 minute test period. Reducing the mass of material by redesigning the core and separators within the core is another method of reducing fuel and thereby reducing smoke generation and flame spread. For the commercial market in Europe, low smoke fire retardant polyolefin materials have been developed that will pass the EN (European Norm) 502666-Z-X Class B relative to flame spread, total heat release, related heat release, and fire growth rate. Prior to this inventive development, standard cable constructions requiring the use of the aforementioned expensive fluorinated polymers, such as FEP, would be needed to pass this rigorous test. Using low smoke fire retardant polyolefins or foamed low smoke semi-rigid PVC for specially designed separators used in cables that meet the more stringent electrical requirements for Categories 6 and 7 and also pass the new norm for flammability and smoke generation is also a further subject of the present invention.

Solid flame retardant/smoke suppressed polyolefins may also be used in connection with fluorinated polymers. Commercially available solid flame retardant/smoke suppressed polyolefin compounds all possess dielectric properties inferior to that of FEP and similar fluorinated polymers. In addition, they also exhibit inferior resistance to burning and generally produce more smoke than FEP under burning conditions. A combination of the two different polymer types can reduce costs while minimally sacrificing physio-chemical properties. An additional method that has been used to improve both electrical and flammability properties includes the irradiation of certain polymers that lend themselves to crosslinking. Certain polyolefins are currently in development that have proven capable of replacing fluoropolymers for passing these same stringent smoke and flammability tests for cable separators, also known as "cross-webs". Dual insulation designs as previously mentioned are also useful in this application. Additional advantages with the polyolefins are reduction in cost and toxicity effects as measured during and after combustion.

Current separator designs must also meet the UL 910 flame and smoke criteria using both fluorinated and non-fluorinated jackets as well as fluorinated and non-fluorinated insulation materials for the conductors of these cable constructions. In Europe, the trend continues to be use of halogen free insulation for all components, which also must meet stringent flammability regulations. The test in Europe which the present inventive separators and subsequent cables should also pass is known as "B-1".

A high performance communications data cable utilizing twisted pair technology must meet exacting specification with regard to data speed, electrical, as well as flammability and smoke characteristics. The electrical characteristics include specifically the ability to control impedance, near-end cross-talk (NEXT), ACR (attenuation cross-talk ratio) and shield transfer impedance. A method used for twisted pair data cables that has been tried to meet the electrical characteristics, such as controlled NEXT, is by utilizing individually shielded twisted pairs (ISTP). These shields insulate each pair from NEXT. Data cables have also used very complex lay techniques to cancel E and B (electric and magnetic fields) to control NEXT. In addition, previously manufactured data cables have been designed to meet ACR requirements by utilizing very low dielectric constant insulation materials. Use of the above techniques to control electrical characteristics have inherent problems that have lead to various cable methods and designs to overcome these problems.

Recently, the development of "high-end" electrical properties for Category 6 and 7 cables has increased the need to determine and include power sum NEXT (near end crosstalk) and power sum ELFEXT (equal level far end crosstalk) considerations along with attenuation, impedance, and ACR values. These developments have necessitated the development of more highly evolved separators that can provide offsetting of the electrical conductor pairs so that the lessor performing electrical pairs can be further separated from other pairs within the overall cable construction.

Recent and proposed cable standards are increasing cable maximum frequencies from 100–200 MHz to 250–700 MHz. In the case of the present invention, the intention is to meet design criteria so that the conductors are capable of carrying signals at or above 10 GHz. The maximum upper frequency of a cable is that frequency at which the ACR (attenuation/cross-talk ratio) is essentially equal to 1. Since attenuation increases with frequency and cross-talk decreases with frequency, the cable designer must be innovative in designing a cable with sufficiently high cross-talk. This is especially true since many conventional design concepts, fillers, and spacers may not provide sufficient cross-talk at the higher frequencies.

Individual shielding is costly and complex to process. Individual shielding is highly susceptible to geometric instability during processing and use. In addition, the ground plane of individual shields, 360° in ISTP's—individually shielded twisted pairs—is also an expensive process. Lay techniques and the associated multi-shaped anvils of the present invention to achieve such lay geometries are also complex, costly and susceptible to instability during processing and use. Another problem with many data cables is their susceptibility to deformation during manufacture, installation, and use. Deformation of the cable geometry, such as the shield, also potentially severely reduces the electrical and optical consistency. The "cross-web" designs currently in use provide primarily an unshielded pair, but it increases EMI/RFI shielding effectiveness, the present invention includes the use of "shielded cross-webs". The cross-web design allows for separation that benefits electrical properties allowing for proper spacing between conductors whereas shielding of the entire cable using a shielding barrier between the separator and a jacket allows for overall shielding effectiveness especially from exterior EMI/RFI sources.

Optical fiber cables exhibits a separate set of needs that include weight reduction (of the overall cable), optical functionality without change in optical properties and mechanical integrity to prevent damage to glass fibers. For multi-media cable, i.e. cable that contains both metal conductors and optical fibers, the set of criteria is often incompatible. The use of the present invention, however, renders these often divergent set of criteria compatible. Specifically, optical fibers must have sufficient volume in which the buffering and jacketing plenum materials (FEP and the like) covering the inner glass fibers can expand and contract over a broad temperature range without restriction, for example −40 C to 80 C experienced during shipping. It has been shown by that cyclical compression and expansion directly contacting the buffered glass fiber causes excess attenuation light loss (as measured in dB) in the glass fiber. The design of the present invention allows for designation and placement of optical fibers in clearance channels provided by the support-separator. It would also be possible to place both glass fiber and metal conductors in the same designated clearance channel if such a design is required. In either case the forced spacing and separation from the cable jacket (or absence of a cable jacket) would eliminate the undesirable set of cyclical forces that cause excess attenuation light loss. In addition, fragile optical fibers are susceptible to mechanical damage without crush resistant members (in addition to conventional jacketing). The present invention also addresses this problem and allows for "air" blown fiber ducts for installation of fiber optics at a later time in existing installations. Here "air" refers to any gas that can be used to convey fiber down the duct (or "tube"—an empty or hollow section of the separator).

The need to continue improving cable and cable separator designs by reducing costs and improving mechanical and electrical properties as well as flammability continues to exist.

SUMMARY OF THE INVENTION

This invention provides a lower cost communications cable and/or a support separator for the communications cable exhibiting improved electrical, flammability, and optionally, optical properties. The cable or separator or cable with one or more separators have interior support(s) extending along the longitudinal length of the communications cable. The interior support has a central region extending along the longitudinal length of the interior support. In a preferred configuration, the cable includes a geometrically symmetrical core with a central circular ring region with various extending protrusions for pair separation and derivatives thereof. The central ring portion can optionally include a hollow region to act as an air blown fiber (ABF) duct which is available for filling with optical fiber.

In the present invention it is also desirable to provide a circular ring region which is surrounded by rounded lobes in a symmetric diamond-like geometry and derivatives thereof that define as many as four separate regions for pairs that are properly separated in the final (often jacketed) cable design. Again the central ring portion can optionally include a hollow region to act as an air blown fiber (ABF) duct which is available for filling with optical fiber.

A third embodiment of the present invention provides a hollow four-petal or "daisy" shaped arrangement with a central core that may or may not be hollow and derivatives thereof—again to allow for pair separation. Individual or paired conductors are placed within the hollow petals as required depending on electrical, mechanical, and flammability design requirements. If the central region is hollow, the possibility again exists for that region to act as an air blown fiber (ABF) duct which is available for filling with optical fiber.

Still another embodiment of the present invention is to provide a cross-like arrangement of varying geometric designs and derivatives thereof. One such arrangement is a more conventional cross-like separator section with "rifled" sections extending outward into four quadrants away from the central region. This rifled cross is then encased or covered within an outer insulated layer which is itself shaped in an identical cross except that the dimensions of this outer cross is larger than the rifled inner cross and functions as a "skin". In this manner the separator uses less material than a conventional cross separator and thus reduces the BTU content within a jacketed (or even an unjacketed) cable.

Yet another embodiment includes providing variations on the cross-like arrangement by adding "zig-zag" with and without "sickle-like" endings regions instead of the "rifled" sections extending outward into four quadrants away from the central region as described above.

The core support-separator is optionally foamed, semi-solid, solid skin over foam or hollow and has an optional hollow center. The rifled cross separator profiles with ladder-like "step-sections" are similar to standard "X" supports with the major difference that they include step sections that lie under a solid insulation along the radially extending portions of the support. This provides for a hollow-cross-like support separator that includes less overall material weight, thereby reducing potential BTU content and thus reduces the risk of flame spread in a fire scenario.

These various shaped sections of the core support-separator may be helixed as the core extends along the length of the communications cable. Each of the adjacent shaped sections defines a clearance or clearance channel which extends along the longitudinal length of the multi-anvil shaped core support-separator. The clearance provides a channel for each of the conductors/optical fibers or conductor pairs used within the cable. The clearance channels formed by the various shaped core support-separators extend along the same length of the central portion. The channels are either semi-circular, fully circular, or stepped in a circular-like manner shaped cross-section with completely closed surfaces in the radial direction toward the center portion of the core and optionally opened or closed surfaces at the outer radial portion of the same core. Adjacent channels are separated from each other to provide a chamber for at least a pair of conductors or an optical fiber or optical fibers.

Additionally, to provide a duct for ABF, the central regions of the separators can be hollow to allow for "post installation" of optical fibers.

The various shaped core support-separators of this invention provides a superior crush resistance to the protrusions of the standard "X" or other similar supports. A superior crush resistance is obtained by the circular and arch-like design for separators that provide clearance channels for additional support to the outer section of the cable. The various shaped cores better preserves the geometry of the pairs relative to each other and of the pairs relative to the other parts of the cables, such as the possible use of a shield or optical fibers. The circular shape provides an exterior surface that essentially establishes the desired roundness for cable manufacturers. The exterior roundness ensures ease of die development and eventual extrusion. The rounded surface of the core also allows for easy accommodation of an overall external shield.

The four-pedal or daisy shape separator sections provide similar crush resistance to the standard "X" supports with the additional feature that the center portion of the separator may have hollow sections for the use blown finer ducts. Additionally, these supports carry the conductors inside hollow sections offering an additional level of mechanical integrity.

Additionally, the daisy shaped separator may include the use of single or double sided PET-Aluminum film which is as much as 0.004" (4 mil) in thickness to further provide shielding effectiveness and provide ingress of attenuated signals. It is also possible, in this geometry to include twisted pair conductors between the individual hollow petals such that separation between twisted pair conductors can be accomplished in this manner.

The conductors can be set apart in each of these unique geometries so that individual or sets of pairs can be spaced closer or farther apart from one another, allowing for better power sum values of equal level far end and near end crosstalk. This "offsetting" between conductor pairs in a logical, methodological pattern to optimize electrical properties is an additional benefit associated with the cross-shaped separators that include "zig-zag" and sickle-like sections.

According to one embodiment, the cable includes a plurality of transmission media with metal and/or optical conductors that are individually disposed; and an optional outer jacket maintaining the plurality of data transmission media in proper position with respect to the core. The core is comprised of a support-separator having various shaped profiles that define a clearance to maintain spacing between transmission media or transmission media pairs in the finished cable. The core may be formed of a conductive or insulative material to further reduce cross-talk, impedance and attenuation.

Accordingly, the present invention provides for a communications cable, with specifically shaped support-separators, that meet the exacting specifications of high performance data cables and/or fiber optics or the possibility of including both transmission media in one cable, has a superior resistance to deformation during manufacturing and use, allows for control of near-end cross-talk, controls electrical instability due to shielding, is capable of 200 and 600 MHz (Categories 6 and 7) transmission and possibly up to or greater than 1 GHz, with a positive attenuation to cross-talk ratio (ACR ratio) of typically 3 to 10 dB.

Moreover, the present invention provides a separator so that the jacket material (which normally has inferior electrical properties as compared with the conductor material) is actually pushed away from the electrical conductor, thus acting to again improve electrical performance (ACR, etc.) over the life of the use of the cable. These separators, by simple geometric considerations are also superior to the "X" type separator in that they also increase the physical distance between the conductor pairs within the same cable configuration, as shown in FIGS. 7A and B.

Additionally, it has been known that the conductor pair may actually have physical or chemical bonds that allow for the pair to remain intimately bound along the length of the cavity in which they lie. The present invention describes a means by which the conductor pairs are adhered to or forced along the cavity walls by the use of grooves that may exist within the inner diameters of the circular ring and daisy-like geometries. This again increases the distance, thereby increasing the volume of air or other dielectrically superior medium between conductors in separate cavities. As discussed above, spacing between pairs, spacing away from jackets, and balanced spacing all have an effect on final electrical cable performance.

It is an object of the invention to provide a data/multimedia cable that has a specially designed interior support that accommodates conductors with a variety of AWG's, impedances, improved crush resistance, controlled NEXT, controlled electrical instability due to shielding, increased breaking strength, and allows the conductors, such as twisted pairs, to be spaced in a manner to achieve positive ACR ratios.

It is still another object of the invention to provide a cable that does not require individual shielding and that allows for the precise spacing of conductors such as twisted pairs and/or fiber optics with relative ease. In the present invention, the cable would include individual glass fibers as well as conventional metal conductors as the transmission medium that would be either together or separated in clearance channel chambers provided by the various shaped sections of the core support-separator.

Another embodiment of the invention includes having various geometrically shaped core support-separators with a central region that is either solid or partially solid. This includes the use of a foamed core and/or the use of a hollow center of the core, which in both cases significantly reduces the material required along the length of the finished cable. The effect of foaming and/or producing a support-separator with a hollow center portion should result in improved flammability of the overall cable by reducing the amount of material available as fuel for the UL 910 test, improved electrical properties for the individual non-optical conductors, and reduction of weight of the overall cable.

Additionally, the optical fibers could be present or later blown into center hollow core sections (where they exist) of the support-separators. The hollow center allows for the possible use with ABF—blown fiber ducts that allow for "post-installation" of the fiber (in any form).

Yet another embodiment of the invention allows for interior corrugated clearance channels provided by the sections of the core support-separators. This corrugated internal section has internal axial grooves that allow for separation of conductor pairs from each other or even separation of single conductors from each other as well as separation of optical conductors from conventional metal conductors. Alternatively, the edges of said grooves may allow for separation thus providing a method for uniformly locating or spacing the conductor pairs with respect to the channel walls instead of allowing for random floating of the conductor pairs.

Alternatively, depending on manufacturing capabilities, the use of a tape or polymeric binding sheet(s) may be necessary in lieu of extruded thermoplastic jacketing.

Yet another related embodiment includes the use of a strength member together with, but outside of the core support-separator running parallel in the longitudinal direction along the length of the communications cable. In a related embodiment, the strength member could be the core support-separator itself, or in an additional related embodiment, the strength member could be inserted in the hollow center-portion of the core in lieu of a duct or ductlet for blown fiber.

It is to be understood that each of the embodiments above could include a flame-retarded, smoke suppressant version and that each could include the use of recycled or reground thermoplastics in an amount up to 100%.

A method of producing the communications cable, introducing any of the multi-shaped core separators as described above, into the cable assembly, is described as first passing a plurality of transmission media and a core through a first die which aligns the plurality of transmission media with surface features of the core and prevents or intentionally allows twisting motion of the core. Next, the method bunches the aligned plurality of transmission media and core using a second die which forces each of the plurality of the transmission media into contact with the surface features of the core that maintain a spatial relationship between each of a plurality of transmission media. Finally, the bunched plurality of transmission media and core are optionally twisted to close the cable, and the closed cable may be optionally jacketed.

Other desired embodiments, results, and novel features of the present invention will become more apparent from the following drawings and the accompanying preferred embodiments.

BRIEF DESCRIPTION OF THE DRAWINGS

FIG. 6A has no inner ring, FIG. 6B has a smooth inner ring with optionally different material than the outer ring, and FIG. 6C has an inner ring with rifled sections. Each can optionally be used for coax or twisted pair as well as for fiber optic conductors in advance, during, or after installation.

FIGS. 10A and 10B include views of optionally filled inner hollow regions such that each can optionally be used for coax or twisted pair as well as for fiber optic conductors (in advance, during or after installation). FIG. 10A includes a view of this design including the optional addition of one or more conductors including optionally organic or inorganic fibers such as polyamide (for example Kevlar®) filling and an optional strength member within the second inner ring (that may or may not be rifled). FIG. 10B includes a view of this design including the optional addition of coaxial cable in the hollow center region.

DETAILED DESCRIPTION

The following description will further help to explain the inventive features of the cable and the interior support portion of the cable.

Figure 1A:
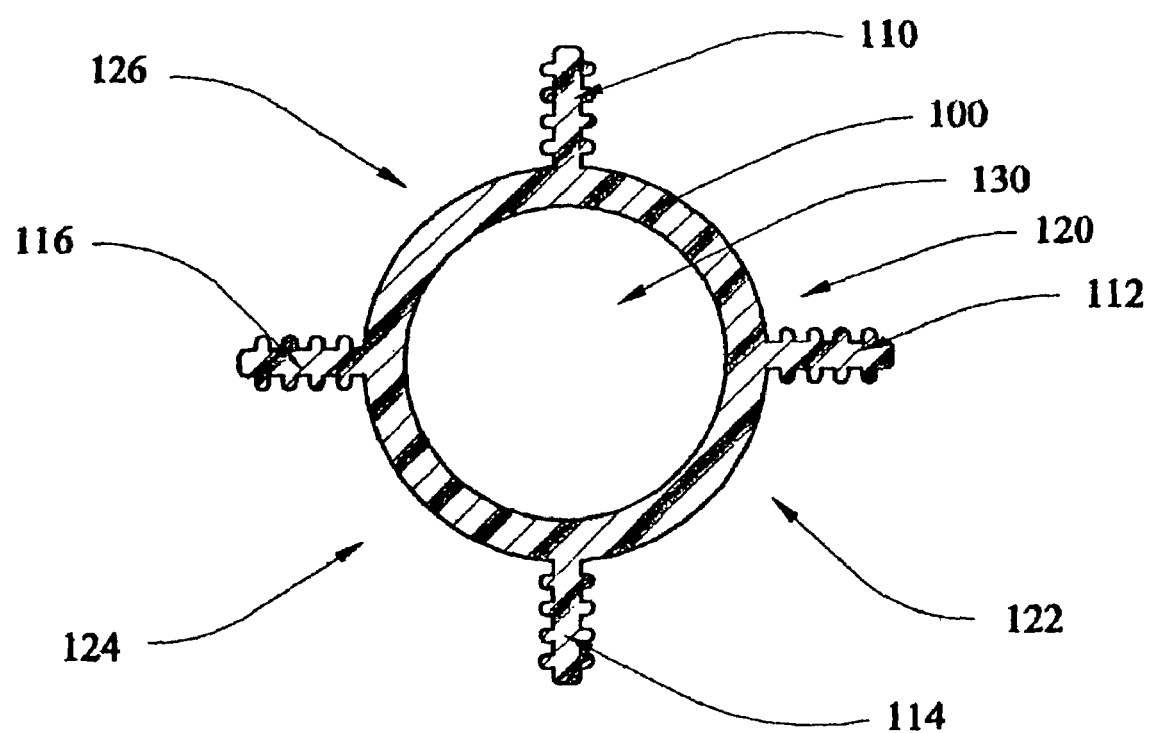
FIG. 1A is a cross-section view of one embodiment of the cable support-separator that includes a symmetrical core with a central circular ring region with four extending rifled protrusions each extending in a preferred 90 degree separation from each other for optimum pair separation. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 1A is a cross-section view of one embodiment of the cable support-separator that includes a symmetrical core with a central circular ring region (100) with four extending rifled protrusions (110, 112, 114, 116) each extending in a preferred 90 degree separation from each other for optimum pair separation. The optimum pair separation is gained by placing pairs between the four extending rifled protrusions in regions 120, 122, 124, and 126. The central circular ring portion (100) optionally includes a hollow region (130) to act as an air blown fiber (ABF) duct which is available for filling with optical fiber which is comprised of solid, semi-solid, foamed or hollow polymeric smooth internal and external surfaces.

Figure 1B:
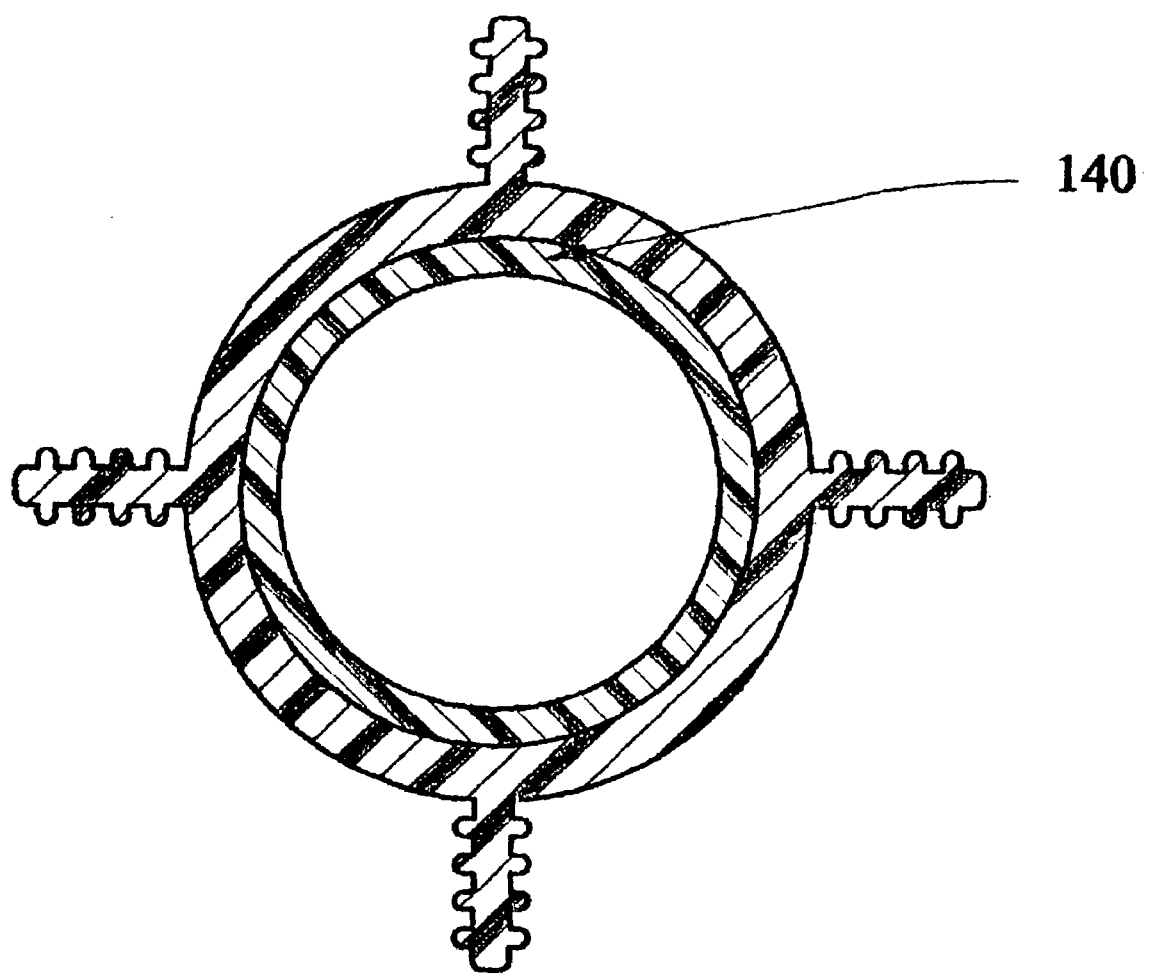
FIG. 1B is a cross-section view of a second embodiment of the cable support-separator that includes the same symmetrical core with a central circular ring region as for FIG. 1A, but also includes a second inner ring within the hollow region comprised of a different material than the outer ring for either increasing lubricity or friction with four extending rifled protrusions each extending in a preferred 90 degree separation from each other for optimum pair separation.

FIG. 1B is a cross-section view of a second embodiment of the cable support-separator that includes the same symmetrical core with a central circular ring region as for FIG. 1A, but also includes a second inner ring (140) within the hollow region comprised of a different material than the outer ring for either increasing lubricity or friction with four extending rifled protrusions each extending in a preferred 90 degree separation from each other for optimum pair separation.

Figure 1C:
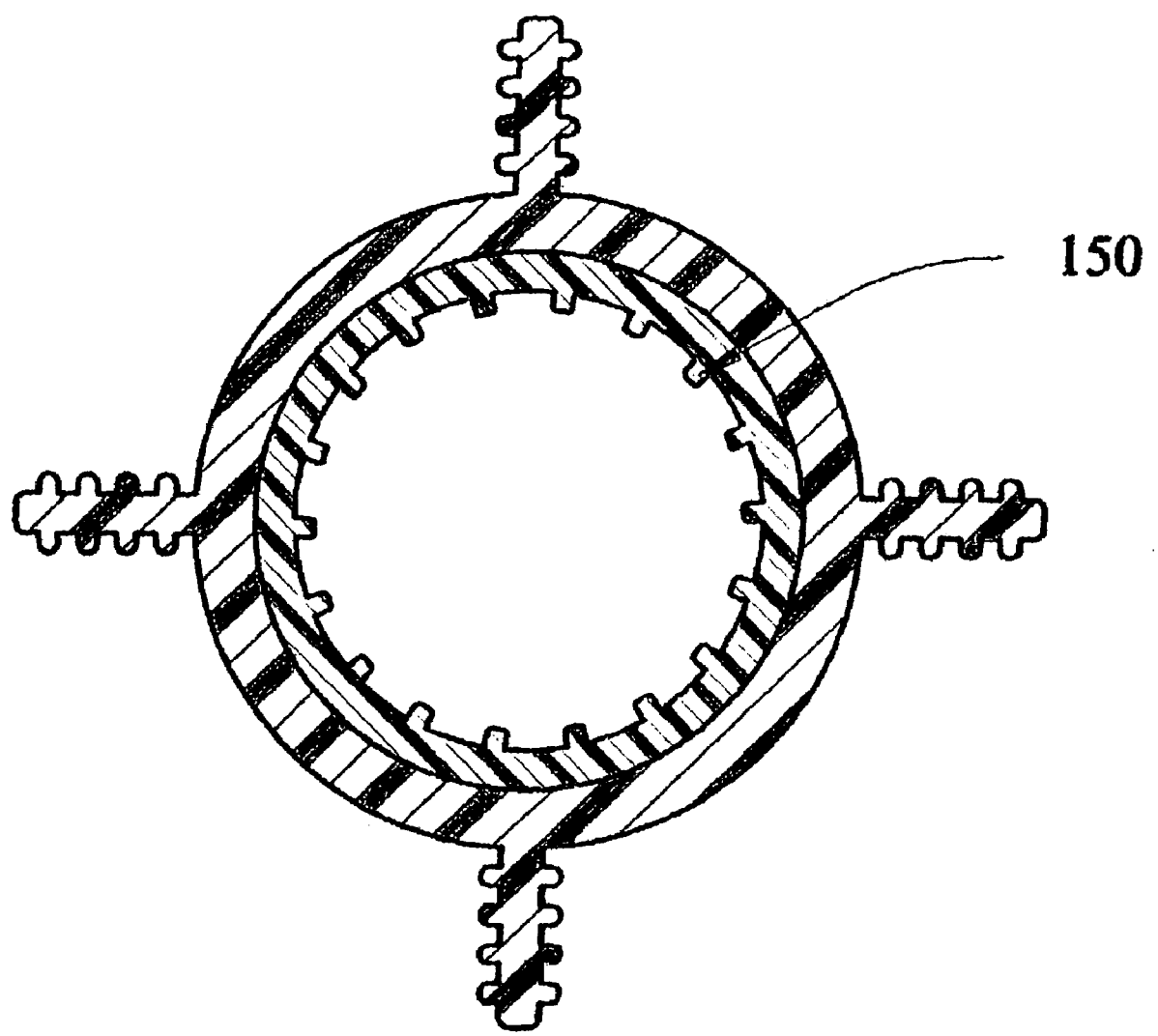
FIG. 1C is a cross-section view of a third embodiment of the cable support-separator that includes the same symmetrical core with a central circular ring region as for FIG. 1A, but also includes a second inner ring within the hollow region comprised of a different material than the outer ring for increasing friction utilizing rifled inner spatially arranged sections with four extending rifled protrusions each extending in a preferred 90 degree separation from each other for optimum pair separation.

FIG. 1C is a cross-section view of a third embodiment of the cable support-separator that includes the same symmetrical core with a central circular ring region as for FIG. 1A, but also includes a second inner ring within the hollow region comprised of a different material than the outer ring for increasing friction utilizing rifled inner spatially arranged sections (150) with four extending rifled protrusions each extending in a preferred 90 degree separation from each other for optimum pair separation.

Figure 1D:
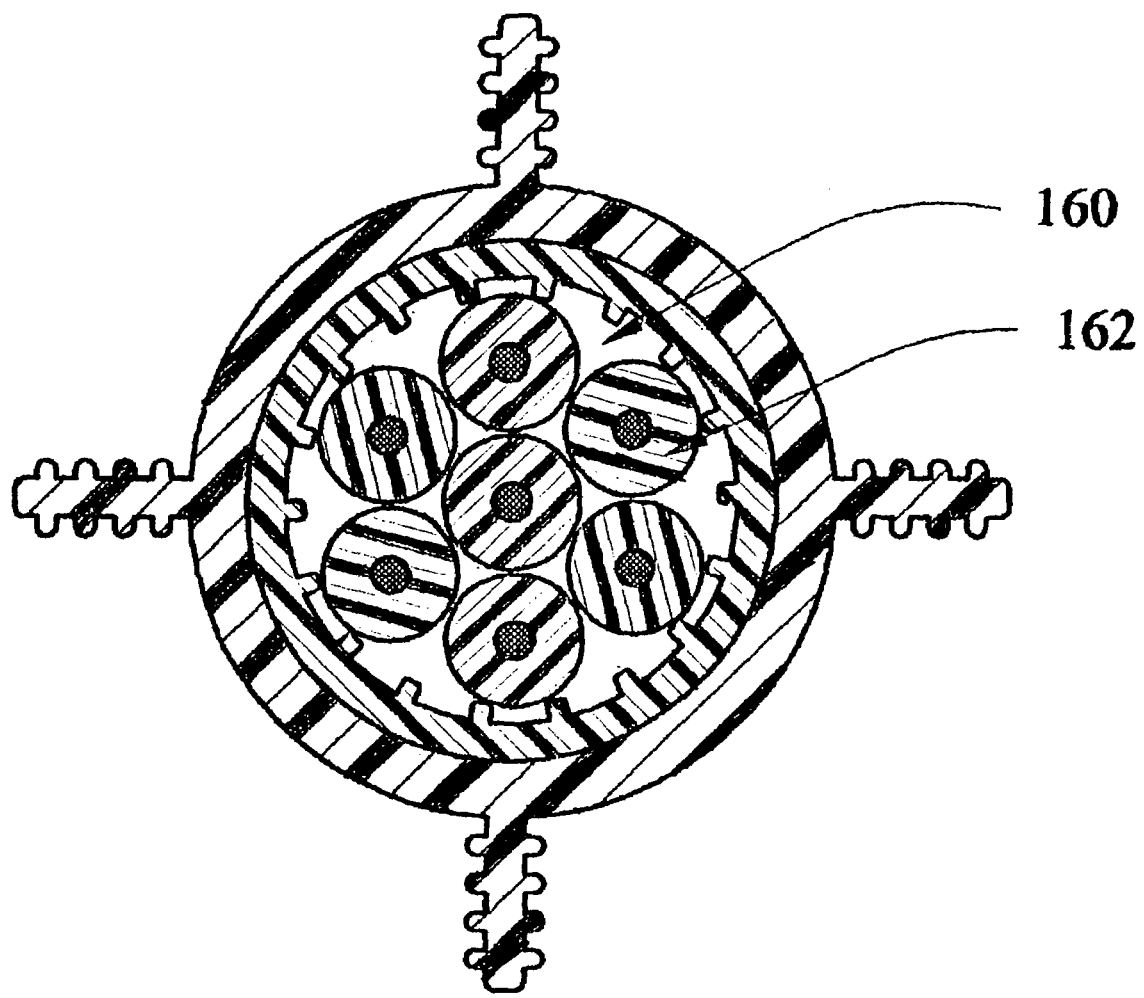
FIG. 1D is a cross-section view of a third embodiment of the cable support-separator that includes the same symmetrical core with a central circular ring region as for FIG. 1C, but also includes the optional use of a organic or inorganic fibers including polyamide (for example Kevlar®) filling and an optional strength member within the second inner ring within the hollow region comprised of a different material than the outer ring as well as allowing for multiple separate multimode or single mode fiber optic units also contained within the same hollow region with four extending rifled protrusions each extending in a preferred 90 degree separation from each other for optimum pair separation.

FIG. 1D is a cross-section view of a fourth embodiment of the cable support-separator that includes the same symmetrical core with a central circular ring region as for FIG. 1C, but also includes the optional use of a organic or inorganic fibers (160) including polyamide (for example Kevlar®) filling and an optional strength member within the second inner ring within the hollow region comprised of a different material than the outer ring as well as allowing for multiple separate multimode or single mode fiber optic units (162) also contained within the same hollow region with four extending rifled protrusions each extending in a preferred 90 degree separation from each other for optimum pair separation.

Figure 1E:
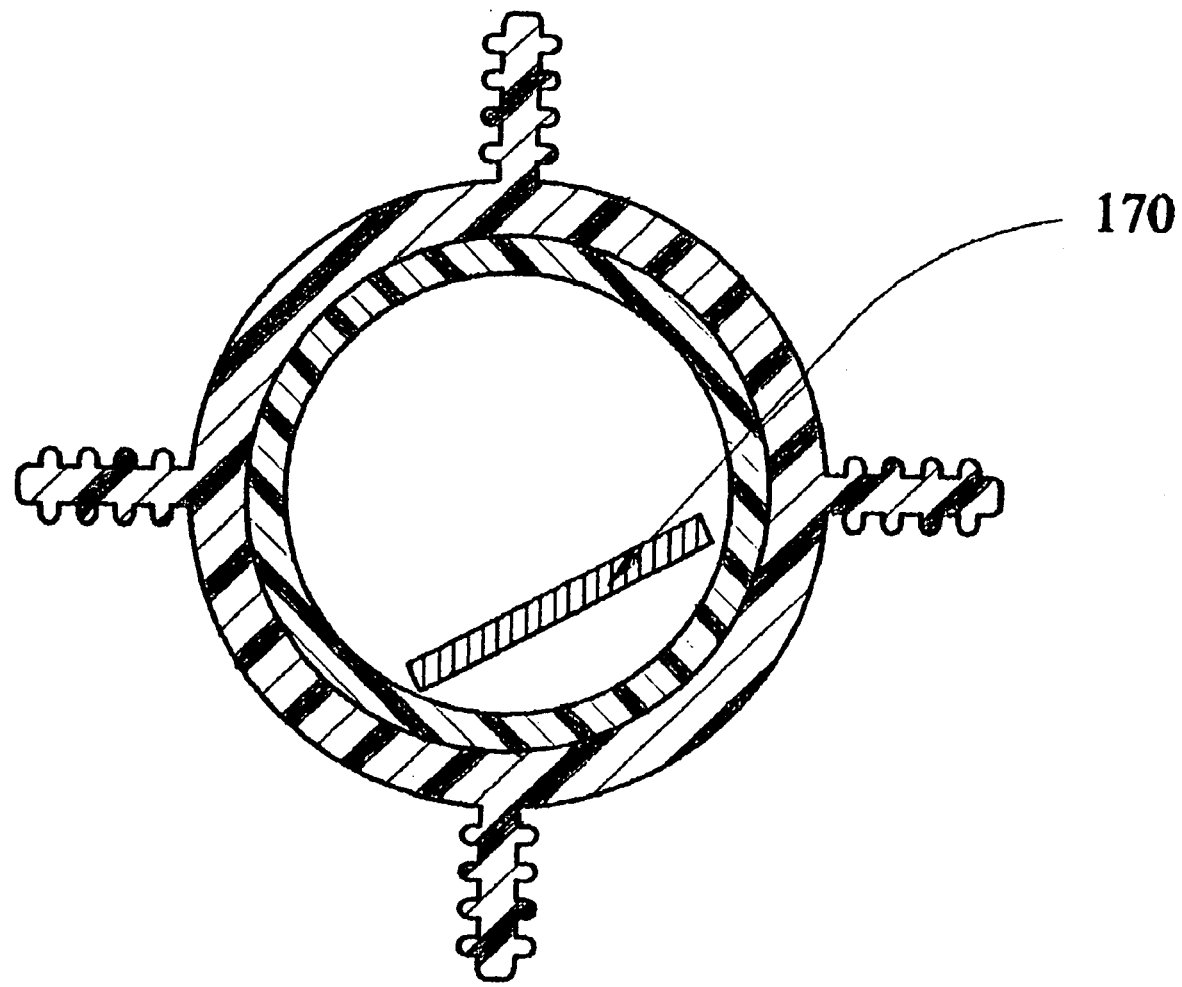
FIG. 1E is a cross-section view of a fifth embodiment of the cable support-separator that includes the same symmetrical core with a central circular ring region as for FIG. 1B and also includes an inner pull tape for attaching optical fibers or metallic conductors wherein the tape optionally itself incorporates a grip or for which a grip is provided for future pulling of those communication media through the hollow region at some future time or during an installation with four extending rifled protrusions each extending in a preferred 90 degree separation from each other for optimum pair separation.

FIG. 1E is a cross-section view of a fifth embodiment of the cable support-separator that includes the same symmetrical core with a central circular ring region as for FIG. 1B and also includes an inner pull tape (170) for attaching optical fibers or metallic conductors wherein the tape optionally itself incorporates a grip or for which a grip is provided for future pulling of those communication media through the hollow region at some future time or during an installation with four extending rifled protrusions each extending in a preferred 90 degree separation from each other for optimum pair separation.

Figure 1F:
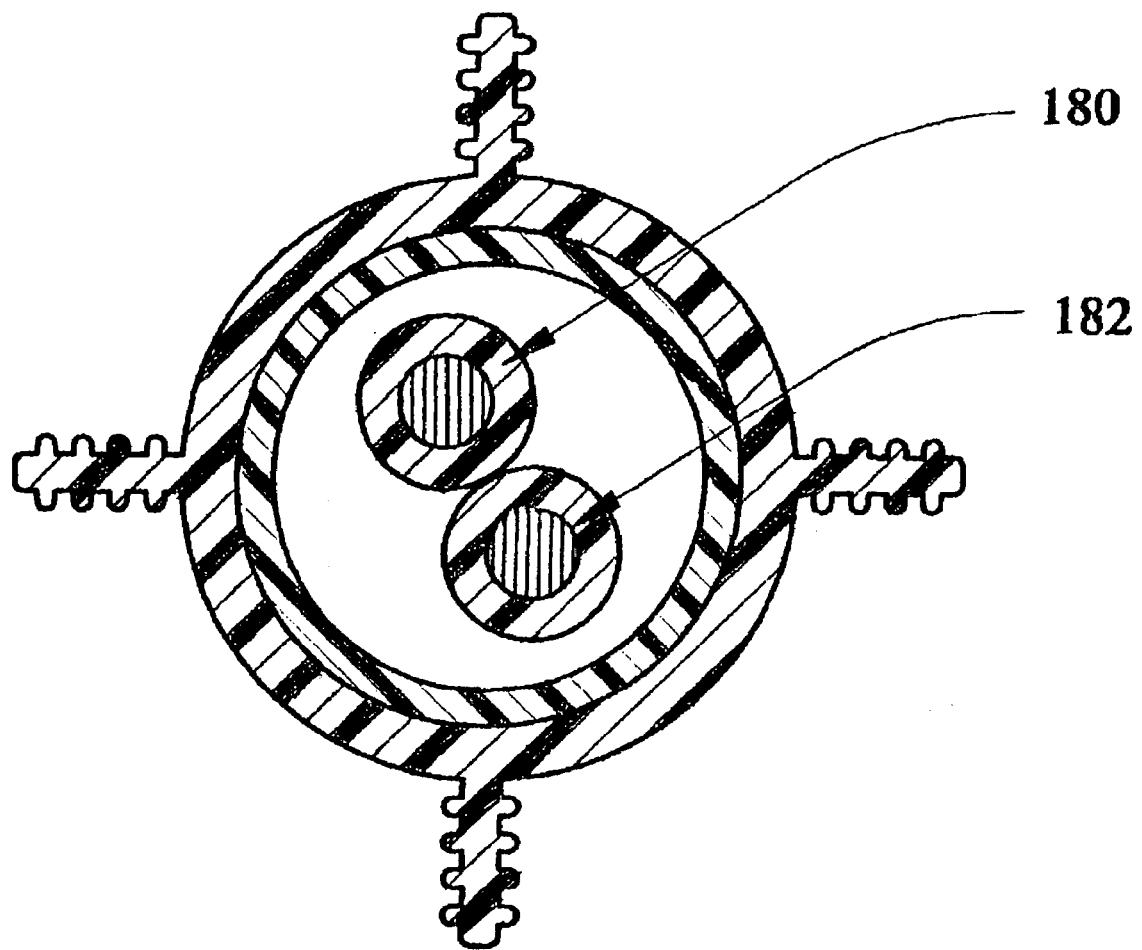
FIG. 1F is a cross-section view of a sixth embodiment of the cable support-separator that includes the same symmetrical core with a central circular ring region as for FIG. 1B but also two individual conductors (which may be twisted) inside the second inner ring which is smooth instead of rifled within the hollow region and comprised of a different material than the outer ring as well as allowing for multiple separate multimode or single mode fiber optic units also contained within the same hollow region with four extending rifled protrusions each extending in a preferred 90 degree separation from each other for optimum pair separation.

FIG. 1F is a cross-section view of a sixth embodiment of the cable support-separator that includes the same symmetrical core with a central circular ring region as for FIG. 1B but also two individual conductors (180 and 182) (which may be twisted) inside the second inner ring which is smooth instead of rifled within the hollow region and comprised of a different material than the outer ring as well as allowing for multiple separate multimode or single mode fiber optic units also contained within the same hollow region with four extending rifled protrusions each extending in a preferred 90 degree separation from each other for optimum pair separation.

Figure 1G:
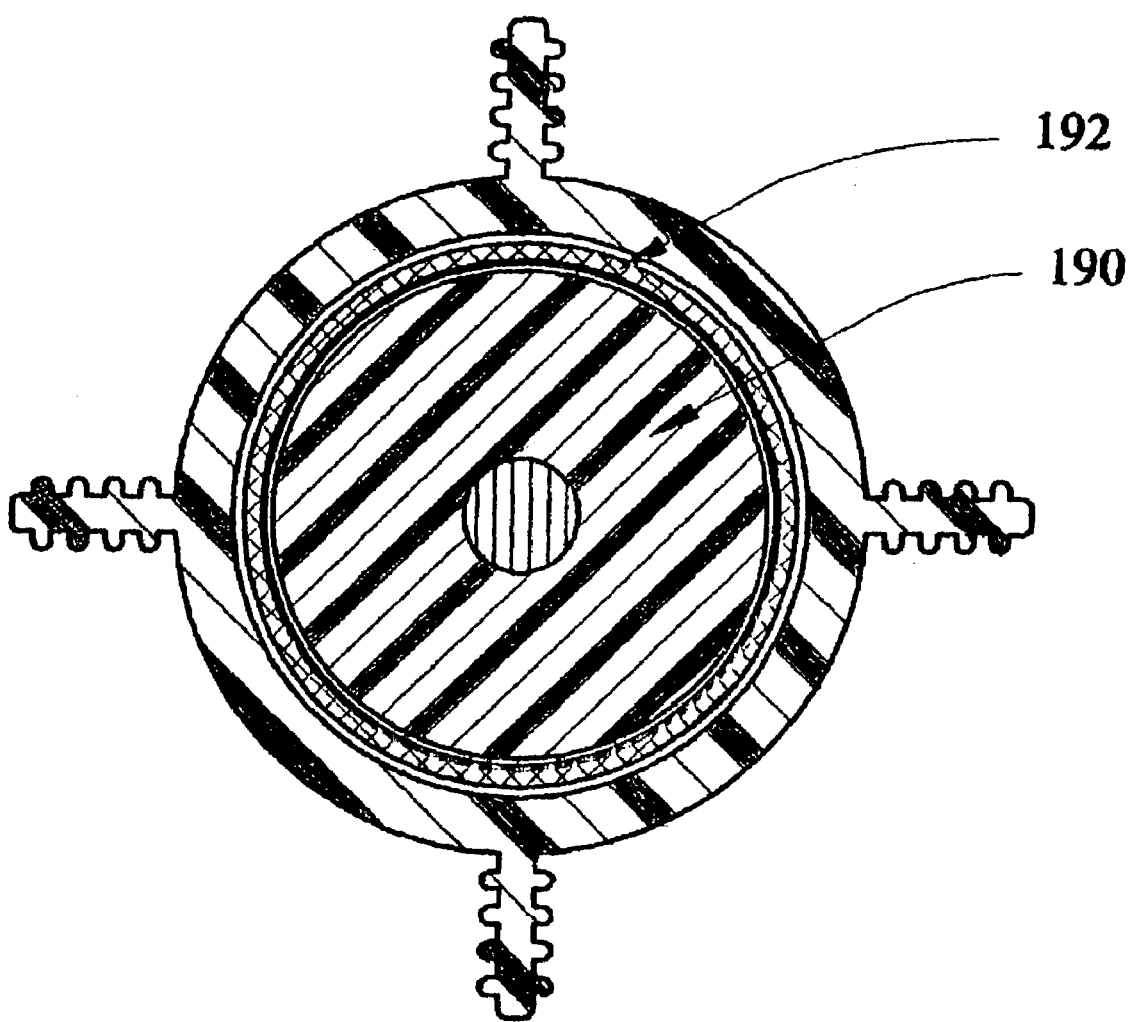
FIG. 1G is a cross-section view of a seventh embodiment of the cable support-separator that includes the same symmetrical core with a central circular ring region as for FIG. 1A with four extending rifled protrusions each extending in a preferred 90 degree separation from each other for optimum pair separation, but also includes the optional addition of one or more coaxial conductors contained in the center hollow region.

FIG. 1G is a cross-section view of a seventh embodiment of the cable support-separator that includes the same symmetrical core with a central circular ring region as for FIG. 1A with four extending rifled protrusions each extending in a preferred 90 degree separation from each other for optimum pair separation, but also includes the optional addition of one or more coaxial conductors (190) with a tinned copper braided shield (192).

Figure 2A:
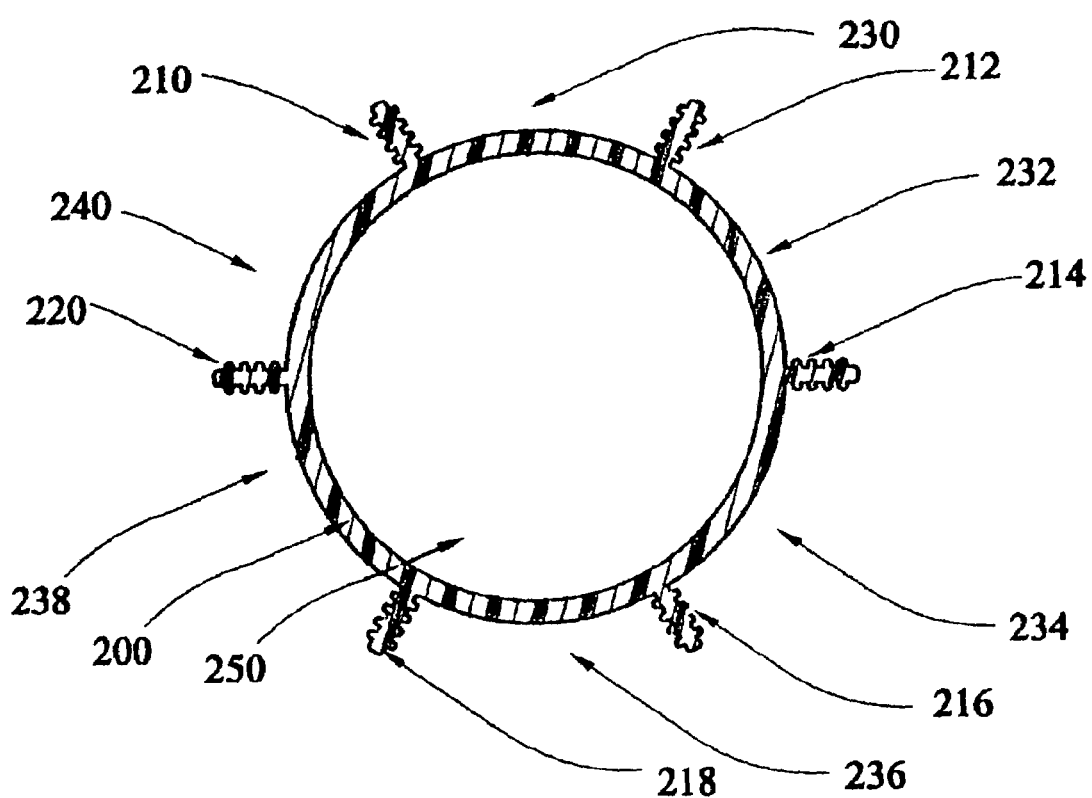
FIG. 2A is a cross-section view of an another embodiment of the cable support-separator that includes the same symmetrical core with a central circular ring region as for FIG. 1A but possesses 6 instead of 4 rifled protrusions each extending in a preferred degree separation from each other for optimum pair separation.

FIG. 2A is a cross-section view of an another embodiment of the cable support-separator that includes the same symmetrical core with a central circular ring region as for FIG. 1A but possesses 6 instead of 4 rifled protrusions (210, 212, 214, 216, 218, 220) each extending in a preferred degree separation from each other for optimum pair separation. The optimum pair separation is gained by placing pairs between the six extending rifled protrusions in regions 230, 232, 234, 236, 238, and 240. The central circular ring portion (200) optionally includes a hollow region (250) to act as an air blown fiber (ABF) duct which is available for filling with optical fiber which is comprised of solid, semi-solid, foamed or hollow polymeric smooth internal and external surfaces.

Figure 2B:
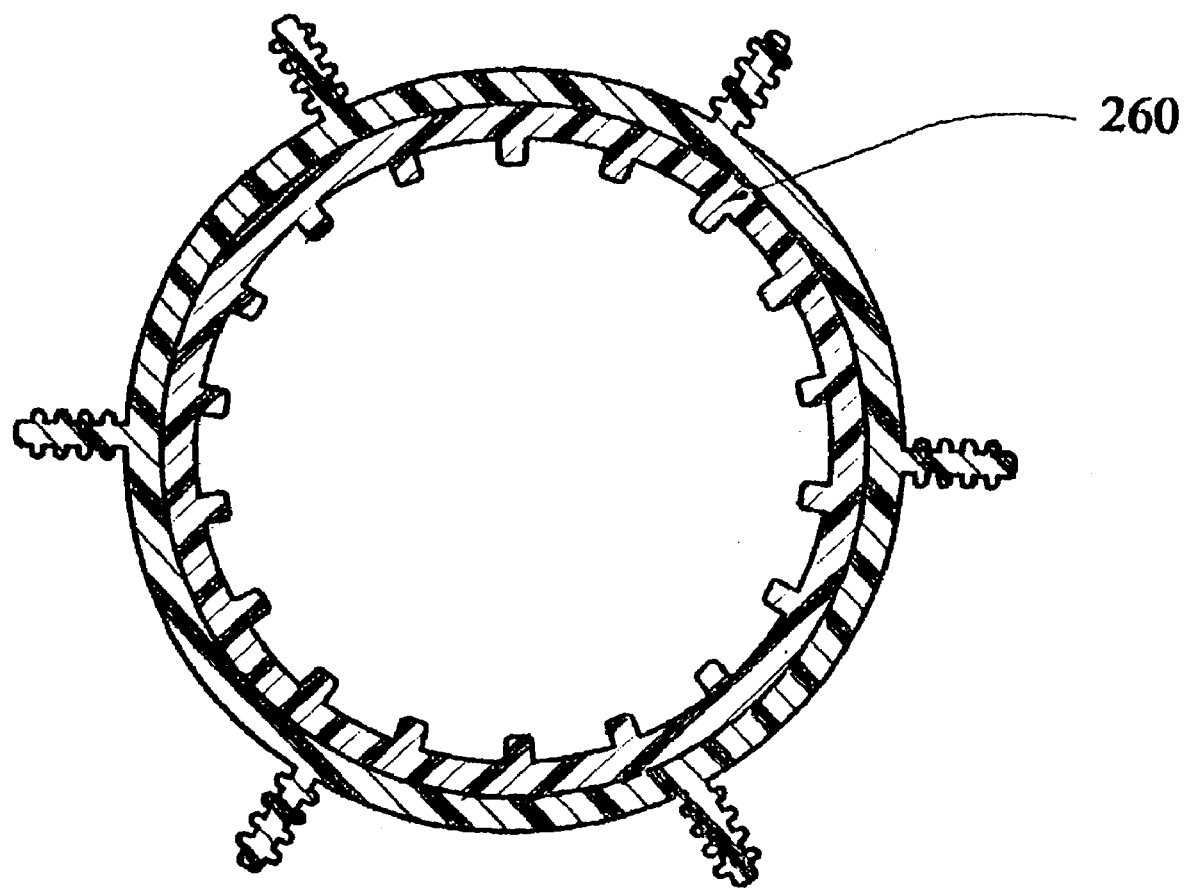
FIG. 2B is a cross-section view of another embodiment of the cable support-separator that includes the same symmetrical core with a central circular ring region as for FIGS. 1A and 2A but with an inner rifled ring section with as few as two and as many as six extending protrusions each extending in a preferred degree separation along the outer ring from each other for optimum pair separation.

FIG. 2B is a cross-section view of another embodiment of the cable support-separator that includes the same symmetrical core with a central circular ring region as for FIGS. 1A and 2A, with as few as two and as many as six extending protrusions each extending in a preferred degree separation along the outer ring from each other for optimum pair separation, but also includes a second inner ring within the hollow region comprised of a different material than the outer ring for increasing friction utilizing rifled inner spatially arranged sections (260).

Figure 2C:
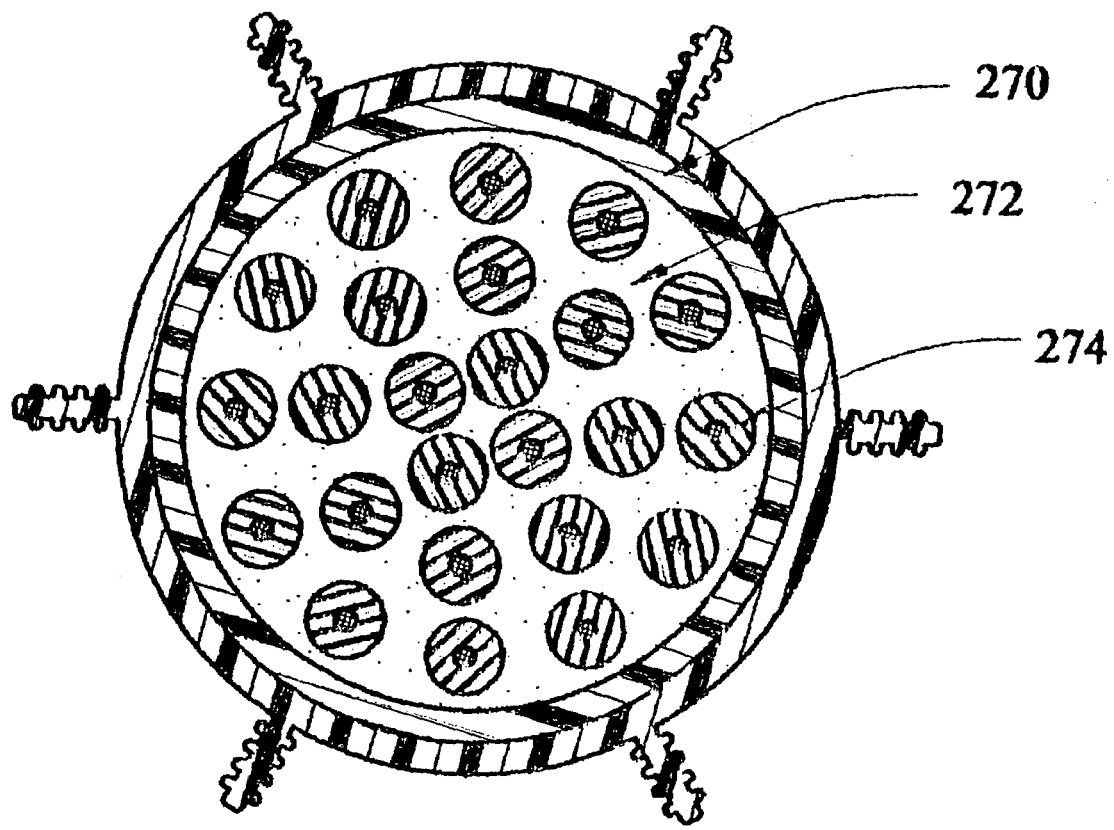
FIG. 2C is a cross-section view of another embodiment of the cable support-separator that includes the same symmetrical core with a central circular ring region as for FIGS. 1A and 2A but with an inner smooth ring section with as few as two and as many as six extending protrusions each extending in a preferred degree separation along the outer ring from each other for optimum pair separation that optionally includes the optional addition of one or more conductors including optionally organic or inorganic fibers such as polyamide (for example Kevlar®) filling and an optional strength member within the second inner ring.

FIG. 2C is a cross-section view of another embodiment of the cable support-separator that includes the same symmetrical core with a central circular ring region as for FIGS. 1A and 2A but with an inner smooth ring section (270) with as few as two and as many as six extending protrusions each extending in a preferred degree separation along the outer ring from each other for optimum pair separation that optionally includes the optional addition of one or more conductors (274) including optionally organic or inorganic fibers such as polyamide (for example Kevlar®) filling and an optional strength member (272) within the second inner ring.

Figure 2D:
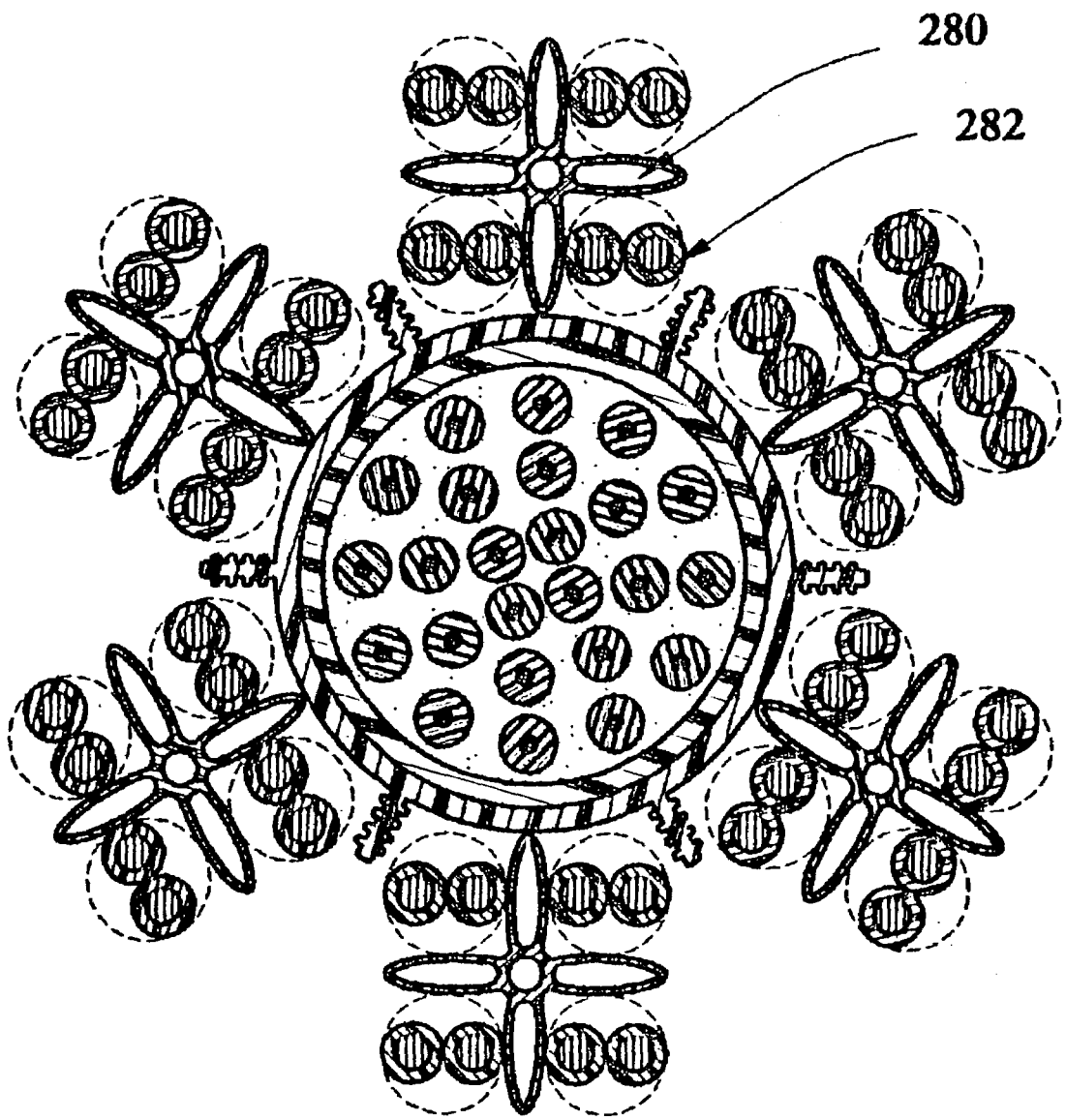
FIG. 2D is a cross-section view of another embodiment of the cable support-separator that includes the same symmetrical core with a central circular ring region as for FIGS. 1A and 2A but with an inner smooth ring section with as few as two and as many as six extending protrusions each extending in a preferred degree separation along the outer ring from each other for optimum pair separation that optionally includes the optional addition of one or more conductors including optionally organic or inorganic fibers such as polyamide (for example Kevlar®) filling and an optional strength member within the second inner ring. Also, between as few as one and as many as six of the extending projections, additional daisy-like spacers (as shown in FIG. 5A) are placed which themselves allow for spacing of individual conductors or conductor pairs.
Figure 4A:
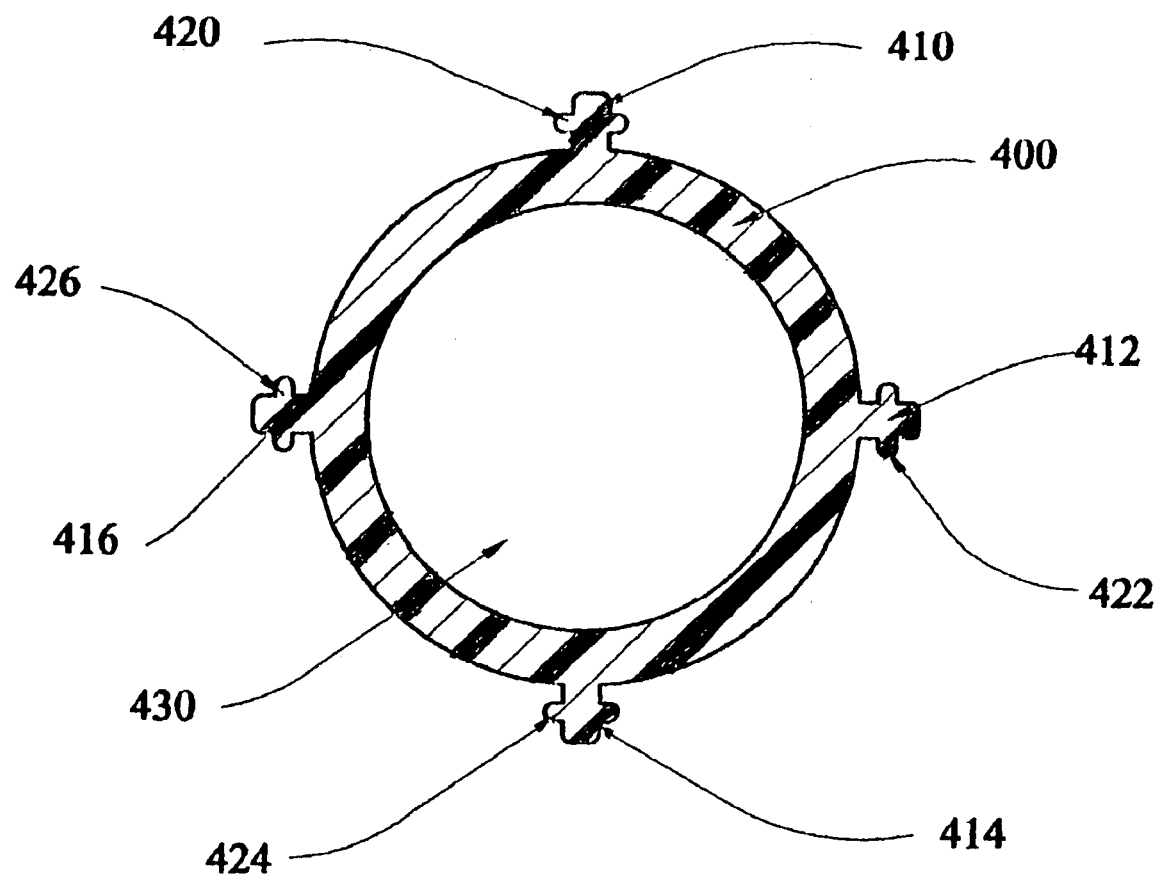
FIG. 4A is a cross-section view of another embodiment of the cable support-separator that includes a symmetrical core with a central circular ring region with four extending protrusions each protrusion extending less than those of FIGS. 1A through 2F and each with at least a single cross-like section extending outward from the circular ring section in a preferred 90 degree separation from each other for optimum pair separation. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 2D is a cross-section view of another embodiment of the cable support-separator that includes the same symmetrical core with a central circular ring region as for FIGS. 1A and 2A but with an inner smooth ring section with as few as two and as many as six extending protrusions each extending in a preferred degree separation along the outer ring from each other for optimum pair separation that optionally includes the optional addition of one or more conductors including optionally organic or inorganic fibers such as polyamide (for example Kevlar®) filling and an optional strength member within the second inner ring. Also, between as few as one and as many as six of the extending projections, additional daisy-like spacers (280) (as shown in FIG. 4A) are placed which themselves allow for spacing of individual conductors or conductor pairs (282).

Figure 2E:
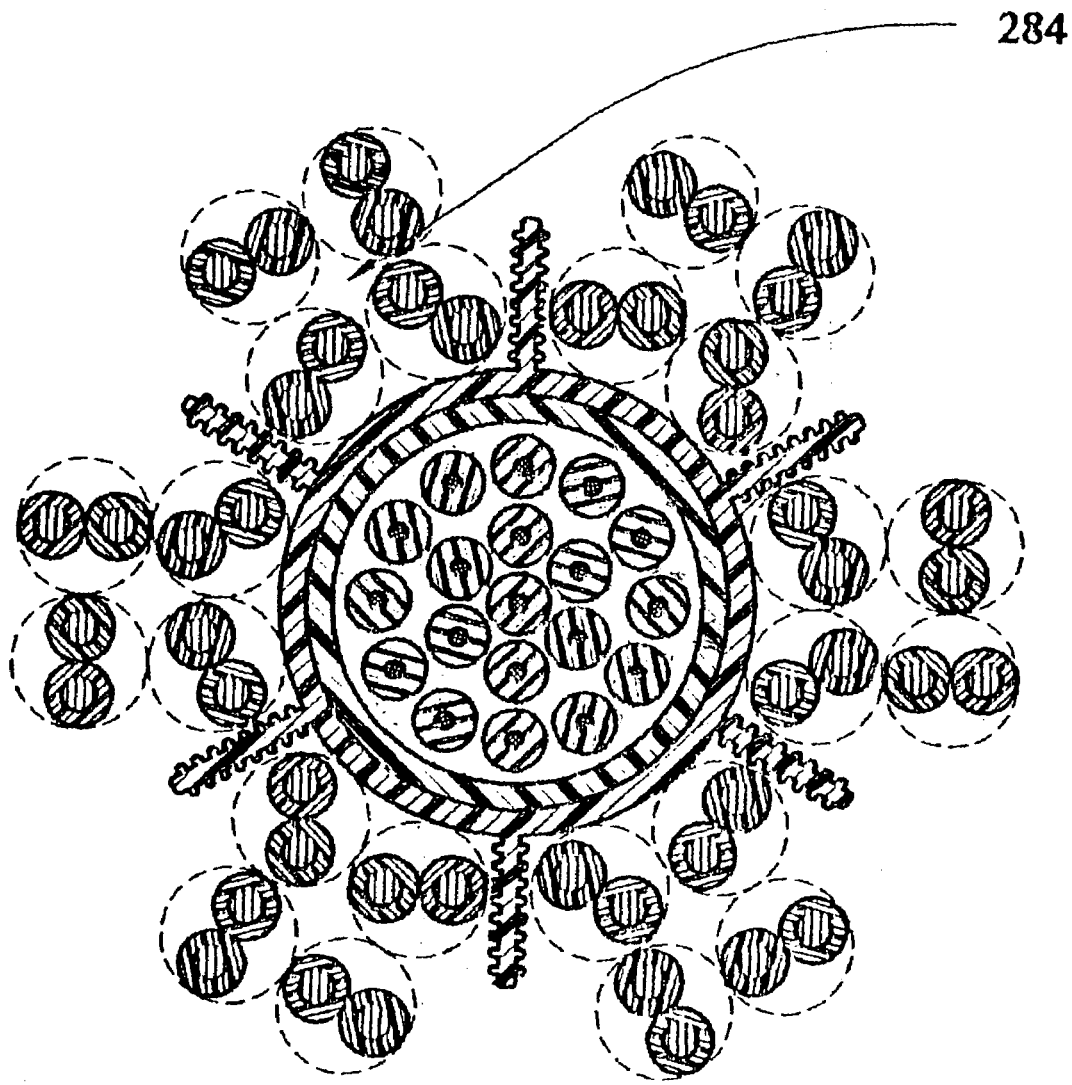
FIG. 2E is a cross-section view of another embodiment of the cable support-separator that includes the same symmetrical core with a central circular ring region as for FIGS. 1A and 2A but with an inner smooth ring section with as few as two and as many as six extending protrusions each extending in a preferred degree separation along the outer ring from each other for optimum pair separation that optionally includes the addition of one or more conductors including optionally organic or inorganic fibers such as polyamide (for example Kevlar®) filling and an optional strength member within the second inner ring. Also, between as few as one and as many as six of the extending projections are shown without the additional daisy-like spacers (FIG. 5A).
Figure 5A:
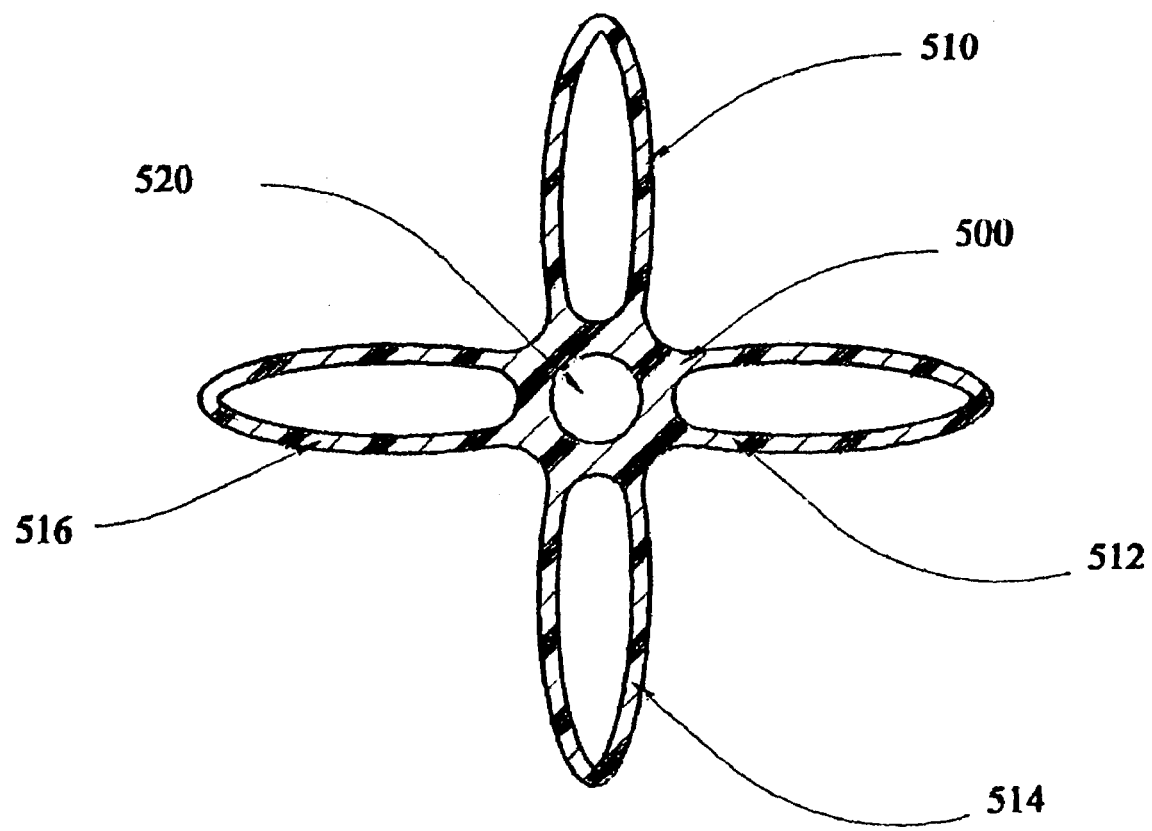
FIG. 5A is a cross-section view of another embodiment of the cable support-separator that includes a hollow four-petal or "daisy" shaped arrangement with a central core that may or may not be hollow. If the central region is hollow, the possibility again exists for that region to act as an air blown fiber (ABF) duct which is available for filling with optical fiber. Coaxial or twisted pair conductors may also be introduced in that region.

FIG. 2E is a cross-section view of another embodiment of the cable support-separator that includes the same symmetrical core with a central circular ring region as for FIGS. 1A and 2A but with an inner smooth ring section with as few as two and as many as six extending protrusions each extending in a preferred degree separation along the outer ring from each other for optimum pair separation that optionally includes the optional addition of one or more conductors including optionally organic or inorganic fibers such as polyamide (for example Kevlar®) filling and an optional strength member within the second inner ring. Also, between as few as one and as many as six of the extending projections are shown without (284) the additional daisy-like spacers (FIG. 5A).

Figure 2F:
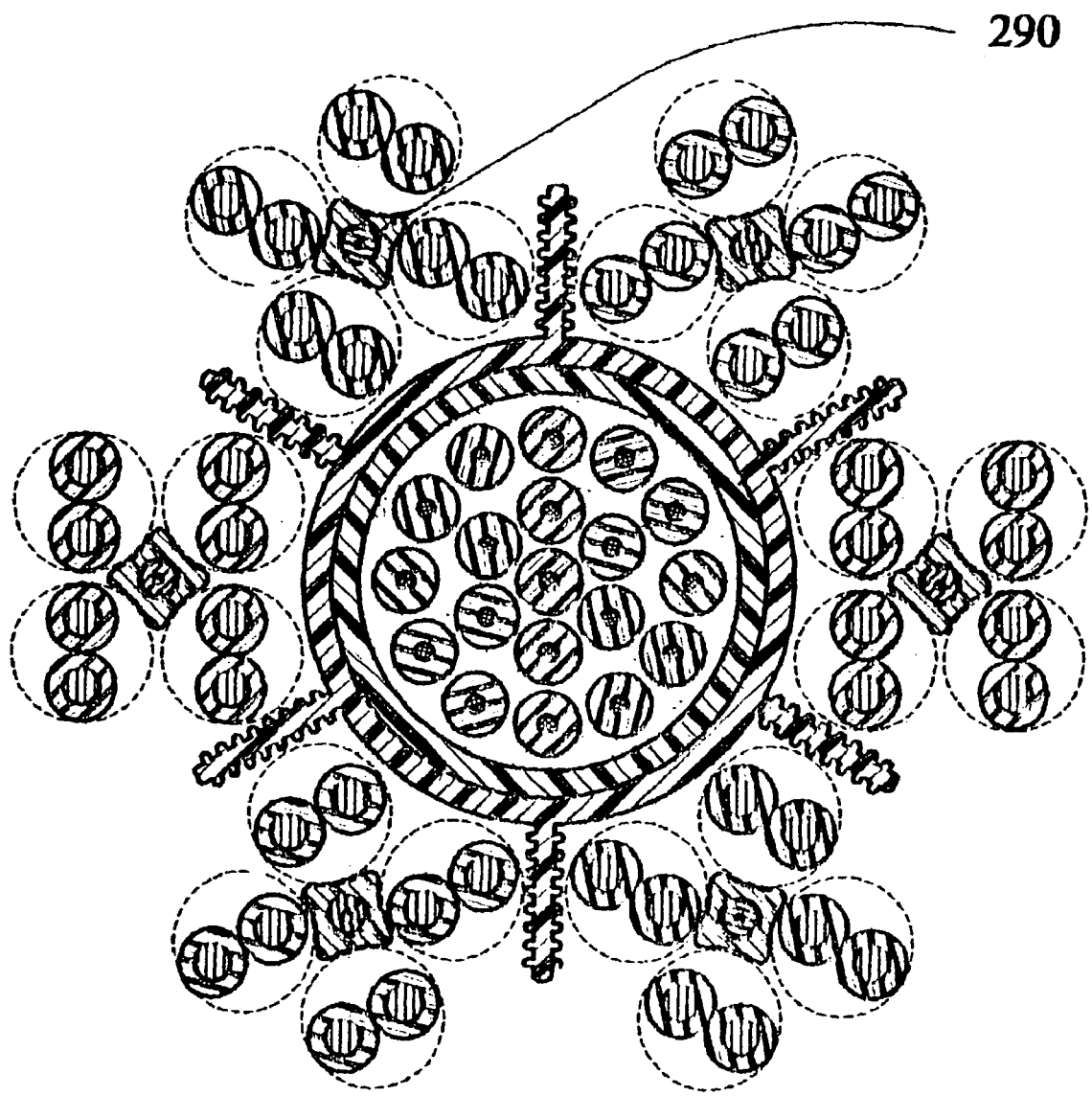
FIG. 2F is a cross-section view of another embodiment of the cable support-separator that includes the same symmetrical core with a central circular ring region as for FIGS. 1A and 2A but with an inner smooth ring section with as few as two and as many as six extending protrusions each extending in a preferred degree separation along the outer ring from each other for optimum pair separation that optionally includes the addition of one or more conductors including optionally organic or inorganic fibers such as polyamide (for example Kevlar®) filling and an optional strength member within the second inner ring. Also, between as few as one and as many as six of the extending projections, additional spacers comprised of a region which includes rounded lobes in a symmetric diamond-like geometry that defines as many as four separate regions for pairs that are properly separated in the final (often jacketed) cable design (as shown in FIG. 6A) are placed which themselves allow for spacing of individual conductors or conductor pairs.
Figure 6A:
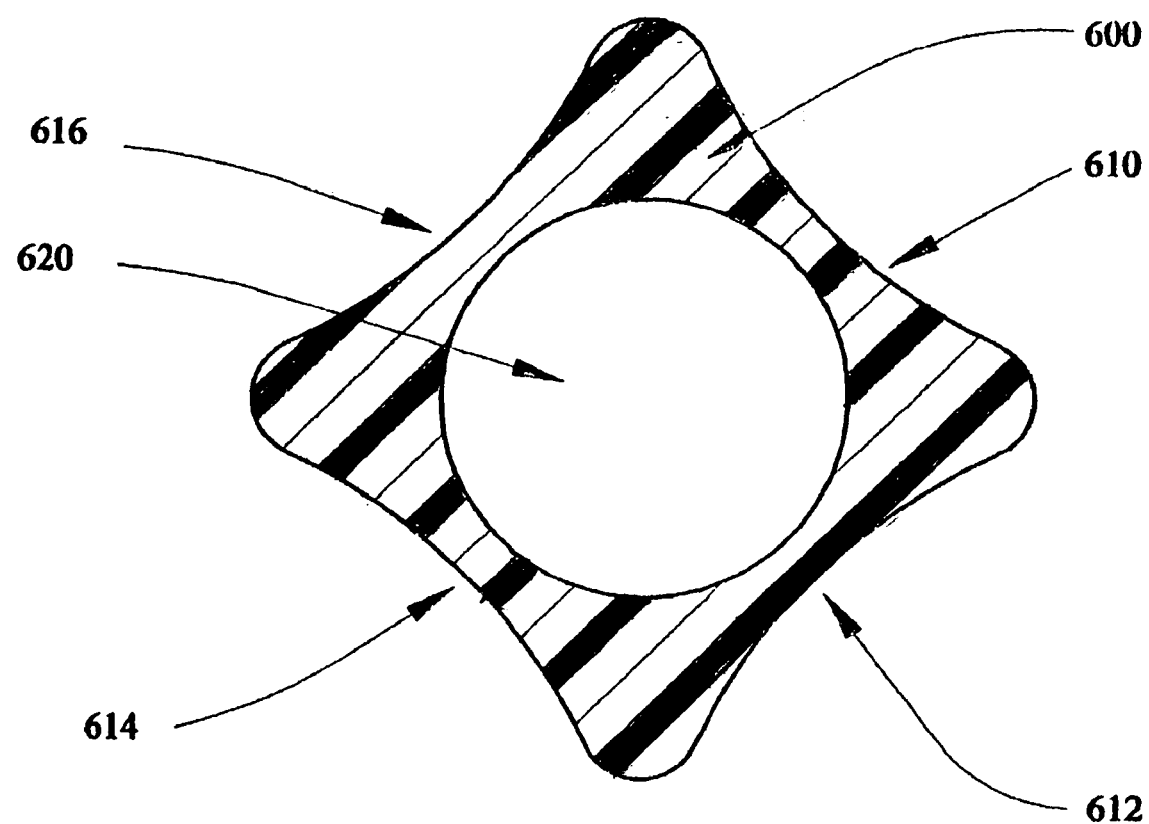
FIGS. 6A, 6B, 6C are cross-sectional views of another set of embodiments of the cable support-separator that includes a circular ring region which is surrounded by rounded lobes in a symmetric diamond-like geometry that defines as many as four separate regions for pairs that are properly separated in the final (often jacketed) cable design. Again the central ring portion can optionally include a hollow region that may be used as an air blown fiber (ABF) duct which is available for filling with optical fiber which is comprised of solid, semi-solid, foamed or hollow polymeric smooth internal and external surfaces.

FIG. 2F is a cross-section view of another embodiment of the cable support-separator that includes the same symmetrical core with a central circular ring region as for FIGS. 1A and 2A but with an inner smooth ring section with as few as two and as many as six extending protrusions each extending in a preferred degree separation along the outer ring from each other for optimum pair separation that optionally includes the optional addition of one or more conductors including optionally organic or inorganic fibers such as polyamide (for example Kevlar®) filling and an optional strength member within the second inner ring. Also, between as few as one and as many as six of the extending projections, additional spacers (290) comprised of a circular ring region which is surrounded by rounded lobes in a symmetric diamond-like geometry that defines as many as four separate regions for pairs that are properly separated in the final (often jacketed) cable design (as shown in FIG. 6A) are placed which themselves allow for spacing of individual conductors or conductor pairs.

Figure 3A:
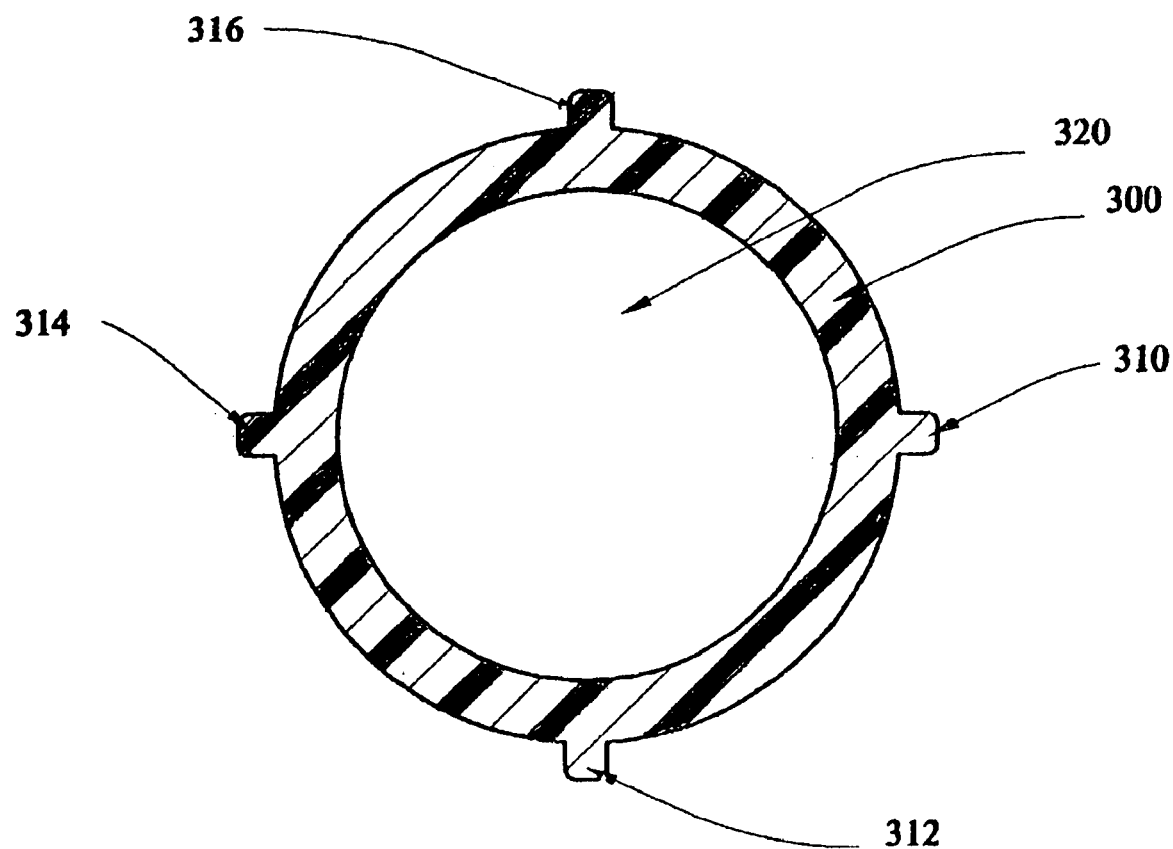
FIG. 3A is a cross-section view of another embodiment of the cable support-separator that includes a symmetrical core with a central circular ring region with four extending smooth protrusions, each protrusion extending less than those of FIGS. 1A through 2F, each again extending in a preferred 90 degree separation from each other for optimum pair separation The central ring portion optionally includes a hollow region to act as an air blown fiber (ABF) duct which is available for filling with optical fiber which is comprised of solid, semi-solid, foamed or hollow polymeric smooth internal and external surfaces.

FIG. 3A is a cross-section view of another embodiment of the cable support-separator that includes a symmetrical core with a central circular ring region (300) with four extending smooth protrusions (310, 312, 314, 316), each protrusion extending less than those of FIGS. 1A through 2F, each again extending in a preferred 90 degree separation from each other for optimum pair separation. The central ring portion optionally includes a hollow region (320) to act as an air blown fiber (ABF) duct which is available for filling with optical fiber which is comprised of solid, semi-solid, foamed or hollow polymeric smooth internal and external surfaces.

Figure 3B:
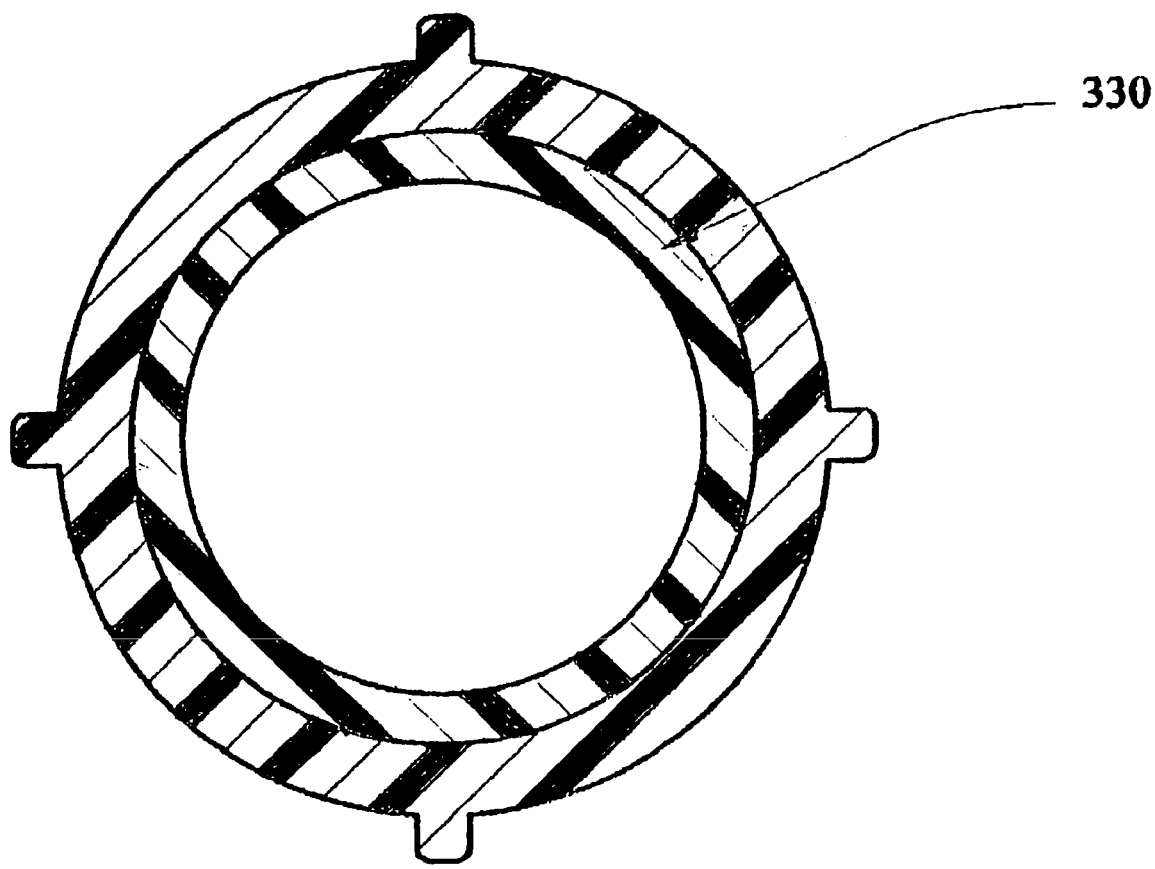
FIG. 3B is a cross-section view of another embodiment of the cable support-separator that includes a symmetrical core with a central circular ring region with four extending smooth protrusions, each protrusion extending less than those of FIGS. 1A through 2F, each again extending in a preferred 90 degree separation from each other for optimum pair separation and also includes a second inner ring within the hollow region comprised of a different material than the outer ring for either increasing lubricity or friction. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 3B is a cross-section view of another embodiment of the cable support-separator that includes a symmetrical core with a central circular ring region with four extending smooth protrusions, each protrusion extending less than those of FIGS. 1A through 2F, each again extending in a preferred 90 degree separation from each other for optimum pair separation and also includes a second inner ring (330) within the hollow region comprised of a different material than the outer ring for either increasing lubricity or friction. The central ring portion optionally includes a hollow region to act as an air blown fiber (ABF) duct which is available for filling with optical fiber which is comprised of solid, semi-solid, foamed or hollow polymeric smooth internal and external surfaces.

Figure 3C:
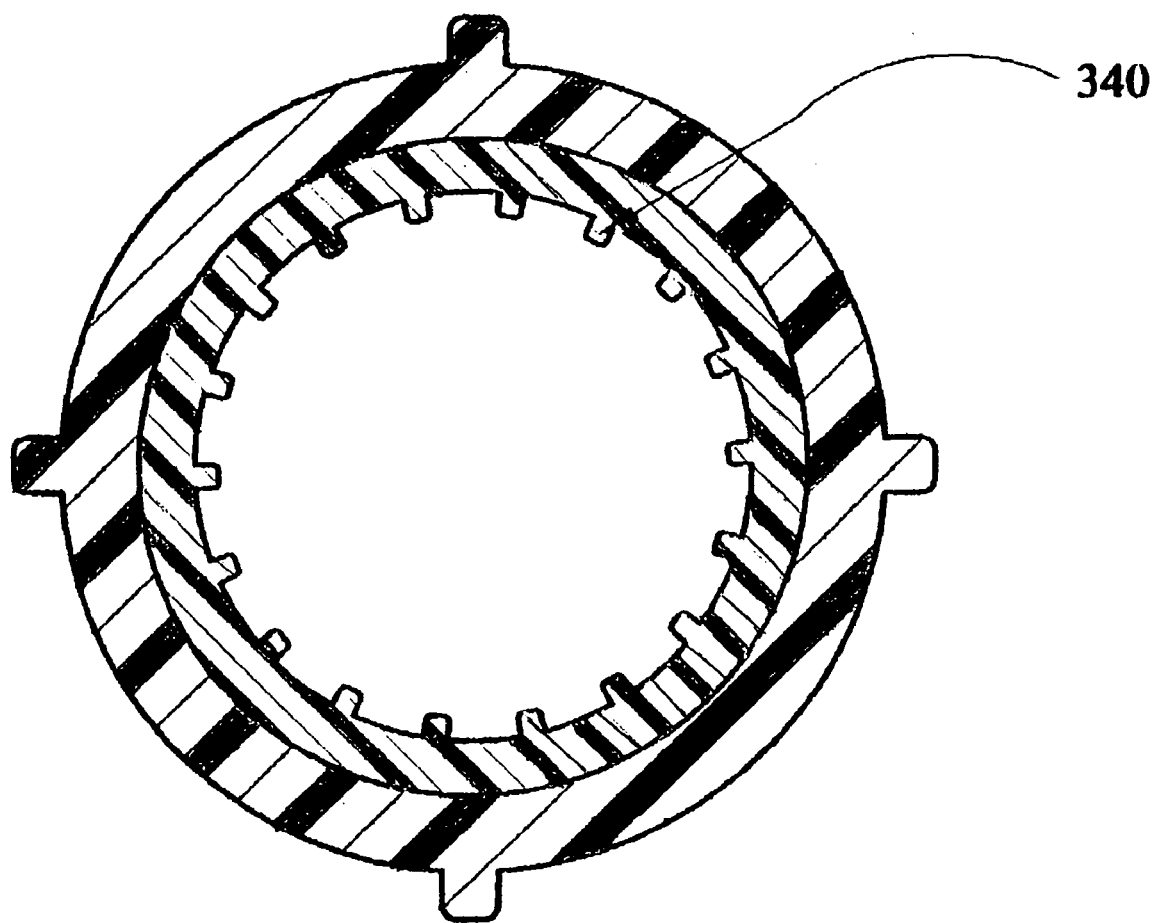
FIG. 3C is a cross-section view of another embodiment of the cable support-separator that includes a symmetrical core with a central circular ring region with four extending smooth protrusions, each protrusion extending less than those of FIGS. 1A through 2F, each again extending in a preferred 90 degree separation from each other for optimum pair separation and also includes also includes a second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 3C is a cross-section view of another embodiment of the cable support-separator that includes a symmetrical core with a central circular ring region with four extending smooth protrusions, each protrusion extending less than those of FIGS. 1A through 2F, each again extending in a preferred 90 degree separation from each other for optimum pair separation and also includes also includes a second inner ring within the hollow region comprised of a different material than the outer ring for increasing friction utilizing rifled inner spatially arranged sections (340). The central ring portion optionally includes a hollow region to act as an air blown fiber (ABF) duct which is available for filling with optical fiber which is comprised of solid, semi-solid, foamed or hollow polymeric smooth internal and external surfaces.

Figure 3D:
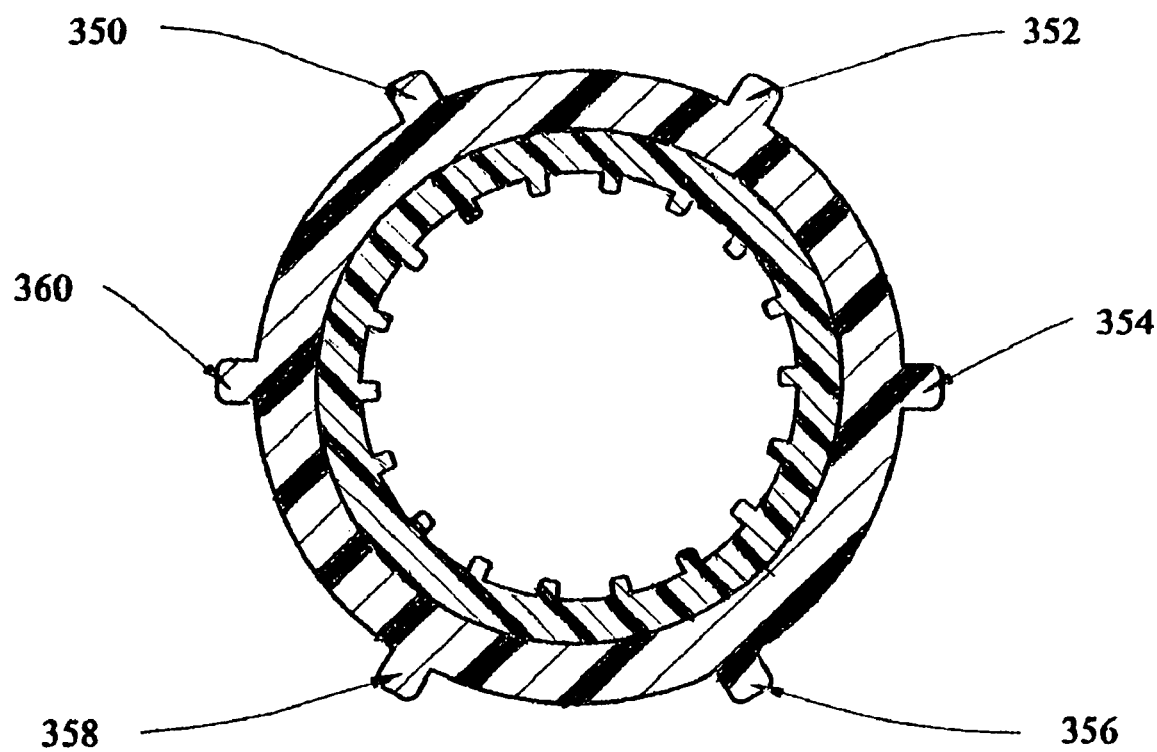
FIGS. 3D and 3E are cross-section views of another embodiment of the cable support-separator that includes a symmetrical core with a central circular ring region with as few as two and as many as six extending smooth protrusions, each protrusion extending less than those of the series of FIGS. 1A through 2F, each again extending in a preferred separation from each other for optimum pair separation and also includes also includes a an optional second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.
Figure 3E:
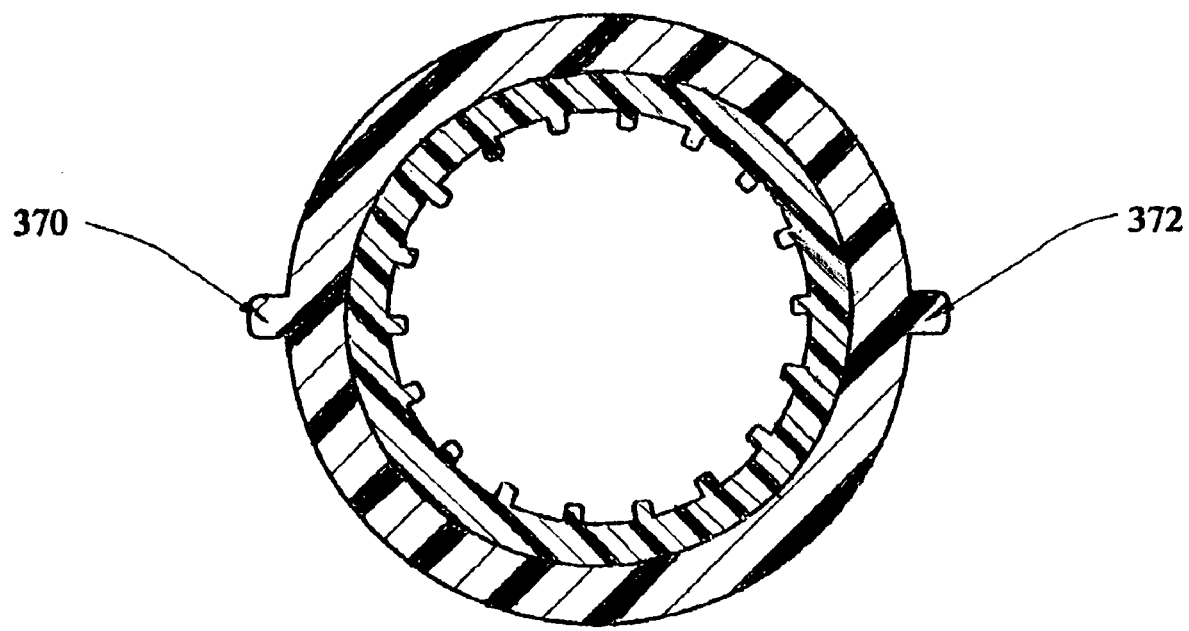

FIGS. 3D and 3E are cross-section views of another embodiment of the cable support-separator that includes a symmetrical core with a central circular ring region with as few as two (370 and 372 in FIG. 3E) and as many as six extending smooth protrusions (350, 352, 354, 356, 358, 360 in FIG. 3D), each protrusion extending less than those of the series of FIGS. 1A through 2F, each again extending in a preferred separation from each other for optimum pair separation and also includes also includes a an optional second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.

Figure 3F:
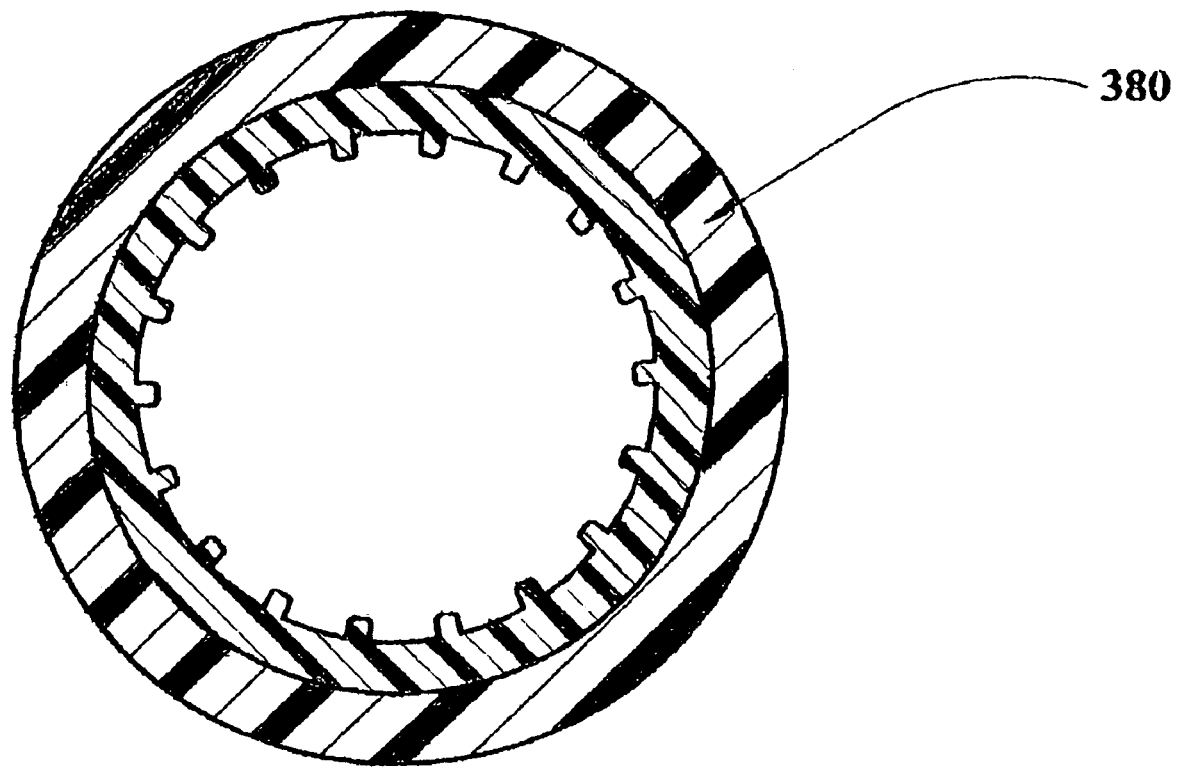
FIG. 3F is a cross-section view of another embodiment of the cable support-separator that includes a symmetrical core with a central circular ring region with no extending protrusions that includes also an optional second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 3F is a cross-section view of another embodiment of the cable support-separator that includes a symmetrical core with a central circular ring region with no extending protrusions (380) that includes also an optional second inner ring within the hollow region comprised of a different material than the outer ring for increasing friction optionally utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 4A is a cross-section view of another embodiment of the cable support-separator that includes a symmetrical core with a central circular ring region (400) with four extending protrusions (410, 412, 414, 416) each protrusion extending less than those of FIGS. 1A through 2F and each with at least a single cross-like section (420, 422, 424, 426) extending outward from the circular ring section in a preferred 90 degree separation from each other for optimum pair separation. The central ring portion optionally includes a hollow region (430) to act as an air blown fiber (ABF) duct which is available for filling with optical fiber which is comprised of solid, semi-solid, foamed or hollow polymeric smooth internal and external surfaces.

Figure 4B:
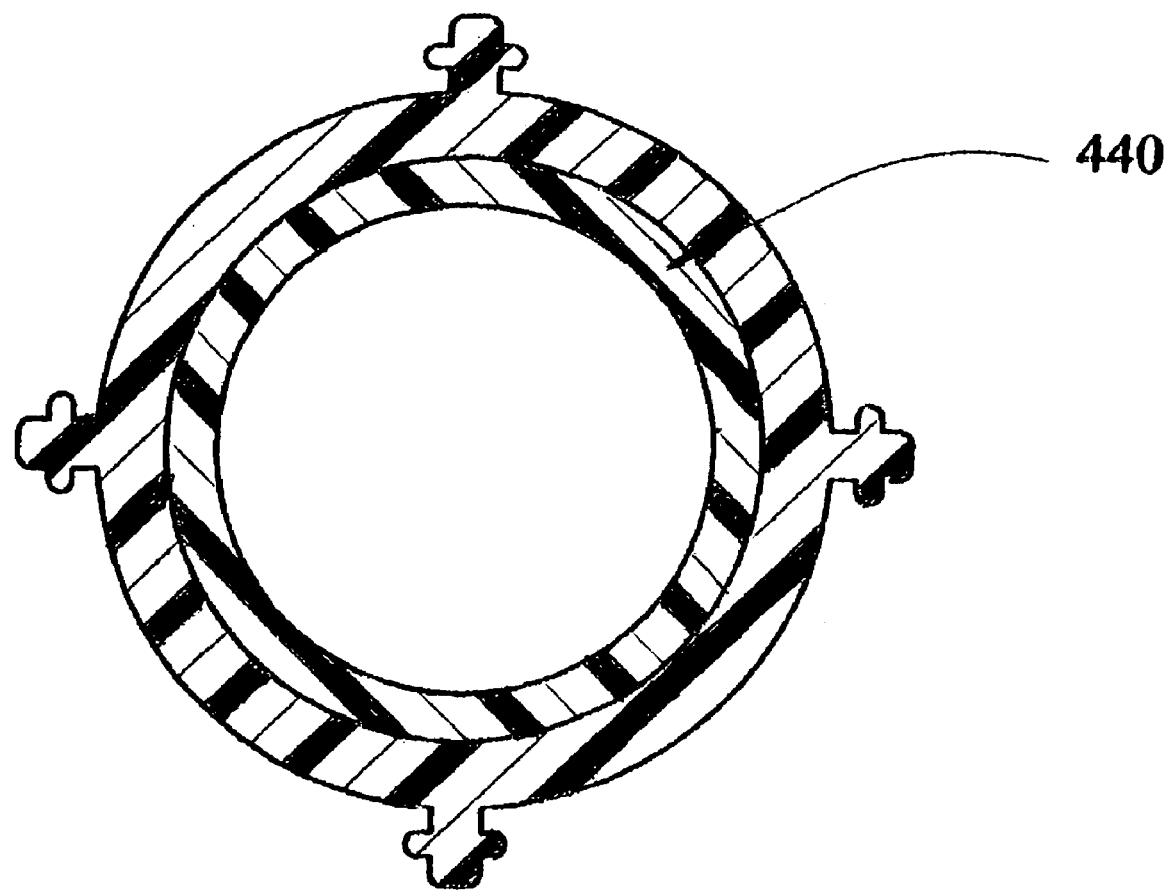
FIG. 4B is a cross-section view of another embodiment of the cable support-separator that includes a symmetrical core with a central circular ring region and each with at least a single cross-like section extending from the circular ring section, each protrusion extending less than those of FIGS. 1A through 2F, each again extending in a preferred 90 degree separation from each other for optimum pair separation and also includes a second inner ring within the hollow region comprised of a different material than the outer ring for either increasing lubricity or friction. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 4B is a cross-section view of another embodiment of the cable support-separator that includes a symmetrical core with a central circular ring region and each with at least a single cross-like section extending from the circular ring section, each protrusion extending less than those of FIGS. 1A through 2F, each again extending in a preferred 90 degree separation from each other for optimum pair separation and also includes a second inner ring (440) within the hollow region comprised of a different material than the outer ring for either increasing lubricity or friction. The central ring portion optionally includes a hollow region to act as an air blown fiber (ABF) duct which is available for filling with optical fiber which is comprised of solid, semi-solid, foamed or hollow polymeric smooth internal and external surfaces.

Figure 4C:
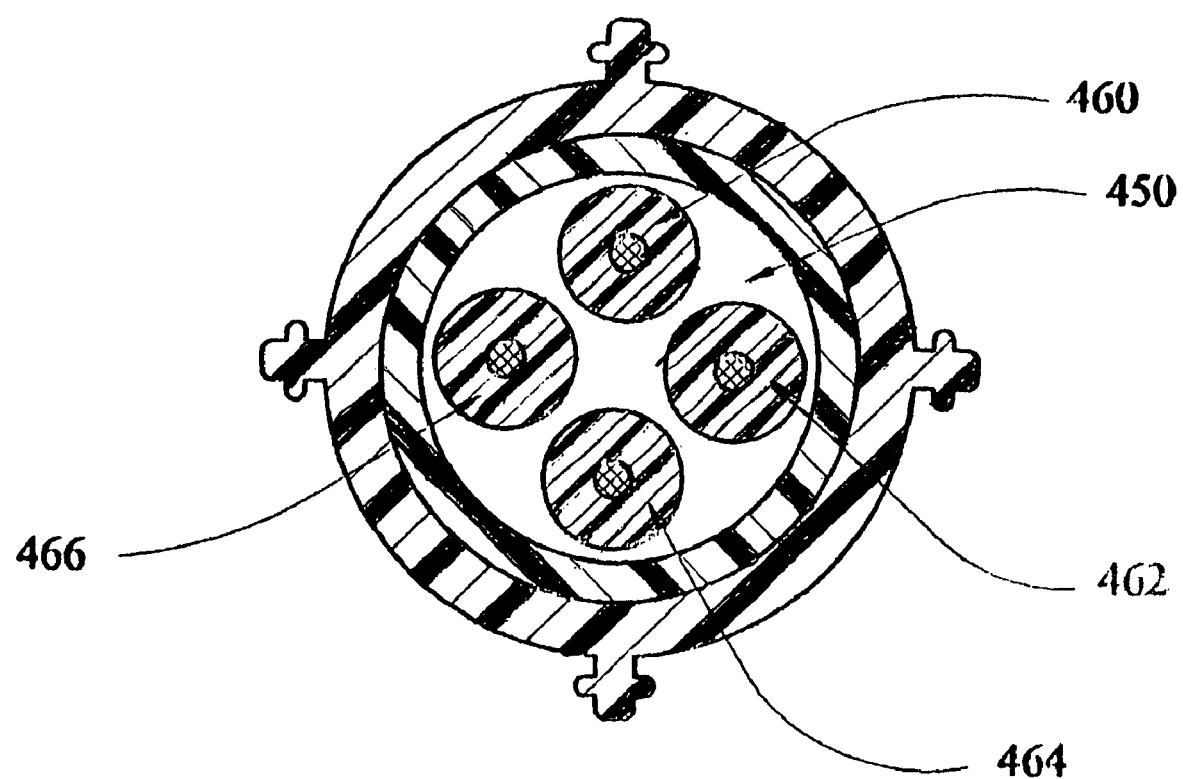
FIG. 4C is a cross-section view of another embodiment of the cable support-separator that includes a symmetrical core with a central circular ring region and each with at least a single cross-like section extending from the circular ring section, each protrusion extending less than those of FIGS. through 2F, each again extending in a preferred 90 degree separation from each other for optimum pair separation and also includes a second inner ring within the hollow region comprised of a different material than the outer ring for either increasing lubricity or friction. The inner portion of the hollow ring region here is optionally filled with inorganic or organic fibers such as polyamide fiber (Kevlar®) and at least four single or multimode finer optic units.

FIG. 4C is a cross-section view of another embodiment of the cable support-separator that includes a symmetrical core with a central circular ring region and each with at least a single cross-like section extending from the circular ring section, each protrusion extending less than those of FIGS. through 2F, each again extending in a preferred 90 degree separation from each other for optimum pair separation and also includes a second inner ring within the hollow region comprised of a different material than the outer ring for either increasing lubricity or friction. The inner portion of the hollow ring region here is optionally filled with inorganic or organic fibers (450) such as polyamide fiber (Kevlar®) and at least four single or multimode finer optic units (460, 462, 464, and 466).

Figure 4D:
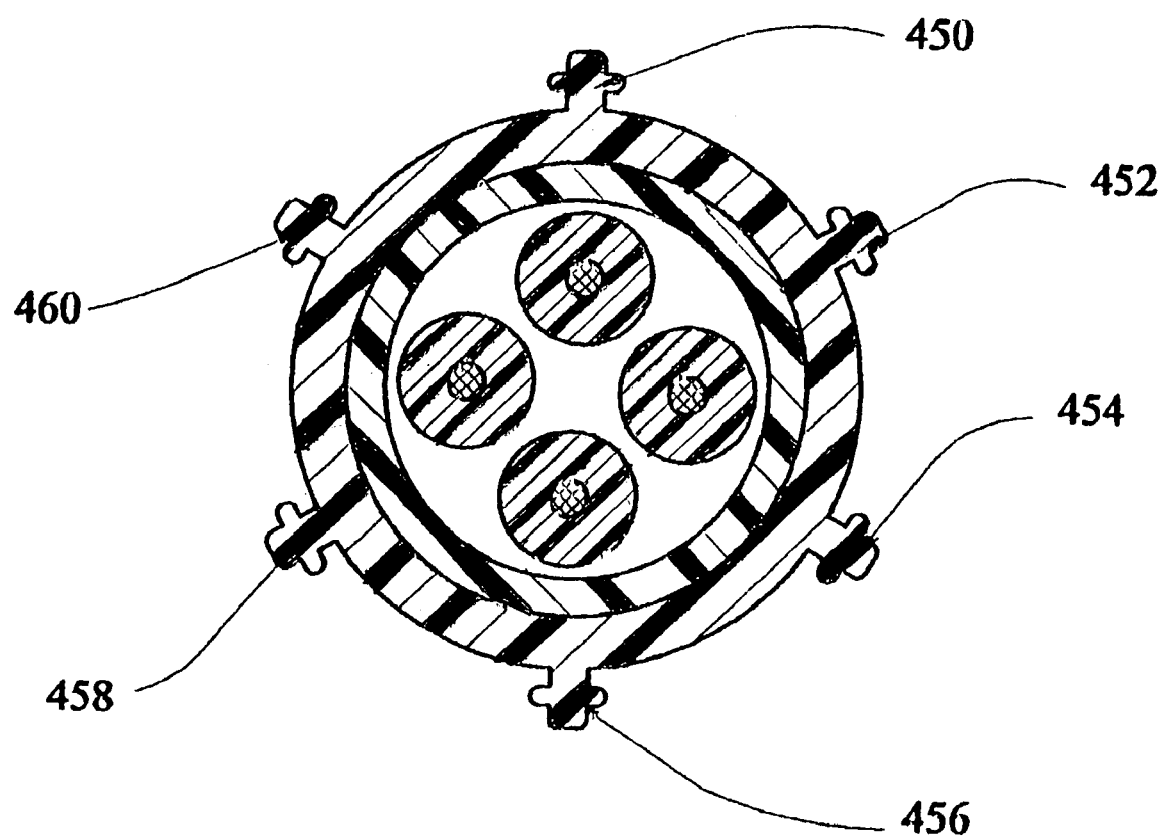
FIGS. 4D and 4E include a cross-section view of another embodiment of the cable support-separator that includes a symmetrical core with a central circular ring region with as few as two and as many as six extending protrusions each with at least a single cross-like section, each protrusion extending less than those of FIGS. 1A through 2F, each again extending in a preferred separation from each other for optimum pair separation and also includes also includes an optional second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.
Figure 4E:
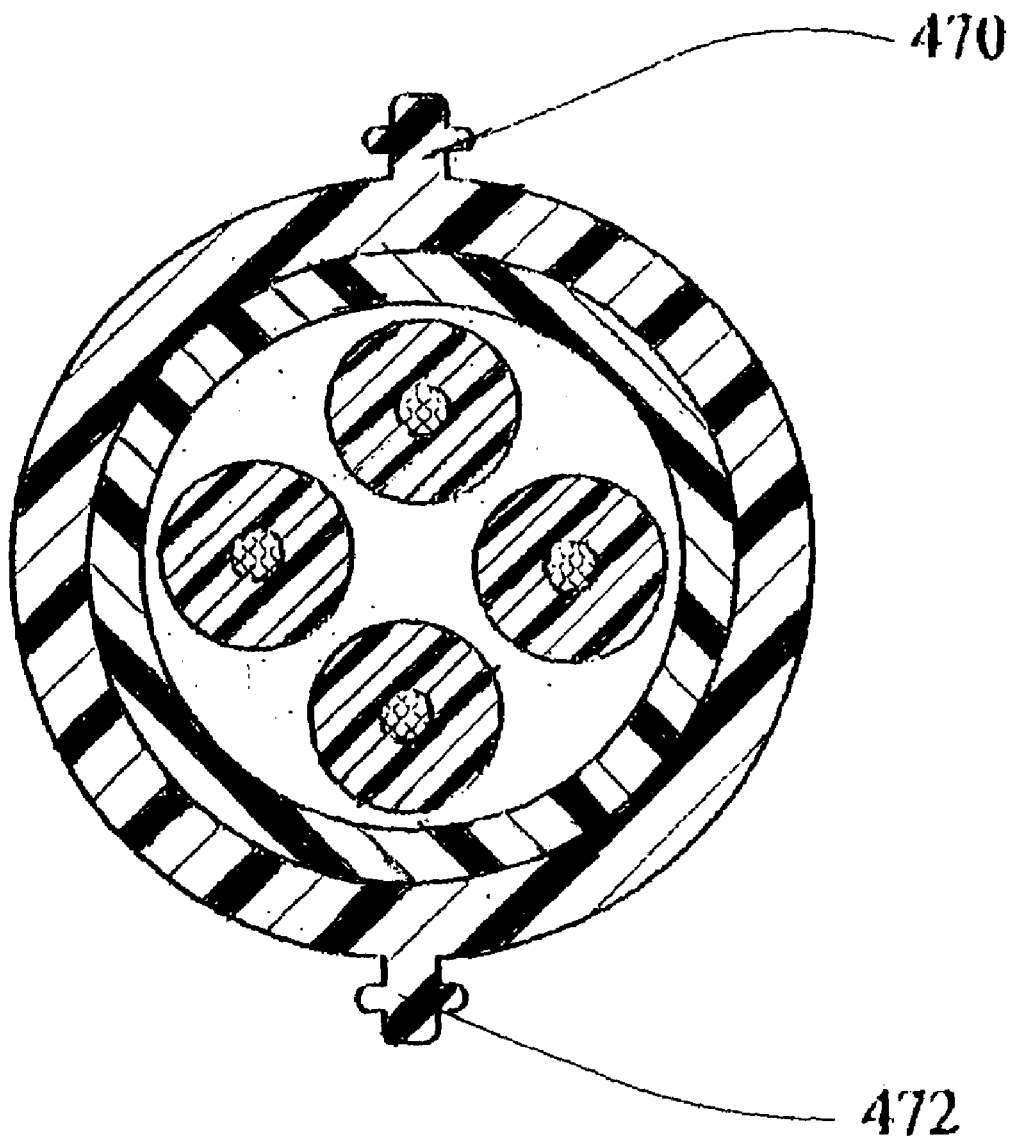

FIGS. 4D and 4E include a cross-section view of another embodiment of the cable support-separator that includes a symmetrical core with a central circular ring region with as few as two (470 and 472 in FIG. 4E) and as many as six (450, 452, 454, 456, 458, and 460 in FIG. 4D) extending protrusions each with at least a single cross-like section, each protrusion extending less than those of FIGS. 1A through 2F, each again extending in a preferred separation from each other for optimum pair separation and also includes also includes an optional second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.

Figure 4F:
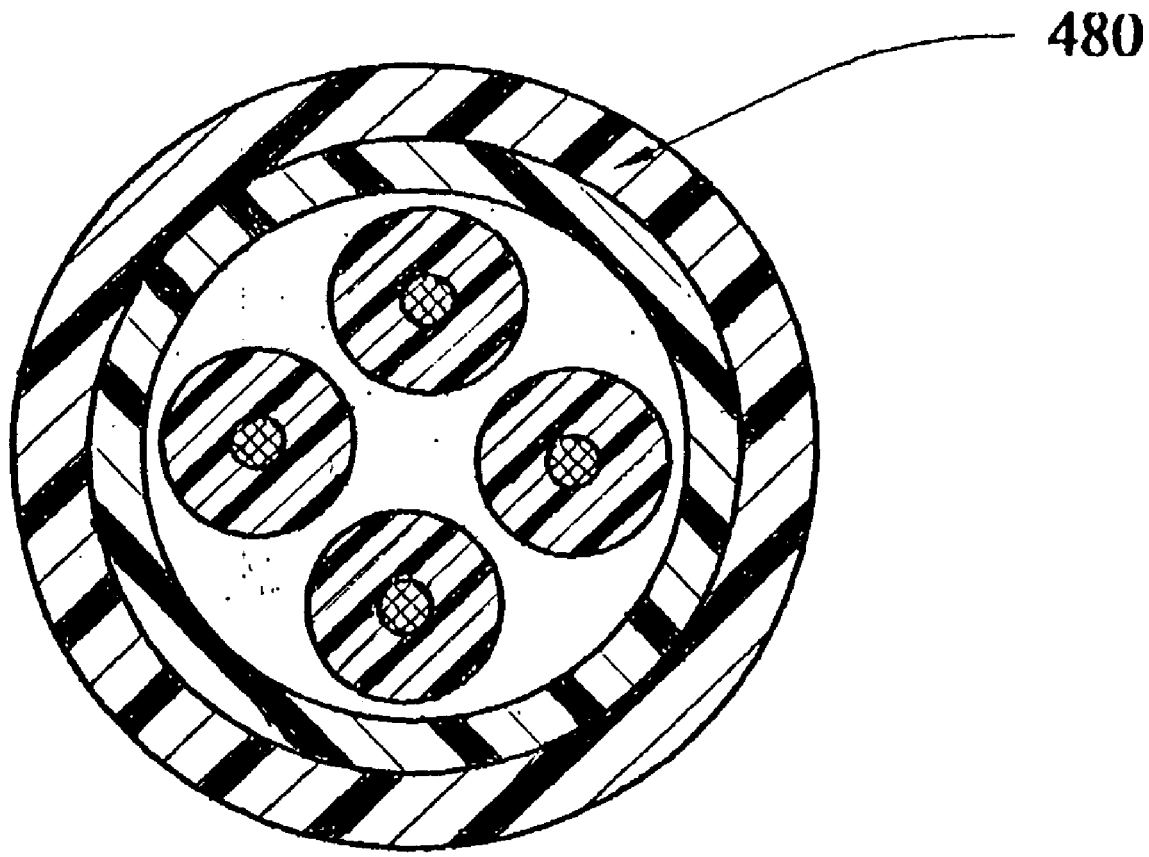
FIG. 4F includes a cross-section view of another embodiment of the cable support-separator includes a symmetrical core with a central circular ring region with no extending protrusions that includes also an optional second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 4F includes a cross-section view of another embodiment of the cable support-separator includes a symmetrical core with a central circular ring region with no extending protrusions (480) that includes also an optional second inner ring within the hollow region comprised of a different material than the outer ring for increasing friction utilizing rifled inner spatially arranged sections. The central ring portion optionally includes a hollow region to act as an air blown fiber (ABF) duct which is available for filling with optical fiber which is comprised of solid, semi-solid, foamed or hollow polymeric smooth internal and external surfaces.

FIG. 5A is a cross-section view of another embodiment of the cable support-separator that includes a hollow four-petal (510, 512, 514, and 516) or "daisy" shaped arrangement with a central core (500) that may or may not be hollow (520 shown hollow). If the central region is hollow, the possibility again exists for that region to act as an air blown fiber (ABF) duct which is available for filling with optical fiber. Coaxial or twisted pair conductors may also be introduced in that region.

Figure 5B:
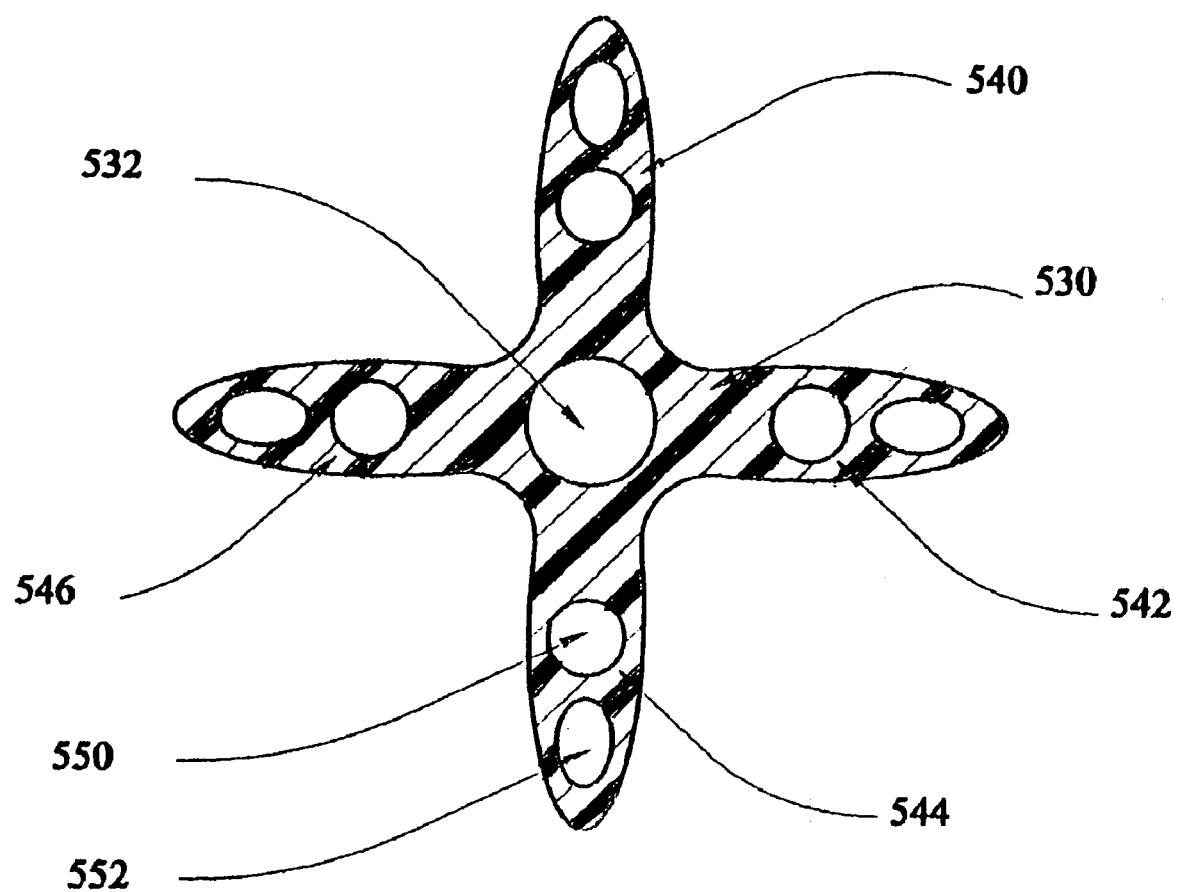
FIG. 5B is a cross-section view of another embodiment of the cable support-separator that includes a solid four-petal or "daisy" shaped arrangement with a central core that may or may not be hollow. Each "petal" contains two hollow sections for additional optical or metallic conductor media. The central region is hollow allowing for the possibility that this region may act as an air blown fiber (ABF) duct which is available for filling with optical fiber. Coaxial or twisted pair conductors may also be introduced in that region.

FIG. 5B is a cross-section view of another embodiment of the cable support-separator that includes a solid four-petal (540, 542, 544, and 546) or "daisy" shaped arrangement with a central core (530) that may or may not be hollow (532 shown hollow). Each "petal" contains two hollow sections (550 and 552) for additional optical or metallic conductor media. The central region (532) is hollow allowing for the possibility that this region may act as an air blown fiber (ABF) duct which is available for filling with optical fiber. Coaxial or twisted pair conductors may also be introduced in that region.

Figure 5C:
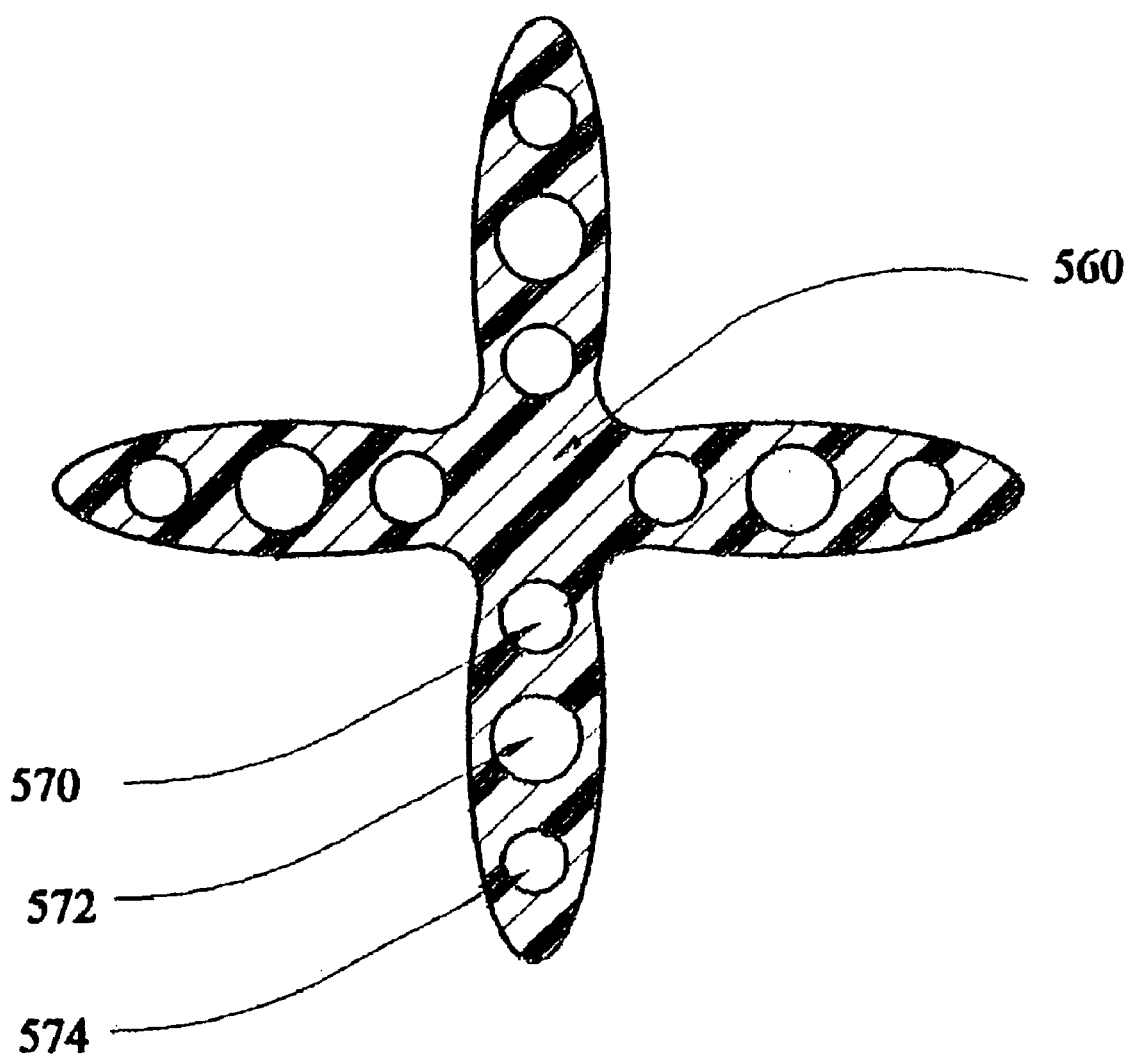
FIG. 5C is a cross-section view of another embodiment of the cable support-separator that includes a solid four-petal or "daisy" shaped arrangement with a central core that may or may not be hollow. Each "petal" contains three hollow sections of differing diameters for additional optical or metallic conductor media. The central region is solid.

FIG. 5C is a cross-section view of another embodiment of the cable support-separator that includes a solid four-petal or "daisy" shaped arrangement with a central core (560) that may or may not be hollow. Each "petal" contains three hollow sections (570, 572, and 574) of differing diameters for additional optical or metallic conductor media. The central region (560) is solid.

Figure 5D:
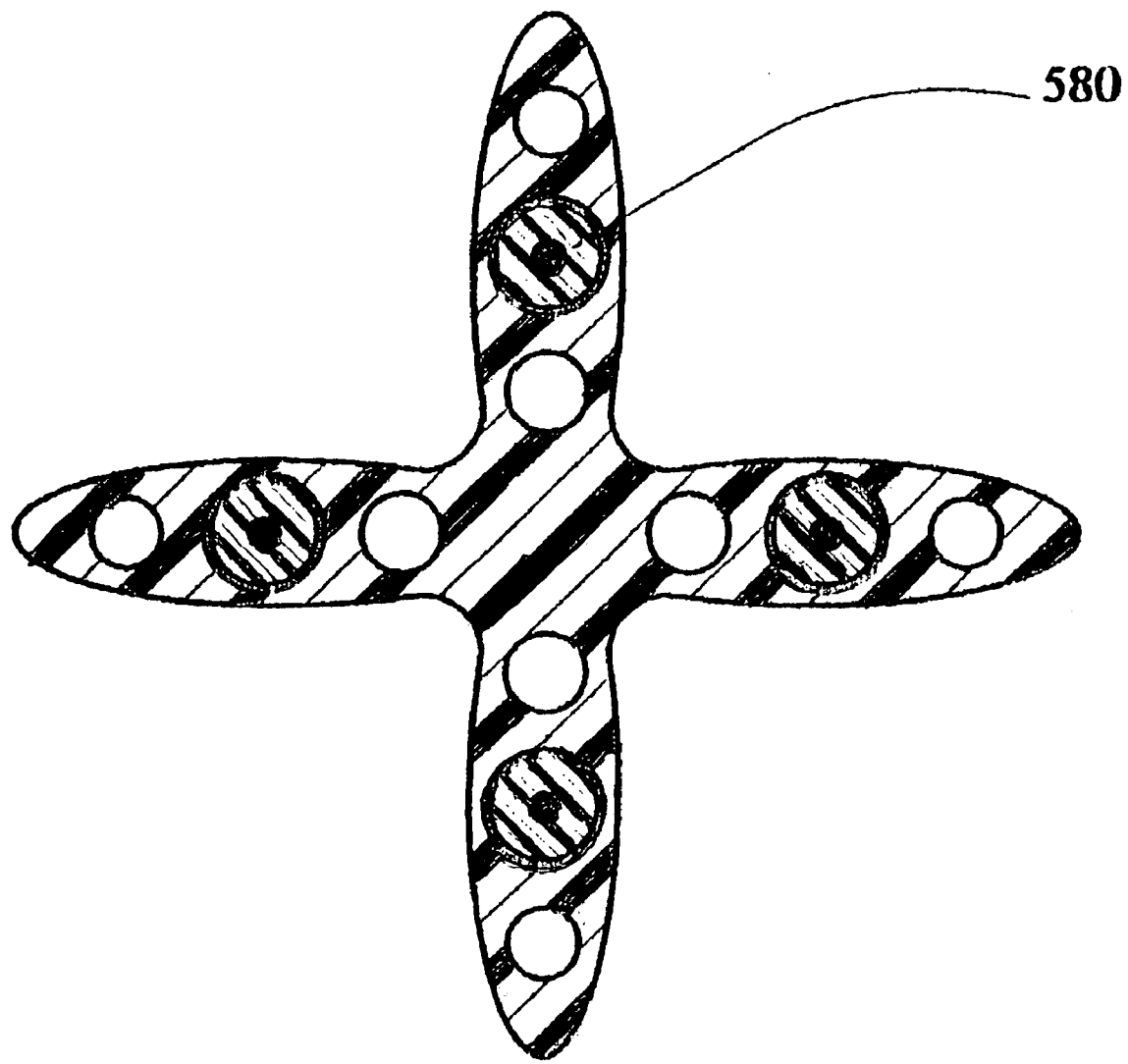
FIG. 5D is a cross-section view of another embodiment of the cable support-separator that includes a solid four-petal or "daisy" shaped arrangement with a central core that may or may not be hollow. Each "petal" contains three hollow sections of differing diameters for additional optical or metallic conductor media. In this case, the center hollow section of each petal is filled with an optical fiber unit. The central region is solid or optionally hollow.
Figure 5E:
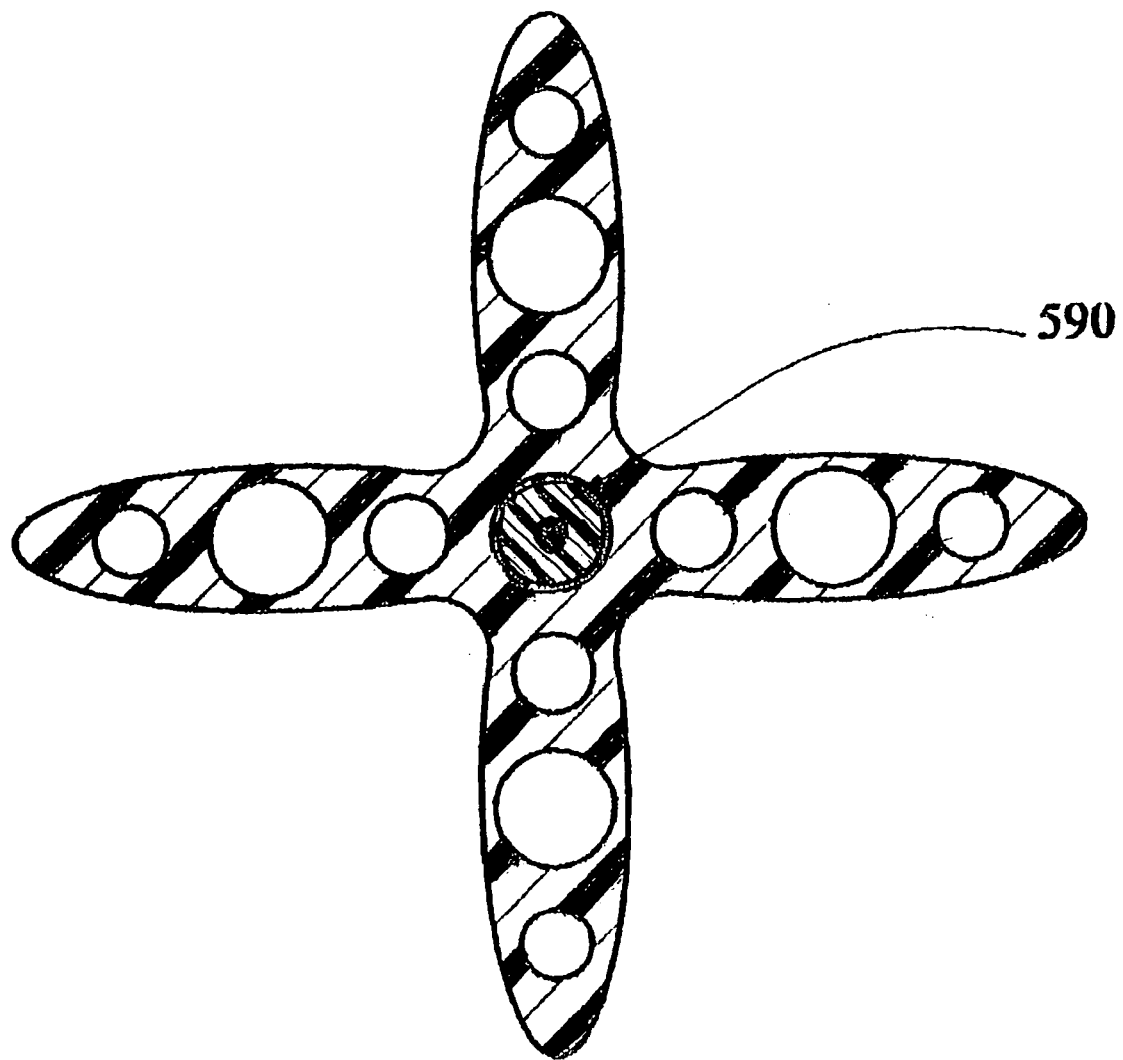
FIG. 5E is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes a center portion filled with a fiber optic unit as well as four separated conductor pairs in each of the regions defined by the symmetric diamond-like geometry of the cable support-separator. Again the central ring portion can optionally include a hollow region that may be used as an air blown fiber (ABF) duct which is available for filing with optical fiber which is comprised of solid, semi-solid, foamed or hollow polymeric smooth internal and external surfaces.

FIG. 5D is a cross-section view of another embodiment of the cable support-separator that includes a solid four-petal or "daisy" shaped arrangement with a central core that may or may not be hollow. Each "petal" contains three hollow sections of differing diameters for additional optical or metallic conductor media. In this case, the center hollow section of each petal is filled with an optical fiber unit (580). The central region is solid or optionally hollow.

Figure 6B:
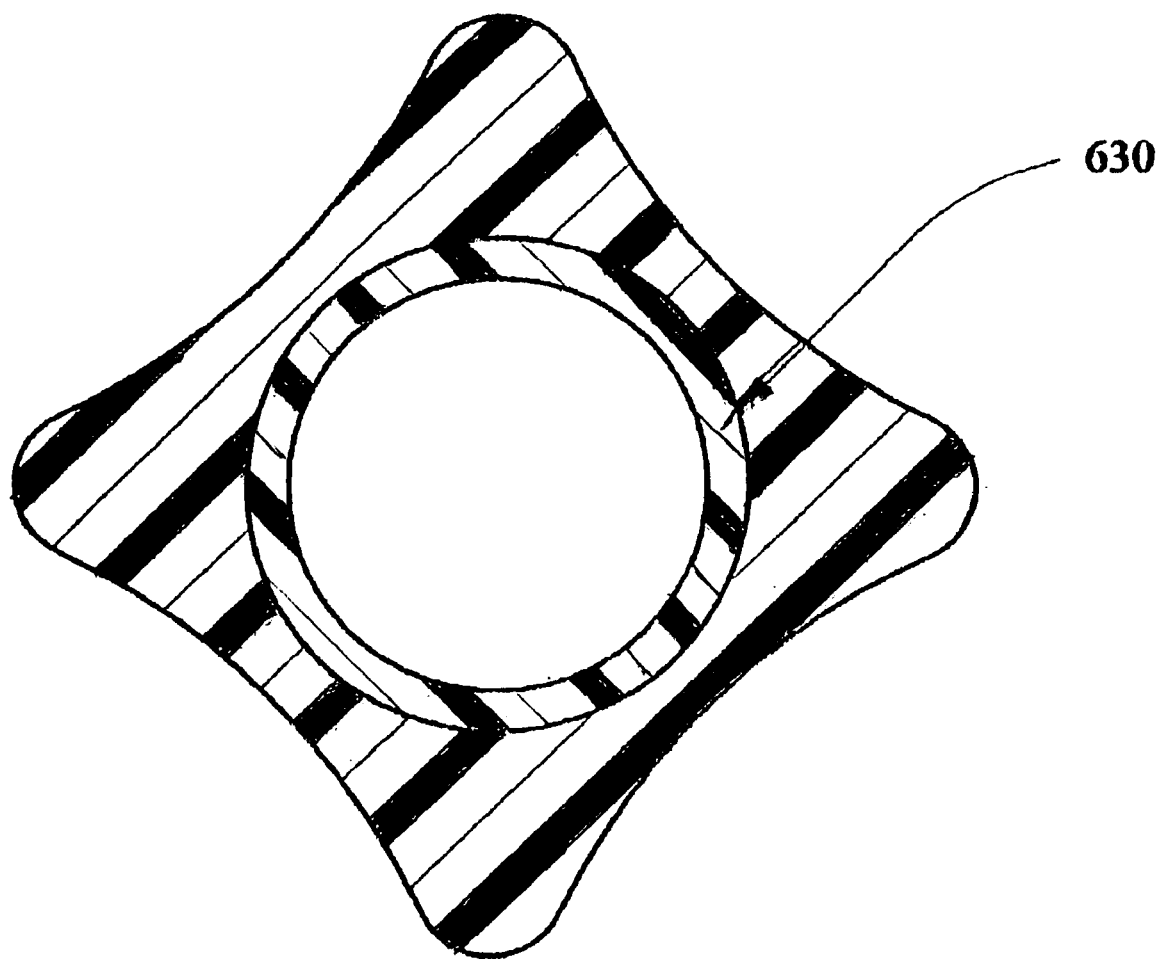
Figure 6C:
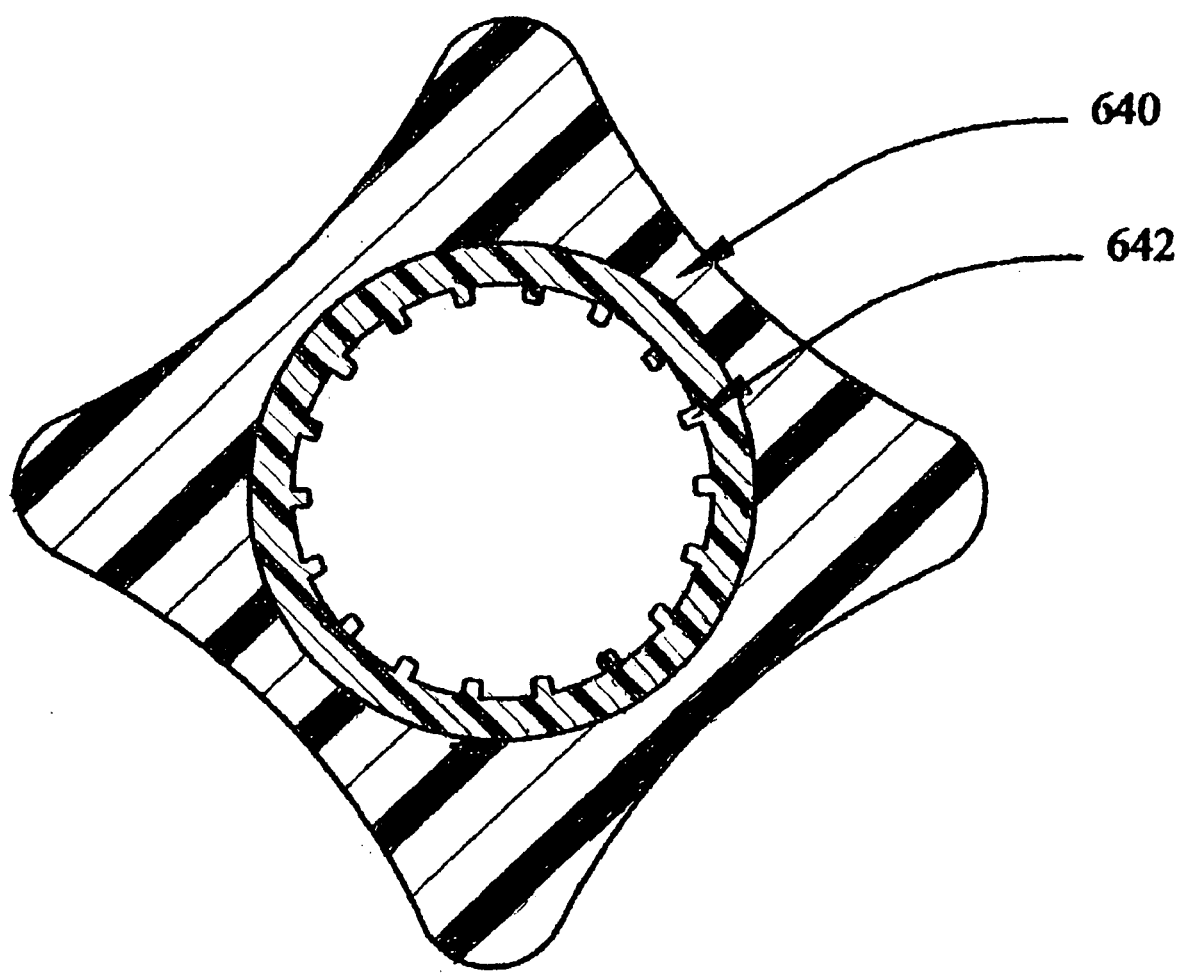

FIGS. 6A, 6B, 6C are cross-sectional views of another set of embodiments of the cable support-separator that includes a circular ring region (600) which is surrounded by rounded lobes (610, 612, 614, and 616) in a symmetric diamond-like geometry that defines as many as four separate regions for pairs that are properly separated in the final (often jacketed) cable design. Again the central ring portion can optionally include a hollow region (620) that may be used as an air blown fiber (ABF) duct which is available for filling with optical fiber which is comprised of solid, semi-solid, foamed or hollow polymeric smooth internal and external surfaces. FIG. 6A has no inner ring, FIG. 6B has a smooth inner ring (630) with optionally different material than the outer ring, and FIG. 6C has an inner ring (640) with rifled sections (642). Each can optionally be used for coax or twisted pair as well as for fiber optic conductors in advance, during, or after installation.

Figure 6D:
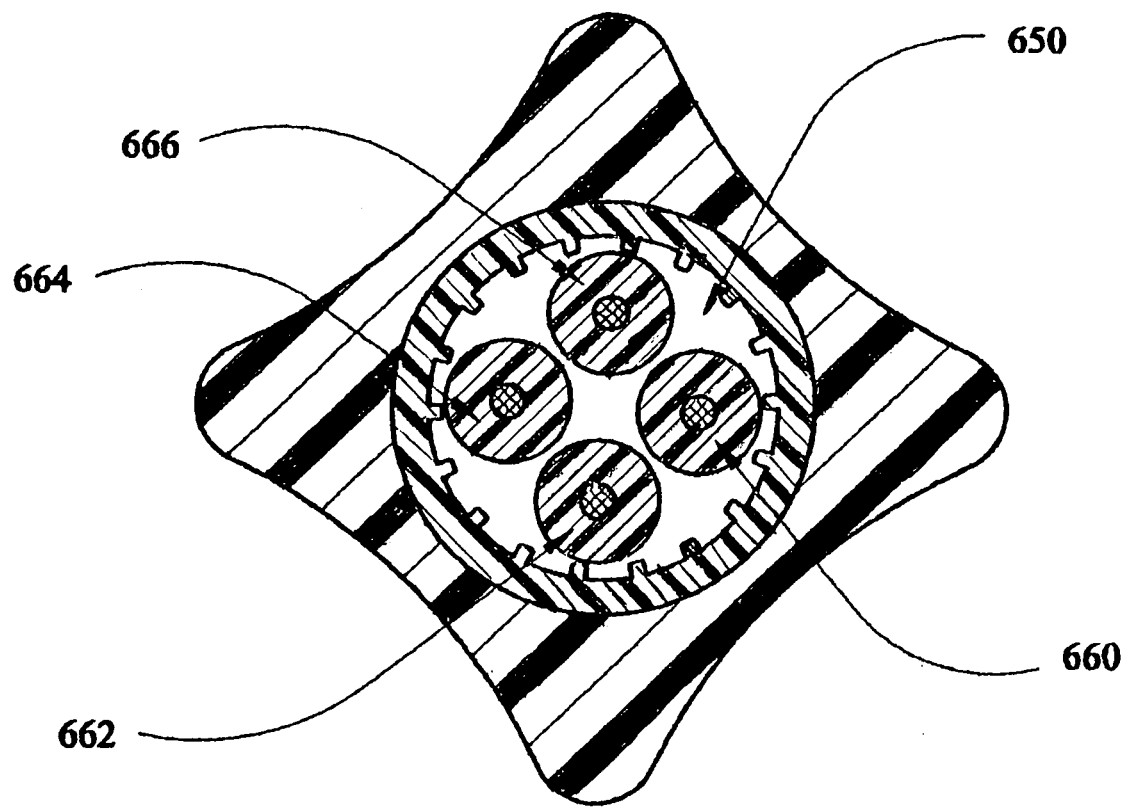
FIG. 6D is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes the optional addition of one or more conductors including optionally organic or inorganic fibers such as polyamide (for example Kevlar®) filling and an optional strength member within the second inner ring (that may or may not be rifled). Again the central ring portion can optionally include a hollow region that may be used as an air blown fiber (ABF) duct which is available for filling with optical fiber which is comprised of solid, semi-solid, foamed or hollow polymeric smooth internal and external surfaces.

FIG. 6D is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes the optional addition of one or more conductors including optionally organic or inorganic fibers such as polyamide (for example Kevlar®) filling and an optional strength member (650) within the second inner ring (that may or may not be rifled). Again the central ring portion can optionally include a hollow region that may be used as an air blown fiber (ABF) duct which is available for filling with optical fiber (660, 662, 664, and 666) which is comprised of solid, semi-solid, foamed or hollow polymeric smooth internal and external surfaces.

Figure 6E:
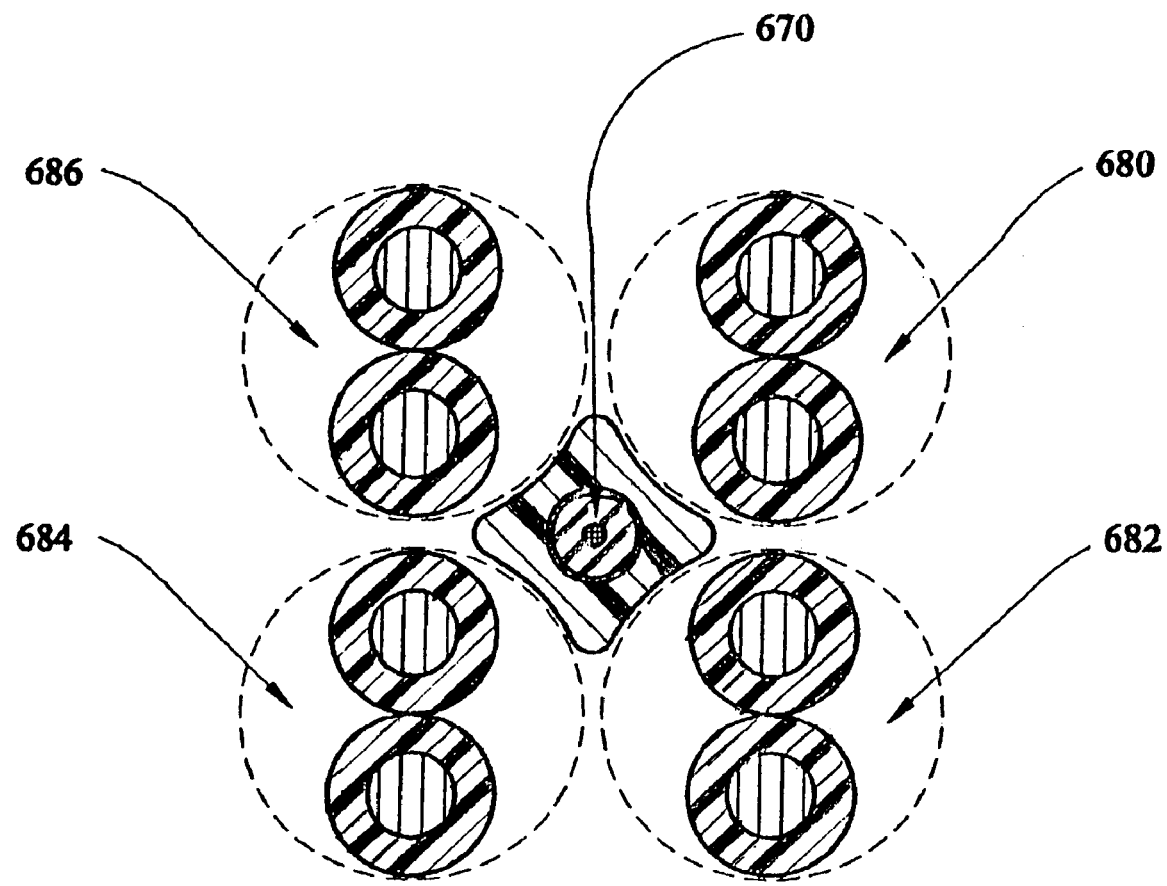
FIG. 6E is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes a center portion filled with a fiber optic unit as well as four separated conductor pairs in each of the regions defined by the symmetric diamond-like geometry of the cable support-separator. Again the central ring portion can optionally include a hollow region that may be used as an air blown fiber (ABF) duct which is available for filling with optical fiber which is comprised of solid, semi-solid, foamed or hollow polymeric smooth internal and external surfaces.

FIG. 6E is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes a center portion filled with a fiber optic unit (670) as well as four separated conductor pairs (680, 682, 684, and 686) in each of the regions defined by the symmetric diamond-like geometry of the cable support-separator. Again the central ring portion can optionally include a hollow region that may be used as an air blown fiber (ABF) duct which is available for filling with optical fiber which is comprised of solid, semi-solid, foamed or hollow polymeric smooth internal and external surfaces.

Figure 6F:
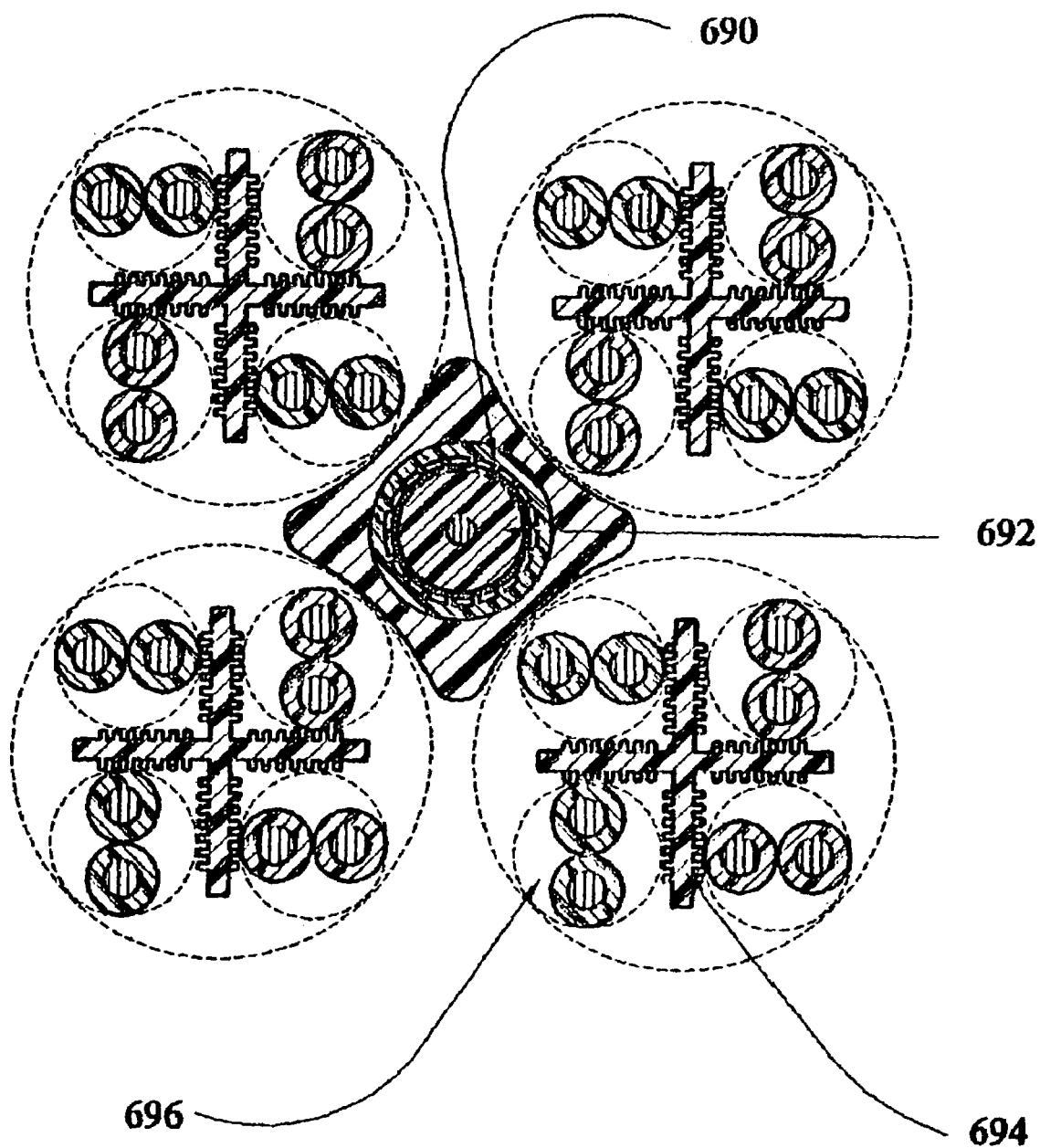
FIG. 6F is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes a center portion with a second inner ring portion filled with a fiber optic unit or other conductors as well as four cross-like separators (see FIG. 7A) in each of the regions defined by the symmetric diamond-like geometry of the cable support-separator within which another, up to four pairs of conductors are situated and separated by the cross-like separator. Again the central ring portion can optionally include a hollow region that may be used as an air blown fiber (ABF) duct which is available for filling with optical fiber which is comprised of solid, semi-solid, foamed or hollow polymeric smooth internal and external surfaces.

FIG. 6F is a cross-sectional view of another embodiment of the cable support-separator that includes a circular ring region which is surrounded by rounded lobes in a symmetric diamond-like geometry that defines as many as four separate regions for pairs that are properly separated in the final (often jacketed) cable design. This design includes a center portion with a second inner ring portion (690) filled with a fiber optic unit (692) or other conductors as well as four cross-like separators (694) (see FIG. 7A) in each of the regions defined by the symmetric diamond-like geometry of the cable support-separator within which another, up to four pairs of conductors (696) are situated and separated by the cross-like separator. Again the central ring portion can optionally include a hollow region that may be used as an air blown fiber (ABF) duct which is available for filling with optical fiber which is comprised of solid, semi-solid, foamed or hollow polymeric smooth internal and external surfaces.

Figure 7A:
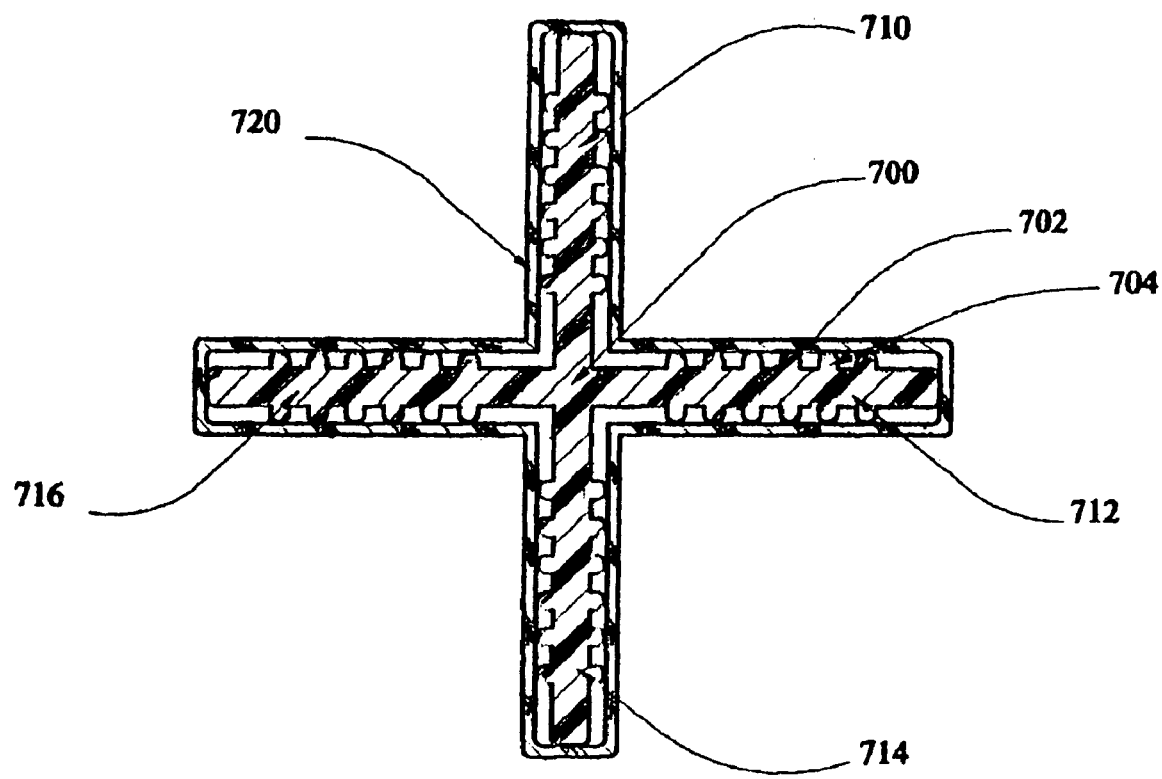
FIG. 7A is a cross-section view of another embodiment of the cable support-separator that includes a more conventional cross-like separator section with "rifled" sections extending outward into four quadrants away from the central region and is encased or covered within an outer insulated layer which is itself shaped in an identical cross except that the dimensions of this outer cross is larger than the rifled inner cross and functions as a "skin". The inner cross-like portion may be metallized by utilizing electroless or electrolytic plating techniques over a thermoplastic.

FIG. 7A is a cross-section view of another embodiment of the cable support-separator that includes a more conventional cross-like separator section (700) with "rifled" sections (702 and 704, for example) extending outward into four quadrants (710, 712, 714, and 716) away from the central region (700) and is encased or covered within an outer insulated layer (720) which is itself shaped in an identical cross except that the dimensions of this outer cross is larger than the rifled inner cross and functions as a "skin". The inner cross-like portion may be metallized by utilizing electroless or electrolytic plating techniques over a thermoplastic film.

Figure 7B:
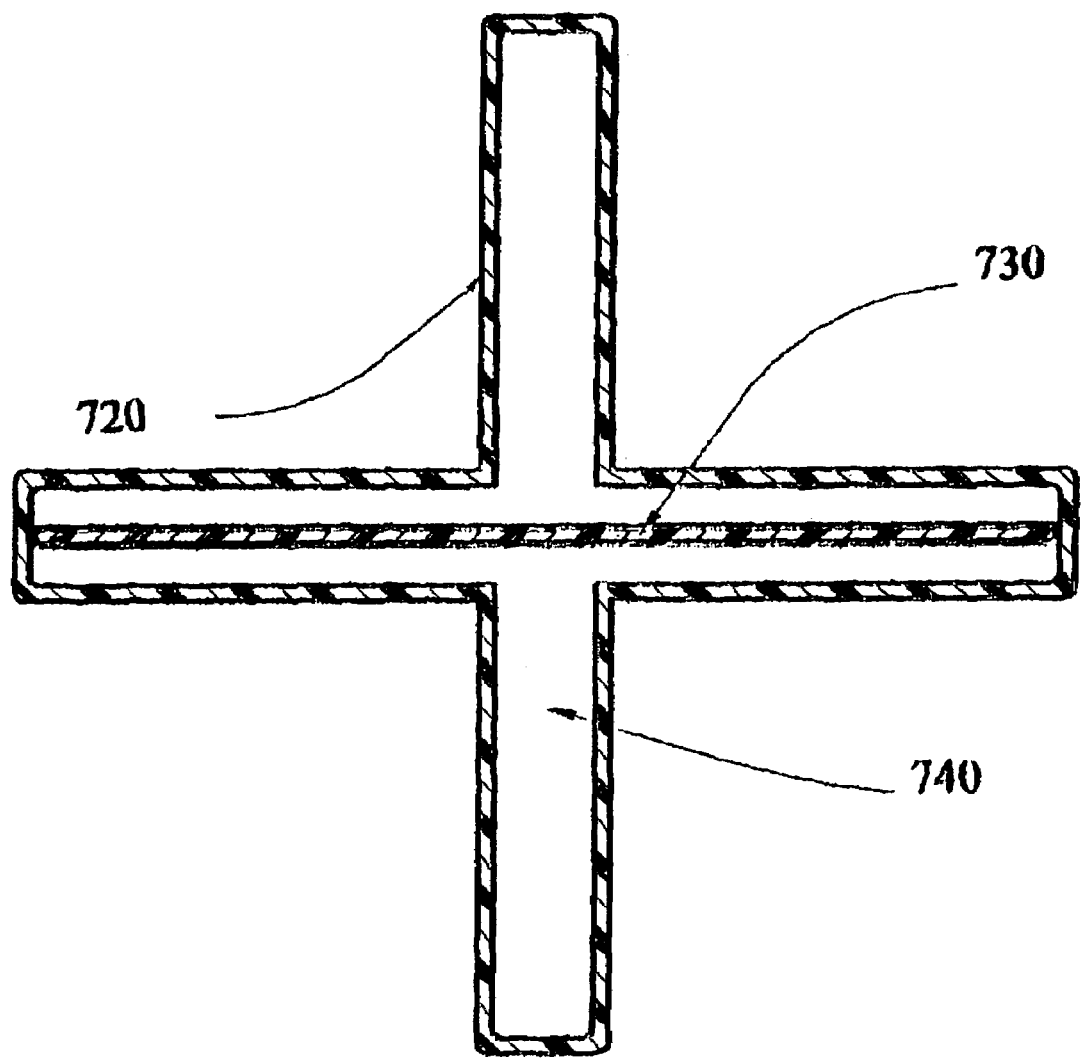
FIG. 7B is a cross-section view of another embodiment of the cable support-separator that includes the same more conventional cross-like separator section as with FIG. 7A except that this separator contains a shield that extends along the horizontal axis and optionally also along the vertical axis or both axes within the horizontal hollow portion of the cross-like separator. This shield is comprised of aluminum PET film and may be configured so that it is held within the outer cross-like separator. The design also allows for shielding exterior to the separator under a jacketed cable containing the separator.

FIG. 7B is a cross-section view of another embodiment of the cable support-separator that includes the same more conventional cross-like separator section as with FIG. 7A except that this separator contains a shield (730) that extends along the horizontal axis and optionally also along the vertical axis or both axes within the horizontal hollow portion (740) of the cross-like separator. This shield is comprised of aluminum PET film and may be configured so that it is held within the outer cross-like separator (720) and may also be part of an overall shielded cable which is shielded using aluminum backed PET film or a braided metallic shield or any combination.

Figure 8A:
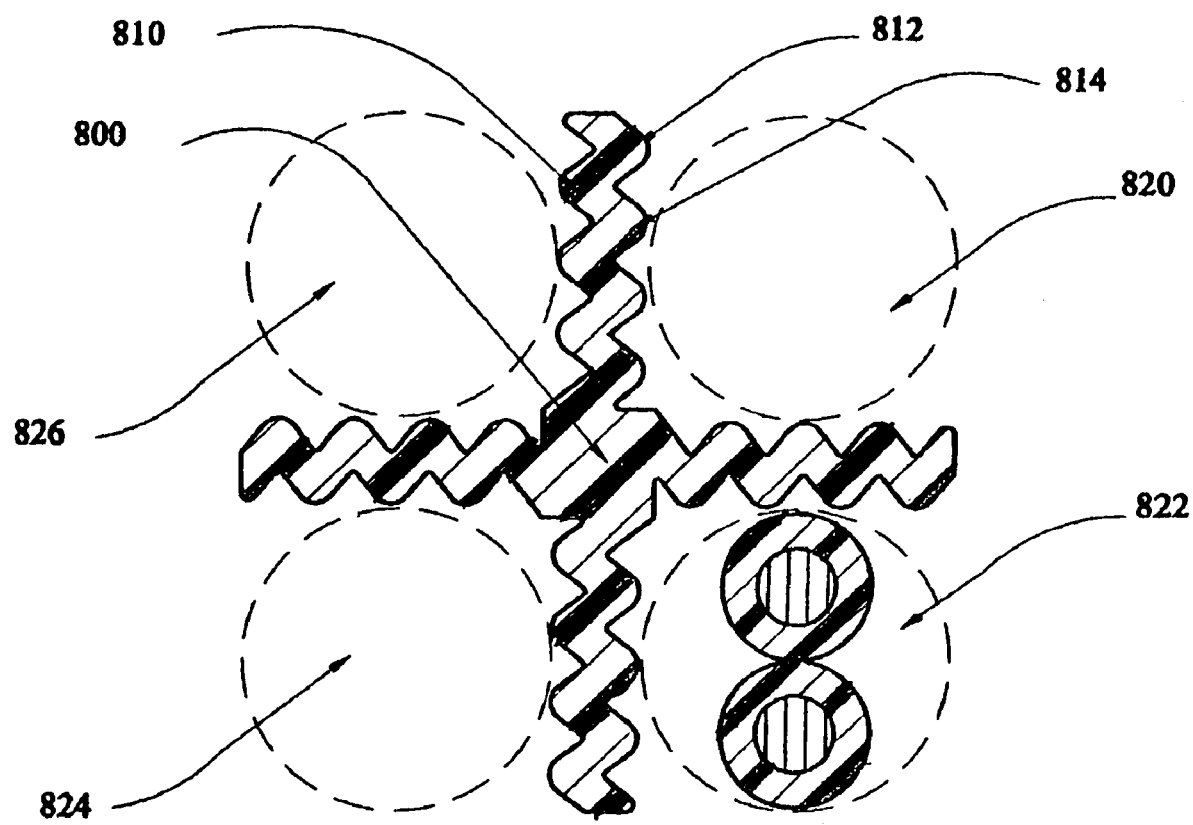
FIG. 8A is a cross-section view of another embodiment of the cable support-separator that includes providing variations on a cross-like arrangement by adding "zig-zag" extensions that extend away from the central region. Again the cross-like "zig-zag" arrangement may be covered within an outer insulated layer which is itself shaped in an identical cross except that the dimensions of this outer cross are larger than the rifled inner cross and functions as a "skin".

FIG. 8A is a cross-section view of another embodiment of the cable support-separator that includes providing variations on a cross-like arrangement by adding "zig-zag" extensions (810, 812, and 814, for example) that extend away from the central region (800). Again the cross-like "zig-zag" arrangement may be covered within an outer insulated layer which is itself shaped in an identical cross except that the dimensions of this outer cross are larger than the rifled inner cross and functions as a "skin". This design optionally includes four separated conductor pairs (820, 822, 824, and 826) in each of the regions defined by the symmetric diamond-like geometry of the cable support-separator.

Figure 8B:
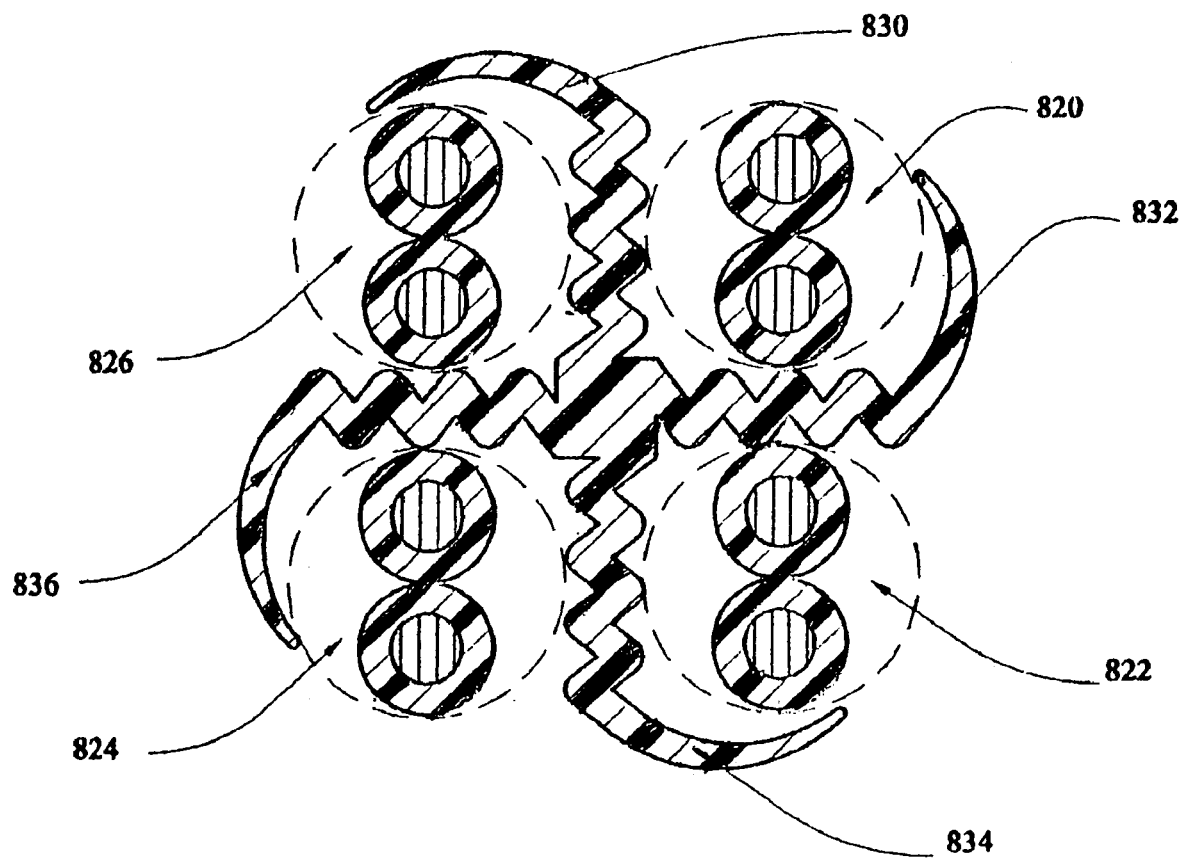
FIG. 8B is a cross-section view of another embodiment of the cable support-separator that includes providing variations on a cross-like arrangement by adding "sickle-like" extensions that extend away from the central region. Again the cross-like and sickle-like sections arrangement may be covered within an outer insulated layer which is itself shaped in an identical cross except that the dimensions of this outer cross are larger than the rifled inner cross and functions as a "skin".

FIG. 8B is a cross-section view of another embodiment of the cable support-separator that includes providing variations on a cross-like arrangement by adding "sickle-like" extensions (830, 832, 834, and 836) that extend away from the central region. Again the cross-like and sickle-like sections arrangement may be covered within an outer insulated layer which is itself shaped in an identical cross except that the dimensions of this outer cross are larger than the rifled inner cross and functions as a "skin". This design optionally includes four separated conductor pairs (820, 822, 824, and 826) in each of the regions defined by the symmetric diamond-like geometry of the cable support-separator.

Figure 9:
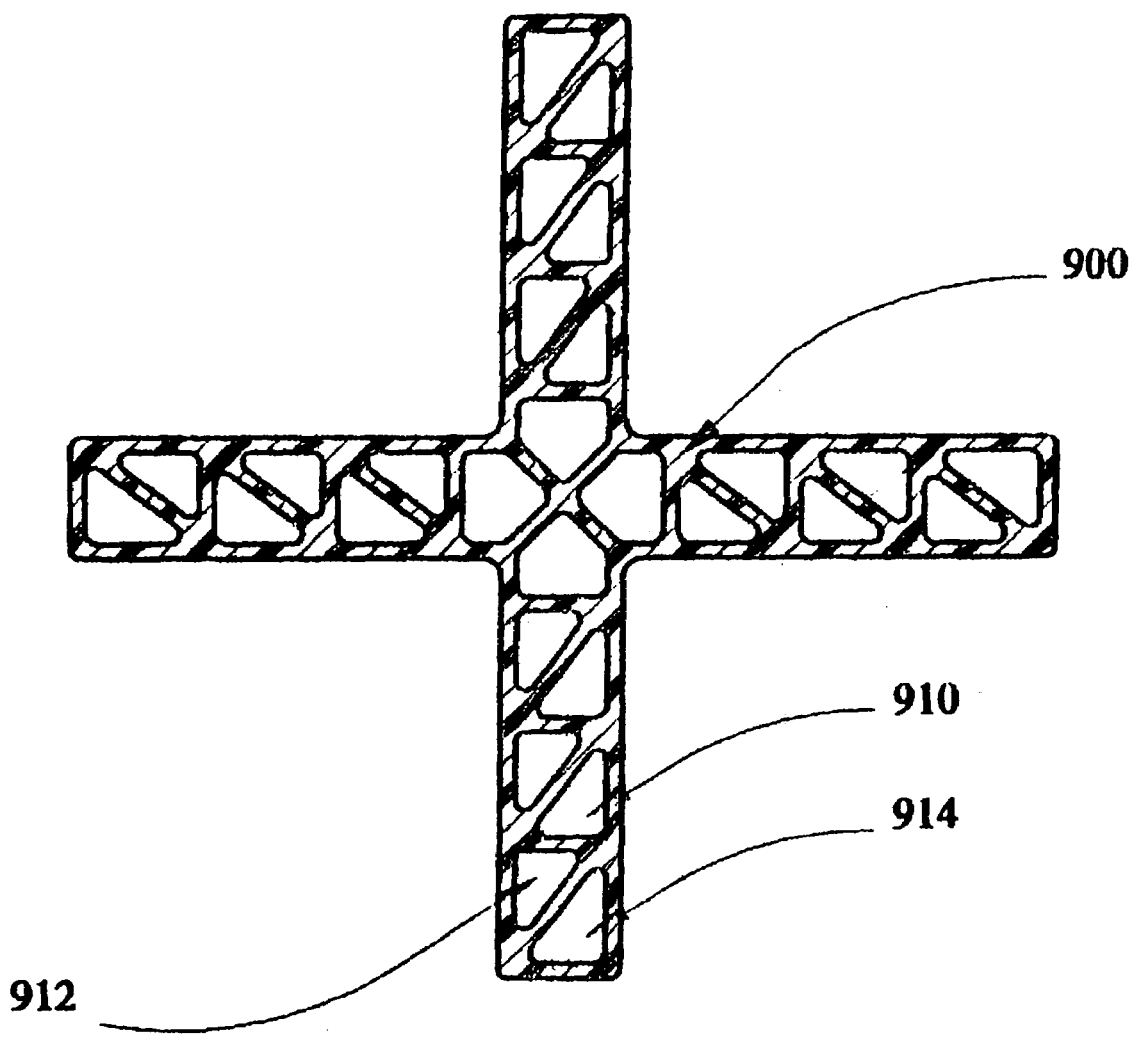
FIG. 9 is a cross-sectional view of another embodiment with several hollow regions for blown fiber or any transmission media for present, future, or concurrent installations using the support-separator alone or in combination with a cable.

FIG. 9 is a cross-sectional view of another embodiment (900) with several hollow regions (910, 912, 914, for example) for blown fiber or any transmission media for present, future, or concurrent installations using the support-separator alone or in combination with a cable.

Figure 10A:
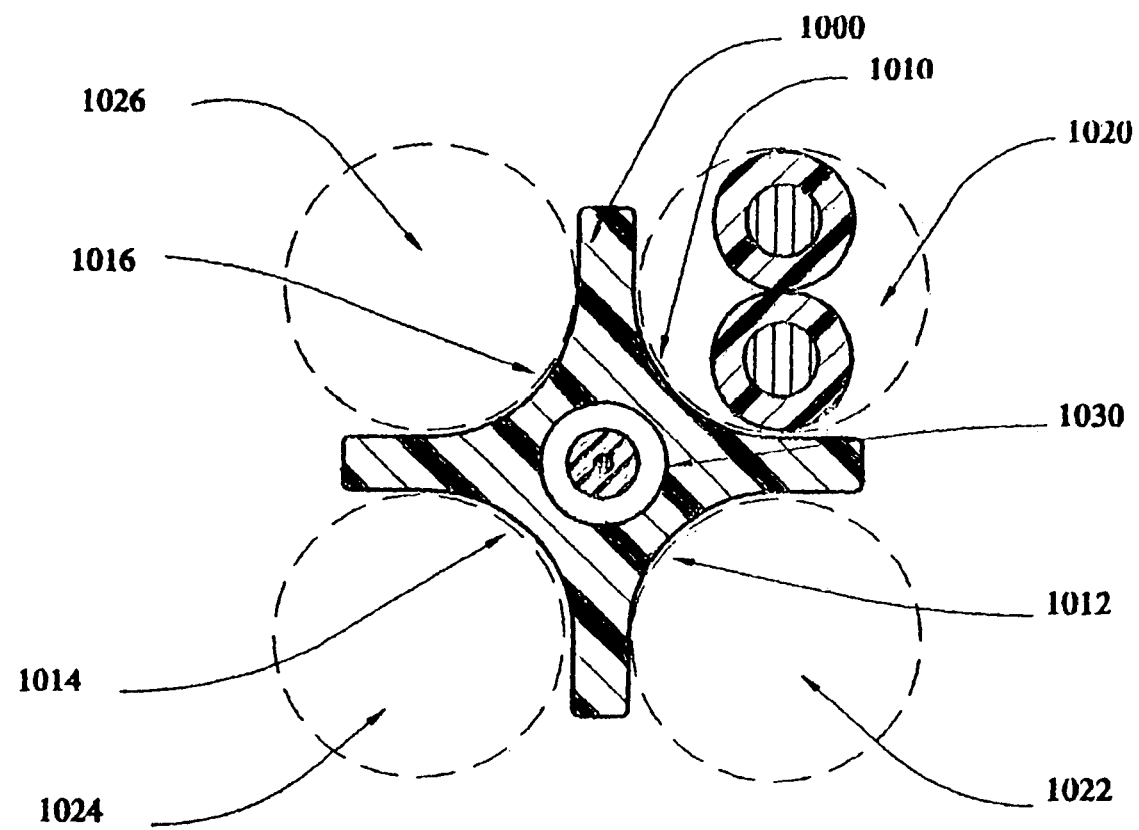
FIGS. 10A and 10B are cross-sectional views of another set of embodiments of the cable support-separator that includes a circular ring region which is surrounded by semi-rounded lobes in a symmetric star-like geometry that defines as many as four separate regions for pairs that are properly separated in the final (often jacketed) cable design. Again the central ring portion can optionally include a hollow region that may be used as an air blown fiber (ABF) duct which is available for filling with optical fiber which is comprised of solid, semi-solid, foamed or hollow polymeric smooth internal and external surfaces.
Figure 10B:
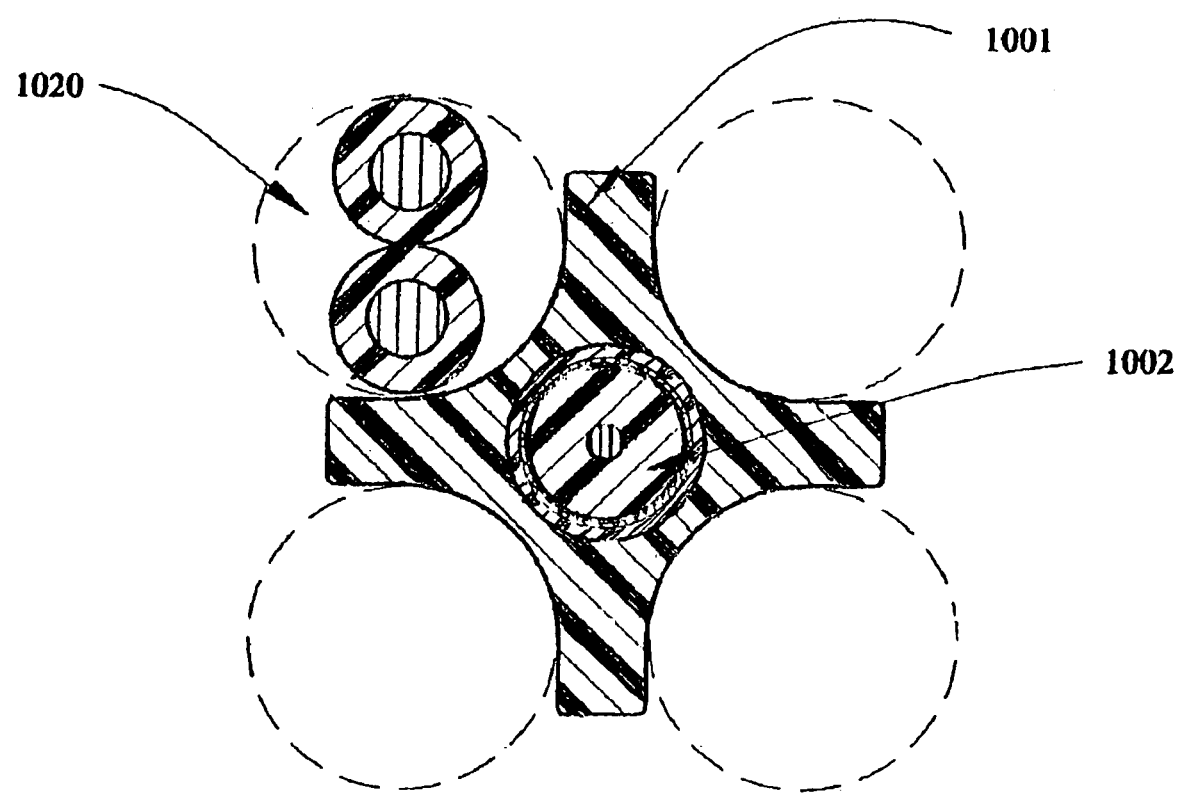

FIGS. 10A and 10B are cross-sectional views of another set of embodiments of the cable support-separator that includes a circular ring region (1000) which is surrounded by semi-rounded lobes (1010, 1012, 1014, and 1016) in a symmetric star-like geometry that defines as many as four separate regions for pairs (1020, 1022, 1024, and 1026) that are properly separated in the final (often jacketed) cable design. Again the central ring portion can optionally include a hollow region (1030) that may be used as an air blown fiber (ABF) duct which is available for filling with optical fiber which is comprised of solid, semi-solid, foamed or hollow polymeric smooth internal and external surfaces. FIGS. 10A and 10B include views of optionally filled inner hollow regions such that each can optionally be used for coax or twisted pair as well as for fiber optic conductors (in advance, during or after installation). FIG. 10A includes a view of this design including the optional addition of one or more conductors including optionally organic or inorganic fibers such as polyamide (for example Kevlar®) filling and an optional strength member within the second inner ring (that may or may not be rifled). FIG. 10B includes a view of this design that includes the optional addition of coaxial cable (1002) in the hollow center region. The central circular region (1001) is of a slightly larger size than that shown in FIG. 10A in order to allow for coaxial cable in the central hollow region of the separator.

What is claimed is:

1. A high performance communications cable comprising; an interior support comprising an inner cross-like separator with rifled sections extending outward into four quadrants away from a central region, with quadrants defined by 90 degree right angles formed by an intersection of extended cross-like rifled separator sections encased within an outer insulated layer which is itself shaped in an identical cross-like pattern as said cross-like separator section so that dimensions of said outer insulated layer forms a cross-like pattern larger than said inner cross-like separator sections with rifled sections and functions as a skin for said inner cross-like separator section.

2. The high performance communications cable of claim 1, wherein said central region of said inner cross-like separator section with said outer insulated layer includes a hollow central region acting as a ductlet for an air blown fiber (ABF) which is available for filling with optical fiber or other conductors.

3. An interior support-separator for a communications cable comprising; an interior support comprising an inner cross-like separator section with rifled sections extending outward into four quadrants away from a central region, with quadrants defined by 90 degree right angles formed by an intersection of extended cross-like rifled separator sections encased within an outer insulated layer which is itself shaped in an identical cross-like pattern as said cross-like separator section so that dimensions of said outer insulated layer forms a cross-like pattern larger than said inner cross-like separator sections with rifled sections and functions as a skin for said inner cross-like separator section.

4. The interior support-separator of claim 3, wherein said central region of said inner cross-like separator section with said outer insulated layer includes a hollow central region acting as a ductlet for an air blown fiber (ABF) which is available for filling with optical fiber or other conductors.

* * * * *